(12) United States Patent
Oyama et al.

(10) Patent No.: US 11,675,496 B2
(45) Date of Patent: Jun. 13, 2023

(54) APPARATUS, DISPLAY SYSTEM, AND DISPLAY CONTROL METHOD

(71) Applicants: Taira Oyama, Kanagawa (JP); Susumu Fujioka, Kanagawa (JP)

(72) Inventors: Taira Oyama, Kanagawa (JP); Susumu Fujioka, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 17/692,212

(22) Filed: Mar. 11, 2022

(65) Prior Publication Data
US 2022/0300151 A1 Sep. 22, 2022

(30) Foreign Application Priority Data
Mar. 17, 2021 (JP) .............................. JP2021-043691

(51) Int. Cl.
*G06F 3/04883* (2022.01)
*G06F 3/14* (2006.01)

(52) U.S. Cl.
CPC ........ *G06F 3/04883* (2013.01); *G06F 3/1454* (2013.01)

(58) Field of Classification Search
CPC ............. G06F 3/04883; G06F 3/03545; G06F 3/1454; H04L 65/403
See application file for complete search history.

(56) References Cited

U.S. PATENT DOCUMENTS

| 9,035,896 | B2 * | 5/2015 | Nagahara | H04L 12/1813 345/173 |
| 9,640,144 | B2 * | 5/2017 | Shimizu | H04N 9/3179 |
| 10,936,116 | B2 * | 3/2021 | Han | H04L 51/04 |
| 2007/0011239 | A1 | 1/2007 | Fujioka | |
| 2010/0195123 | A1 | 8/2010 | Fujioka | |
| 2015/0332060 | A1 | 11/2015 | Tsumura et al. | |
| 2016/0117140 | A1 * | 4/2016 | Ikeda | G06F 3/1454 715/753 |
| 2021/0105307 | A1 | 4/2021 | Oyama et al. | |
| 2021/0133363 | A1 | 5/2021 | Okumura et al. | |
| 2022/0019782 | A1 | 1/2022 | Oshima et al. | |

FOREIGN PATENT DOCUMENTS

| JP | 2011-151613 | 8/2011 |
| JP | 2014-195183 | 10/2014 |
| JP | 2015-060592 | 3/2015 |

\* cited by examiner

*Primary Examiner* — Koosha Sharifi-Tafreshi
(74) *Attorney, Agent, or Firm* — Xsensus LLP

(57) ABSTRACT

An apparatus includes circuitry. The circuitry acquires hand drafted input data based on hand drafting that is input to a hand drafted input area. The circuitry displays at least a part of the hand drafted input area on a display screen. The circuitry displays, on the display screen, a panoramic screen area that includes the hand drafted input data.

20 Claims, 46 Drawing Sheets

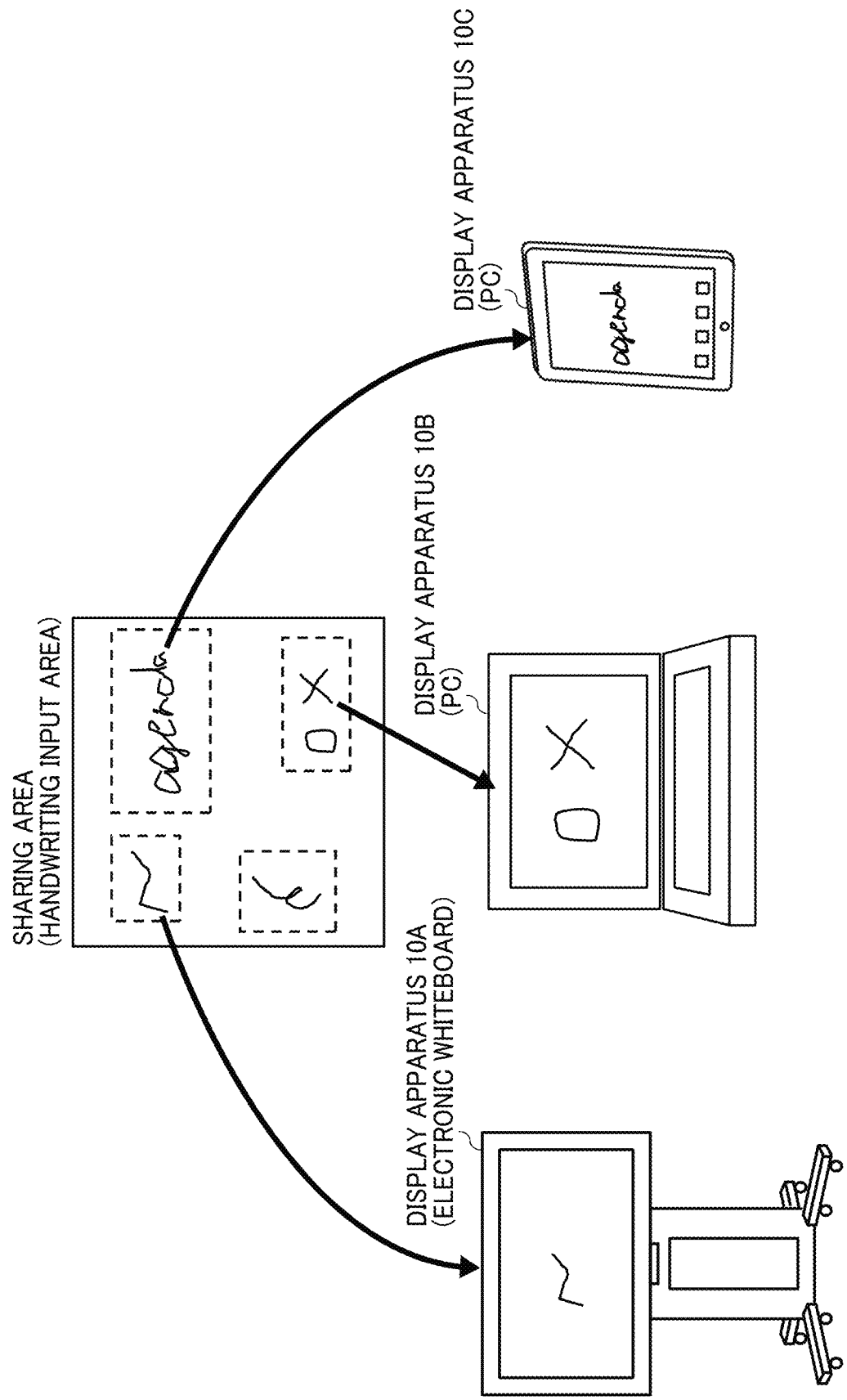

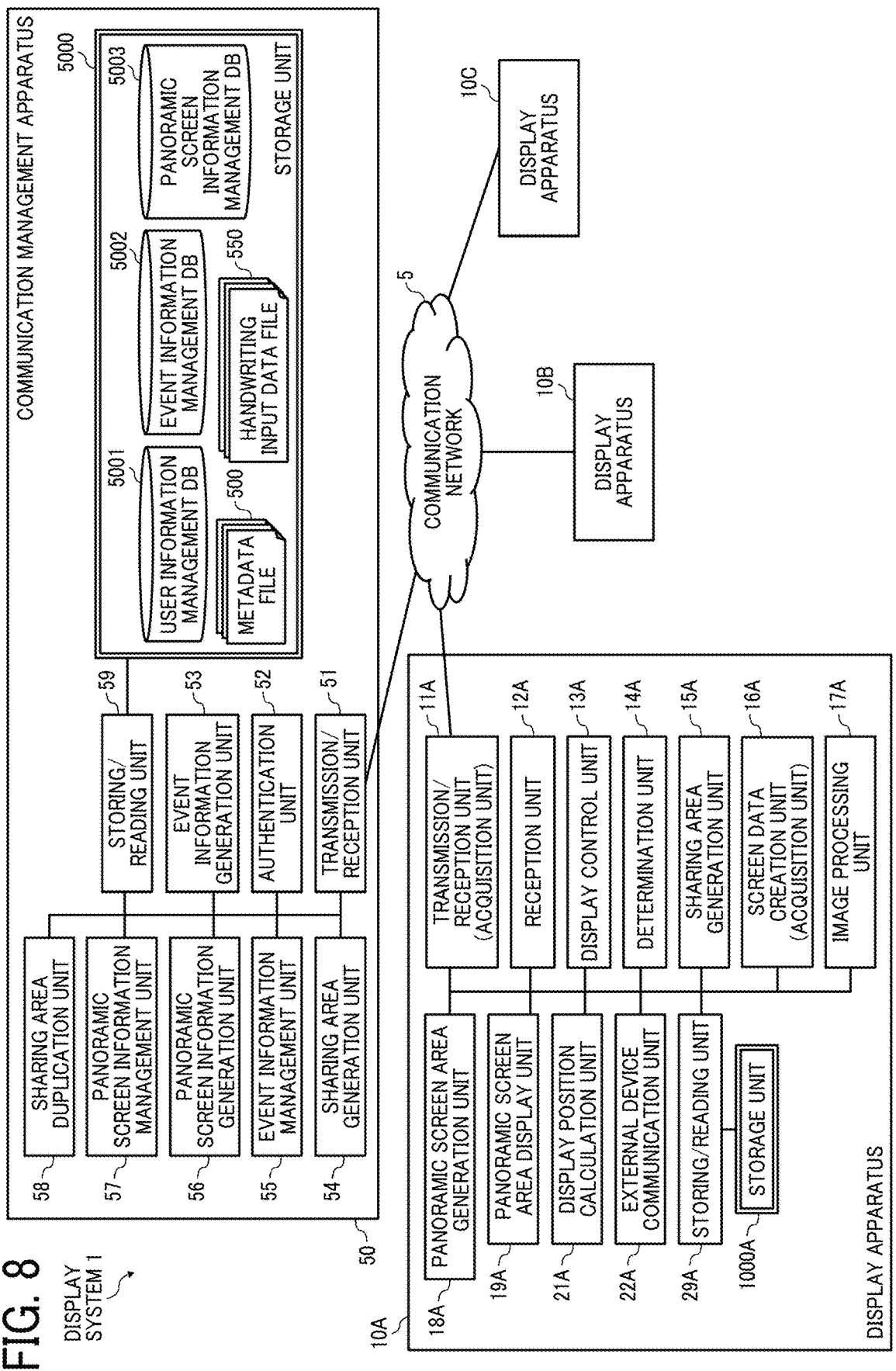

FIG. 9

USER INFORMATION MANAGEMENT TABLE

| USER ID | USER NAME | PASSWORD | E-MAIL ADDRESS |
|---------|-----------|----------|----------------|
| A001 | userA | a0101 | userA@xxx.com |
| A002 | userB | a0202 | userB@xxx.com |
| A003 | userC | a0303 | userC@xxx.com |
| A004 | userD | a0404 | userD@xxx.com |
| A005 | userE | a0505 | userE@xxx.com |
| ... | ... | ... | ... |

FIG. 10

EVENT INFORMATION MANAGEMENT TABLE

| EVENT ID | EVENT NAME | EVENT DATE/TIME | PARTICIPATING USER | FILE STORAGE LOCATION |
|----------|------------|-----------------|---------------------|------------------------|
| G001 | Theme A, Regular meeting | 2021/01/15 13:00 | "userA", "userB", "userC" | C:¥Conf¥20210115¥conf1.pdf |
| G002 | Theme B, Meeting | 2021/01/18 13:00 | "userA", "userC" | C:¥Conf¥20210118¥conf1.pdf |
| G003 | Interview | 2021/01/18 15:00 | "userB", "userD" | C:¥Conf¥20210118¥conf2.pdf |
| G004 | ZZ Seminar | 2021/01/19 15:00 | "userA", "userB", "userC", "userD" | C:¥Conf¥20210119¥conf1.pdf |
| G005 | Negotiation with X company | 2021/01/20 10:00 | "userE", "userD" | C:¥Conf¥20210120¥conf1.pdf |
| ... | ... | ... | ... | ... |

FIG. 11

METADATA FILE 500

```
{
 "Conference" : [
  {
    "Name" : "Theme A, Regular meeting 1",
    "Start" : "2021/01/15 13:00",
    "End" : "2021/01/15 15:00",
    "OperationLog" : [
        {
          "Name" : "userA",
          "ViewArea" : [
               {"X": 10, "Y" : 310 , "Width" : 100, "Height" : 80, "Time" : 100},
               { "X": 100, "Y" : 210 , "Width" : 100, "Height" : 80, "Time" : 10},
               { "X": 150, "Y" : 130 , "Width" : 50, "Height" : 20, "Time" : 1000},
               ]
        },
        {
          "Name" : "userB",
          "ViewArea" : [
               {"X": 10, "Y" : 310 , "Width" : 100, "Height" : 80, "Time" : 100},
               { "X": 105, "Y" : 1200 , "Width" : 100, "Height" : 80, "Time" : 20000},
               ]
        },
        {
          "Name" : "userC",
          "ViewArea" : [
               { "X": 120, "Y" : 104 , "Width" : 100, "Height" : 80, "Time" : 10},
               {"X": 130, "Y" : 1300 , "Width" : 100, "Height" : 80, "Time" : 100},
               ]
        },
    ]
  }
 ]
}
```

FIG. 12

HANDWRITING INPUT DATA FILE 550

```
{
  "BackgroundColor" : "White",
  "Objects" : [
      {
          "Type" : "Stroke",
          "Data" : {
                  "Points" : [
                          { "X" : 10, "Y" : 10 },
                          { "X" : 20, "Y" : 20 },
                          { "X" : 30, "Y" : 30 }]
                  "Thin" : 5,
                  "Color" : "Black",}
          "User" : "userA",
          "Date": "2021/01/15 13:32",
      },
      {
          "Type" : "Stamp",
          "Data" : {
                  "Points" : { "X" : 100, "Y" : 200 },
                  "Size" : { "Width" : 20, "Height" : 20 },
                  "Image" : "Circle.jpg",}
          "User" : "userB",,
          "Date": "2021/01/15 13:40",
      }
  ]
}
```

FIG. 13

PANORAMIC SCREEN INFORMATION MANAGEMENT TABLE

| EVENT ID | AREA DATA Dx(x1,x2), Dy(y1,y2) | DISPLAY SIZE | DISPLAY USER |
|---|---|---|---|
| A001 | (34,145), (56,186) | FIXED | A001(userA) |
| A002 | (13,72), (76,137) | SMALL | A001(userA), A003(userC) |
| A003 | (27,191), (47,215) | LARGE | – |
| ... | ... | ... | ... |

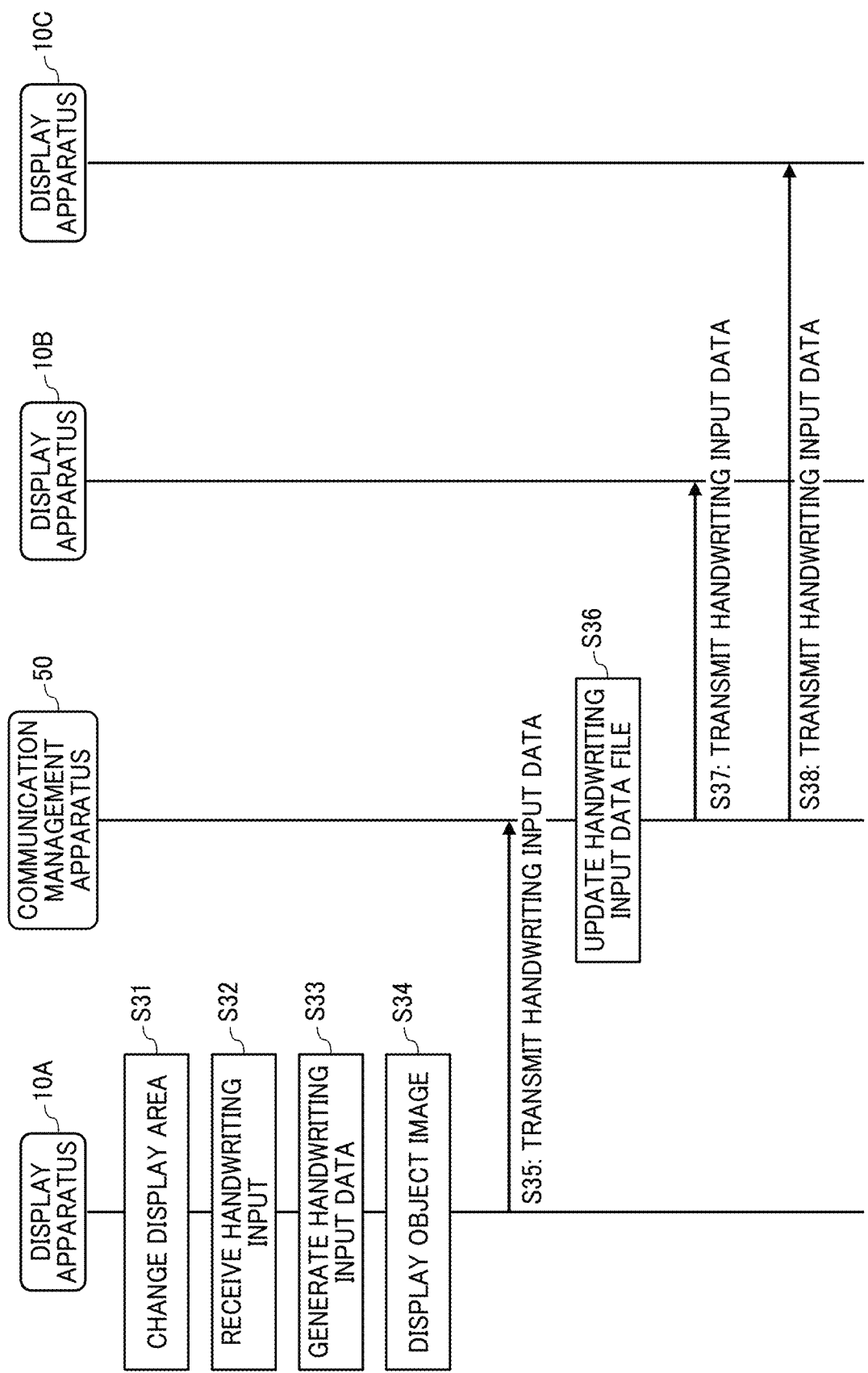

FIG. 17A
SHARING AREA 700
DISPLAY AREA DISPLAYED AT DISPLAY APPARATUS 10A
FIG. 17B
SHARING AREA 700
DISPLAY AREA DISPLAYED AT DISPLAY APPARATUS 10A
FIG. 17C
SHARING AREA 700
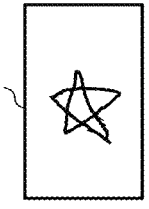
DISPLAY AREA DISPLAYED AT DISPLAY APPARATUS 10A

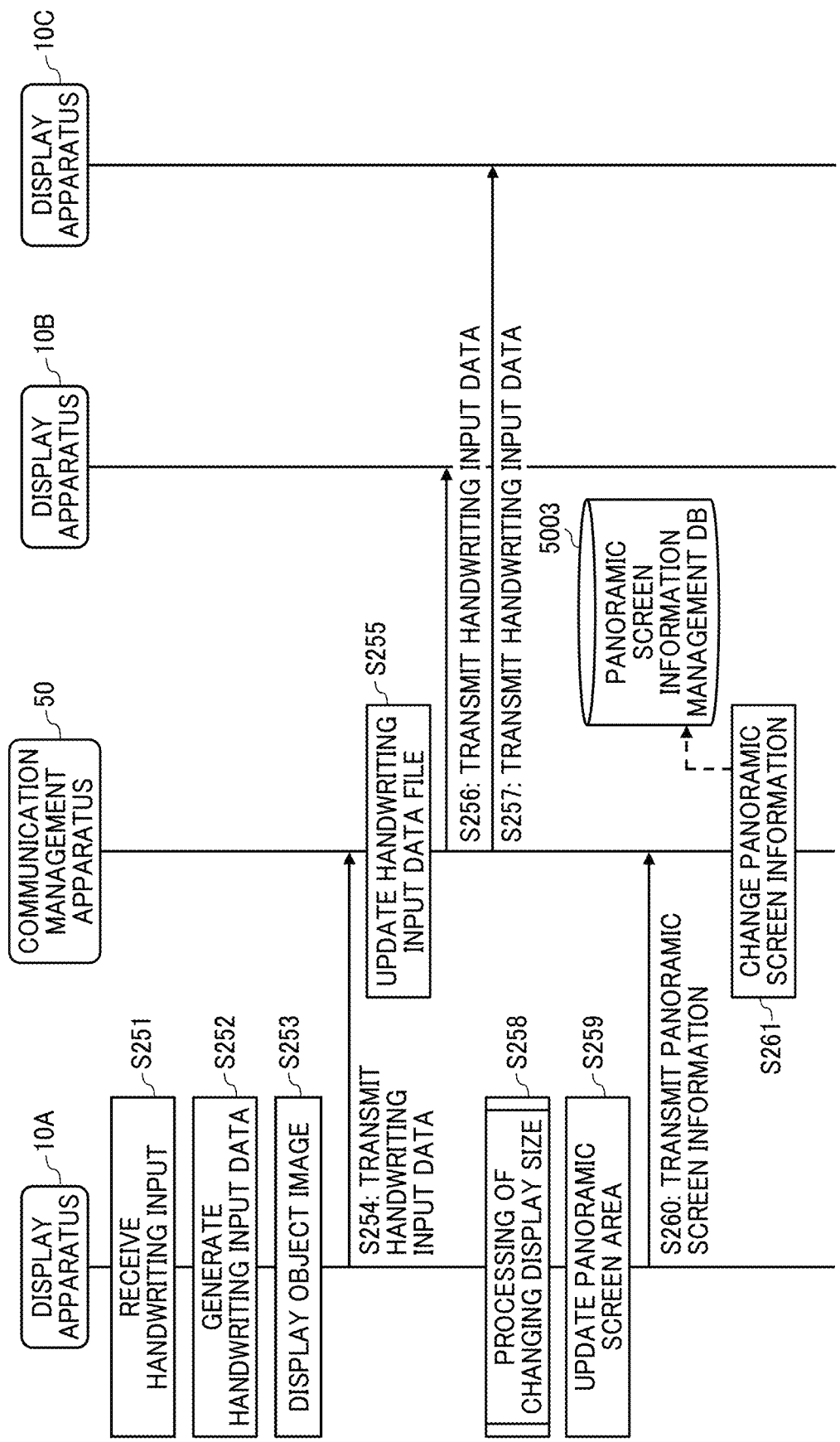

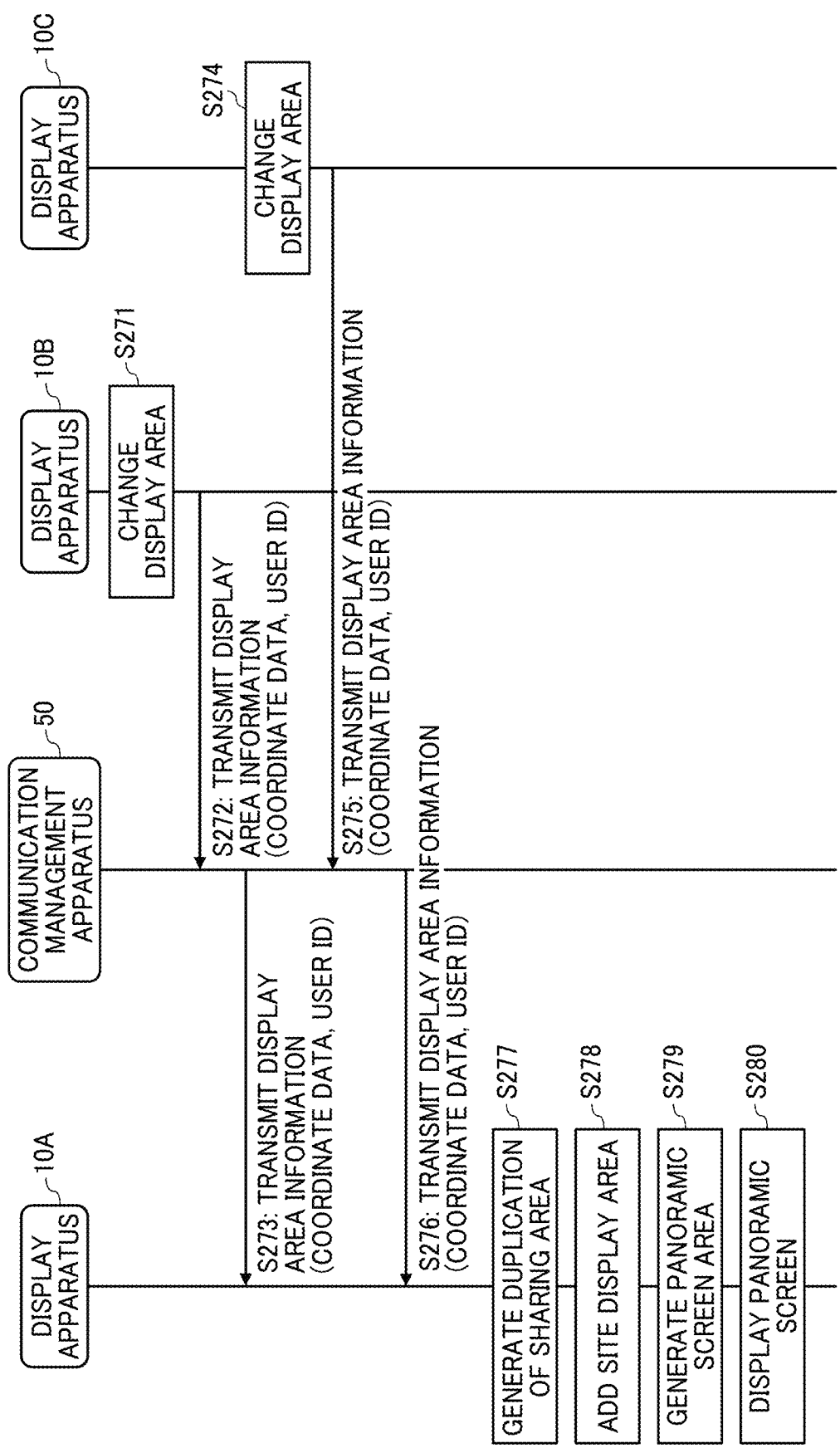

APPARATUS, DISPLAY SYSTEM, AND DISPLAY CONTROL METHOD

CROSS-REFERENCE TO RELATED APPLICATION

This patent application is based on and claims priority pursuant to 35 U.S.C. § 119(a) to Japanese Patent Application No. 2021-043691, filed on Mar. 17, 2021, in the Japan Patent Office, the entire disclosure of which is hereby incorporated by reference herein.

BACKGROUND

Technical Field

Embodiments of the present disclosure relate to an apparatus, a display system, and a display control method.

Related Art

Display apparatuses that allow multiple users to input handwriting are used in meetings and the like in companies, educational institutions, and administrative institutions, for example. Further, technologies are known that enable multiple users to participate in a teleconference from different locations and to input handwriting to the same screen from their own locations respectively, while sharing display screens, each being displayed at each of the different locations.

Furthermore, a method has been studied that enhances a user's operability such as input and viewing on a display screen when conducting a teleconference at different locations. For example, a technology is known according to which a remote conference screen displays a first display area in which shared materials are displayed and a second display area in which thumbnail images of the shared materials are displayed.

SUMMARY

An embodiment of the present disclosure includes an apparatus. The apparatus includes circuitry. The circuitry acquires hand drafted input data based on hand drafting that is input to a hand drafted input area. The circuitry displays at least a part of the hand drafted input area on a display screen. The circuitry displays, on the display screen, a panoramic screen area that includes the hand drafted input data.

Another embodiment of the present disclosure includes a display system. The display system includes a display and circuitry. The circuitry acquires hand drafted input data based on hand drafting that is input to a hand drafted input area. The circuitry displays at least a part of the hand drafted input area on a display screen. The circuitry displays, on the display screen, a panoramic screen area that includes the hand drafted input data.

Another embodiment of the present disclosure includes a display control method performed by an apparatus. The display control method includes acquiring hand drafted input data based on hand drafting that is input to a hand drafted input area. The display control method includes displaying at least a part of the hand drafted input area on a display screen. The display control method includes displaying, on the display screen, a panoramic screen area that includes the hand drafted input data.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 7 is a schematic diagram illustrating a relation between a sharing area shared by a plurality of display apparatuses and display screens, each being displayed on each of the display apparatuses, according to an embodiment of the present disclosure;

FIG. 8 is a diagram illustrating an example of a functional configuration of the display system, according to an embodiment of the present disclosure;

FIG. 9 is a conceptual diagram illustrating an example of a user information management table, according to an embodiment of the present disclosure;

FIG. 10 is a conceptual diagram illustrating an example of an event information management table, according to an embodiment of the present disclosure;

FIG. 11 is a view of an example of a metadata file, according to an embodiment of the present disclosure;

FIG. 12 is a view of an example of a handwriting input data file, according to an embodiment of the present disclosure;

FIG. 13 is a conceptual diagram illustrating an example of a panoramic screen information management table, according to an embodiment of the present disclosure;

FIG. 16 is a sequence diagram illustrating an example of operation of sharing handwriting input data, according to an embodiment of the present disclosure;

FIG. 17A to FIG. 17C are illustrations for describing an example of handwriting input process by a display apparatus, according to an embodiment of the present disclosure;

FIG. 46 is a sequence diagram illustrating an example of operation of changing a display size of a panoramic screen, according to a variation of an embodiment of the present disclosure; and FIG. 47 is a sequence diagram illustrating an example of operation of displaying display area information on a panoramic screen, according to a variation of an embodiment of the present disclosure.

Figure 1:
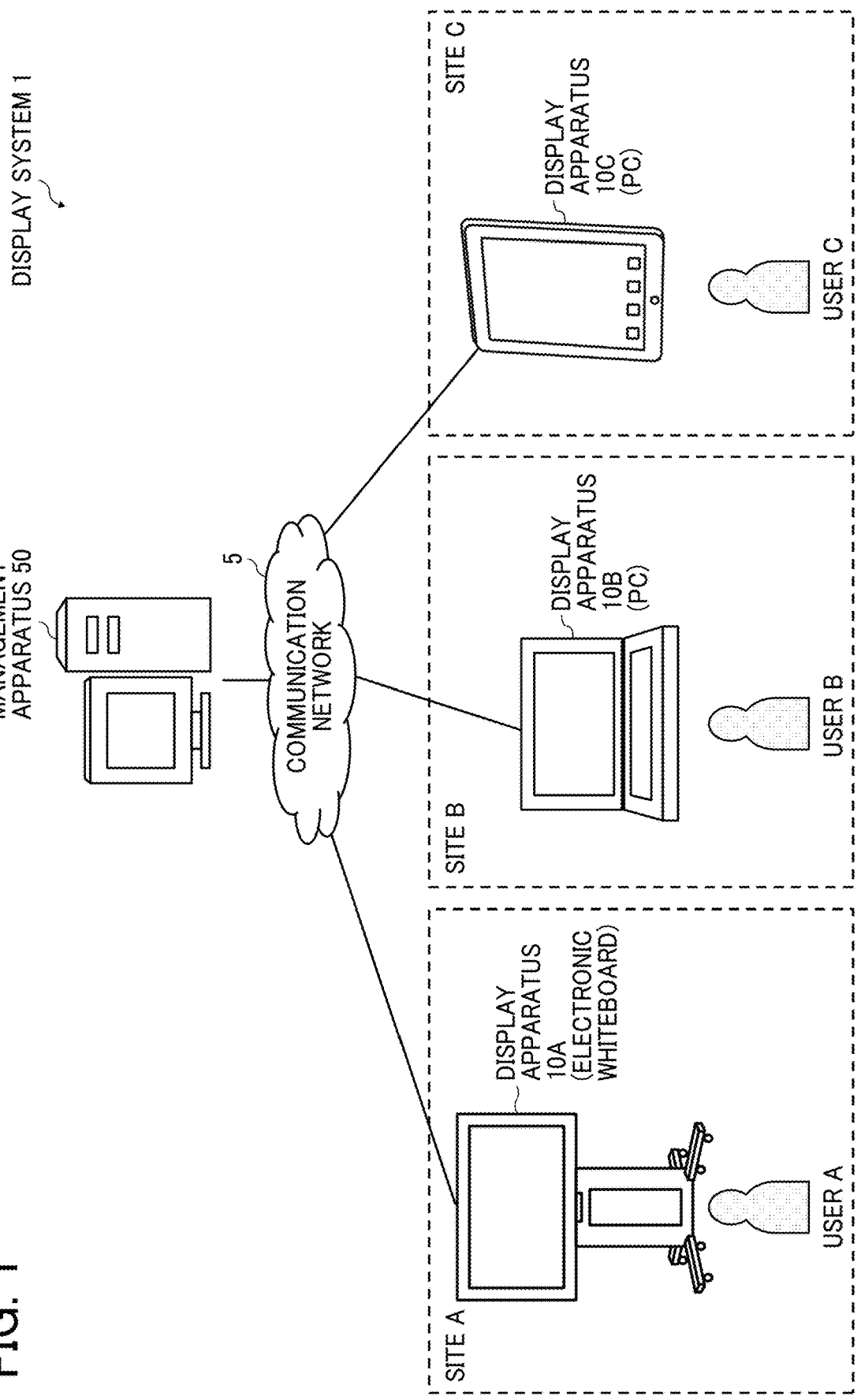
FIG. 1 is a schematic diagram illustrating an example of an overall configuration of a display system, according to an embodiment of the present disclosure.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Embodiments of the present disclosure are described with reference to the drawings. In the description of the drawings, the same elements are denoted by the same reference numerals, and redundant descriptions thereof are omitted.

Embodiment

System Configuration:

Referring to FIG. 1, an overview of a display system 1 is described according to an embodiment. FIG. 1 is a schematic diagram illustrating an example of an overall configuration of the display system 1. The display system 1 illustrated in FIG. 1 is a system that allows a plurality of display apparatuses 10 to share data that can be displayed on the display apparatuses.

As illustrated in FIG. 1, the display system 1 includes a display apparatus 10A, a display apparatus 10B, and a display apparatus 10C, which are respectively provided at different sites, e.g., a site A, a site B, and a site C, and a communication management apparatus 50. The display apparatus 10A, the display apparatus 10B, and the display apparatus 10C, and the communication management apparatus 50 included in the display system 1 are communicable with each other through a communication network 5. The communication network 5 is implemented by the Internet, a mobile communication network, a local area network (LAN), etc. The communication network 5 includes a network by not only wired communications but also a network by wireless communications such as 3rd generation (3G), 4th generation (4G), 5th generation (5G), Wireless Fidelity® (Wi-Fi), Worldwide Interoperability for Microwave Access (WiMAX) or Long Term Evolution (LTE).

Each of the display apparatus 10A, the display apparatus 10B, and the display apparatus 10C is a computer having a hand drafted input capability, a communication capability, and a display capability. The display apparatus 10A is, for example, an electronic whiteboard located at the site A. The display apparatus 10B is, for example, a mobile laptop computer used at the site B. The display apparatus 10C is, for example, a mobile tablet personal computer (PC) used at the site C. The display apparatus 10A, the display apparatus 10B, and the display apparatus 10C perform remote communication while sharing an object input by handwriting. Users A, B, and C conduct an event such as a teleconference while viewing a display screen in which display contents are shared at the sites. The teleconference is merely one example of the event. Examples of the event include, but are not limited to, a distance learning, a remote medical examination, an online meeting, an online consultation, and a simple conversation over the communication network 5.

In the present disclosure, "hand drafted input" relates to a user input such as handwriting, drawing and other forms of input. The hand drafted input may be performed via touch interface, with a tactile object such as a pen or stylus or with the user's body. The hand drafted input may also be performed via other types of input, such as gesture-based input, hand motion tracking input or other touch-free input by a user. The following discussion will refer to handwriting input and handwriting input data, but other forms of hand drafted input may be utilized and are within the scope of the present disclosure.

The display apparatus 10A, the display apparatus 10B, and the display apparatus 10C communicate screen information such as handwriting input data that is input by handwriting with one another. The handwriting input data is data used for displaying (reproducing) a display screen including objects handwritten by the user A, user B, and user C on the display apparatus 10A, the display apparatus 10B, and the display apparatus 10C, respectively. The handwriting input data includes, for example, coordinate data, line width data, line color data, vector data, and data indicating writing pressure at which a stroke is drawn.

The display apparatus 10A, the display apparatus 10B, and the display apparatus 10C exchange handwriting input data for displaying an object to be shared, to enable users using the display system 1 share the same object. The object is an image indicating a line, etc., written by the user by handwriting input with an electronic pen, for example. An object image representing the object is displayed based on the handwriting input data representing points that indicate coordinates on the display.

The electronic whiteboard and the PC are merely examples of the display apparatus 10. The electronic whiteboard can be any suitable apparatus installed with software that execute a handwriting input capability, a communication capability, and a display capability. Further, the PC includes, for example, a smartphone, a wearable terminal, a smartwatch, a car navigation terminal, a game console, a telepresence robot, and a medical device.

FIG. 1 illustrates an example in which the display system 1 includes the plurality of display apparatuses 10 (i.e., the display apparatus 10A, the display apparatus 10B, and the display apparatus 10C) at three sites (i.e., the site A, the site B, and the site C). In another example, the display system 1 may include the plurality of display apparatuses 10 at one site. In another example, the display system 1 includes the plurality of display apparatus 10 at two sites, in each of which the display apparatus is located or used. In still another example, the display system 1 includes the plurality of display apparatus 10 at four or more sites, in each of which the display apparatus 10 is located or used. In a case where the plurality of display apparatus 10 are located in one site, the number of sites can be one. In the following description, the display apparatus IDA, the display apparatus 10B, and the display apparatus 10C are referred to collectively as a "display apparatus 10", unless they need to be distinguished from each other.

The communication management apparatus 50 is a server computer that centrally manages login authentication from the display apparatus 10A, the display apparatus 10B, and the display apparatus 10C, communication statuses of the display apparatus 10A, the display apparatus 10B, and the display apparatus 10C, and screen data for sharing. Further, the communication management apparatus 50 relays the screen data to be shared among the display apparatus 10A, the display apparatus 10B, and the display apparatus 10C.

The communication management apparatus 50 can be implemented by a single server computer or can be implemented by a plurality of server computers. The description is given of an example in which the communication management apparatus 50 is a server computer that resides in a cloud environment. In another example, the communication management apparatus 50 is a server operating on the display apparatus 10 such as an electronic whiteboard. In still another example, the communication management apparatus 50 is a server that resides in an on-premises environment.

Figure 2:
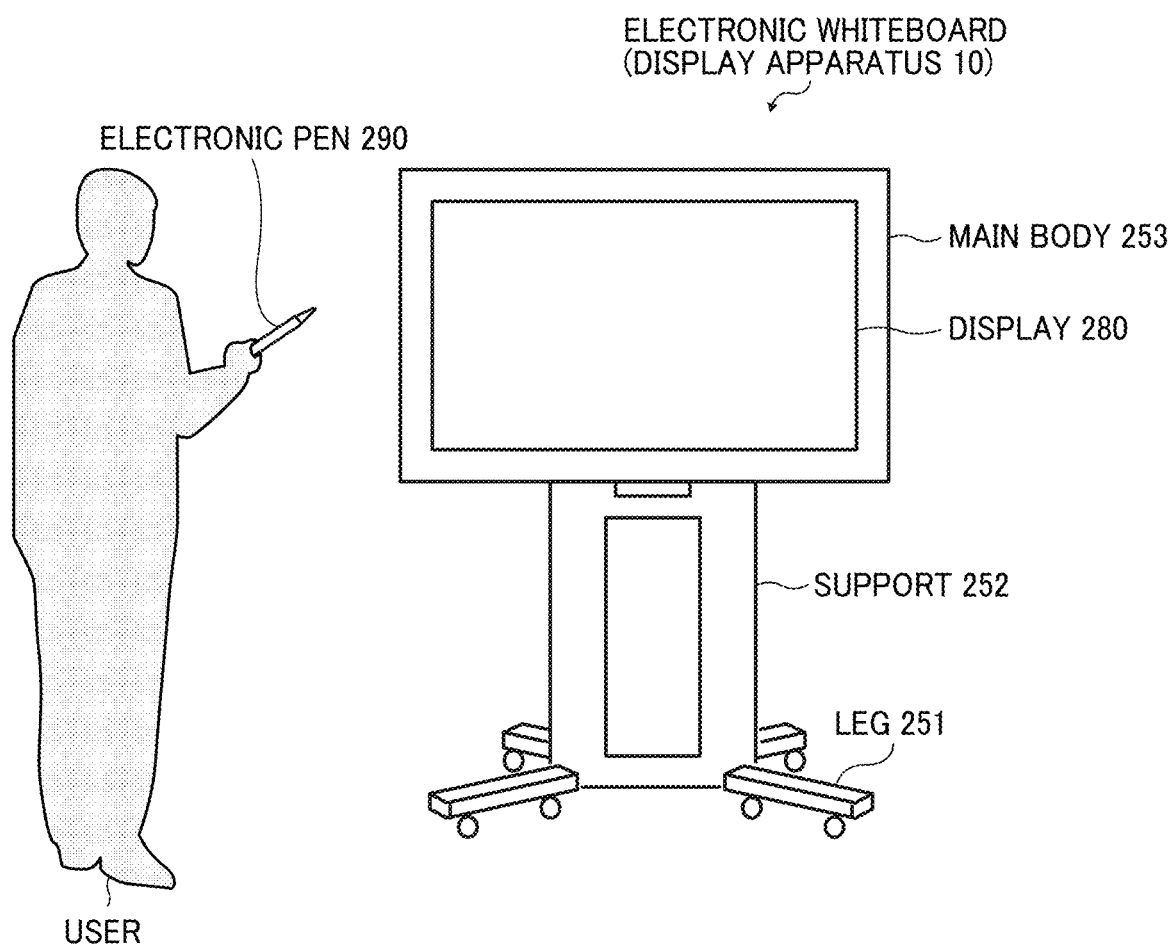
FIG. 2 is a diagram for describing an example of how an electronic whiteboard is used, according to an embodiment of the present disclosure.

Use Scenario of Electronic Whiteboard:

Referring to FIG. 2, a description is provided of how an electronic whiteboard as an example of the display apparatus 10 is used. FIG. 2 is a diagram for describing an example of how the electronic whiteboard is used. As illustrated in FIG. 2, the electronic whiteboard as an example of the display apparatus 10 includes a plurality of legs 251 each having a plurality of casters on the lower side, a support 252 provided on the upper side of the plurality of legs 251, and a main body 253 of the electronic whiteboard provided on top of the support 252, and a display 280 provided on the front surface of the main body 253. The main body 253 includes a central processing unit (CPU) 201 and the like described below. The user can input (draw) an object such as characters on the display 280 using an electronic pen 290. The display 280 is an example of a display (display device).

Figure 3:
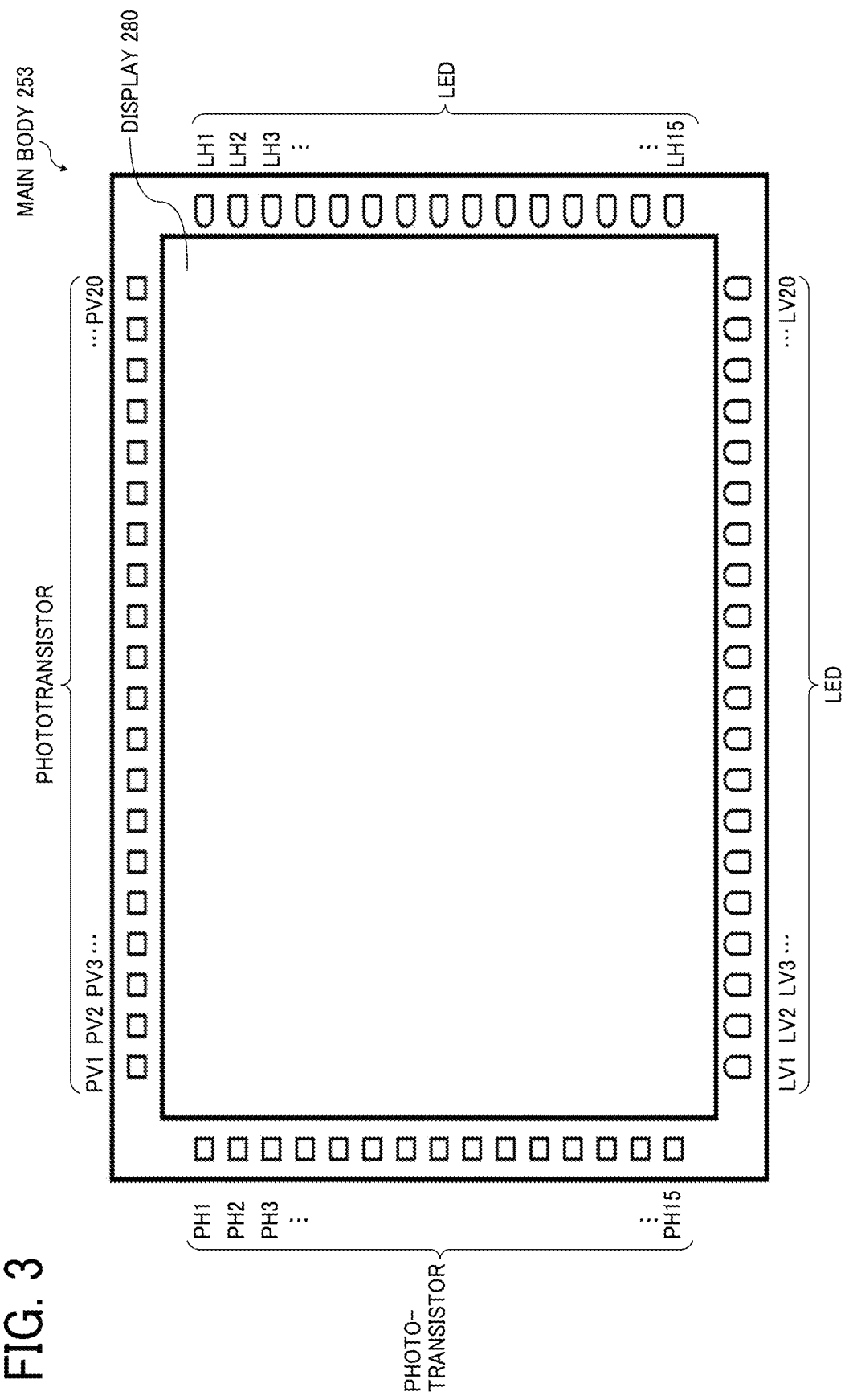
FIG. 3 is a schematic diagram illustrating an example of a configuration of an electronic whiteboard, according to an embodiment of the present disclosure.

FIG. 3 is a schematic diagram illustrating an example of a configuration of an electronic whiteboard. Light emitting diodes (LEDs) as light-emitting elements and phototransistors as light receiving elements are arranged in the main body 253 of the electronic whiteboard. As illustrated in FIG. 3, for example, the LEDs are arranged in one row below the display 280 of the electronic whiteboard and in one column to the right of the display 280. The phototransistors are arranged in one row above the display 280 and in one column to the left of the display 280. The LEDs and the phototransistors in one row an in one column are arranged at equal intervals, and the LEDs and the phototransistors are arranged so as to face each other vertically and horizontally.

Thus, the electronic whiteboard includes two light emitting/receiving element groups, one being a light emitting/receiving element group including the LEDs and the phototransistors arranged so as to face each other in the vertical direction, the other being light emitting/receiving element group including the LEDs and the phototransistors arranged so as to face each other in the horizontal direction. For example, the electronic whiteboard determines a position where light emitted from the LED is blocked and not detected by the phototransistors as a touched position, i.e., a position where a handwriting is input.

FIG. 3 illustrates an example in which twenty LEDs (LV1 to LV20) and twenty phototransistors (PV1 to PV20) are arranged at regular intervals in the horizontal direction and fifteen LEDs (LH1 to LH15) and fifteen phototransistors (PH1 to PH15) are arranged at regular intervals in the vertical direction to illustrate an example arrangement of the LEDs and the phototransistors at regular intervals. In another example, any other suitable number of LEDs and phototransistors are provided depending on a size of the display 280.

Figure 4:
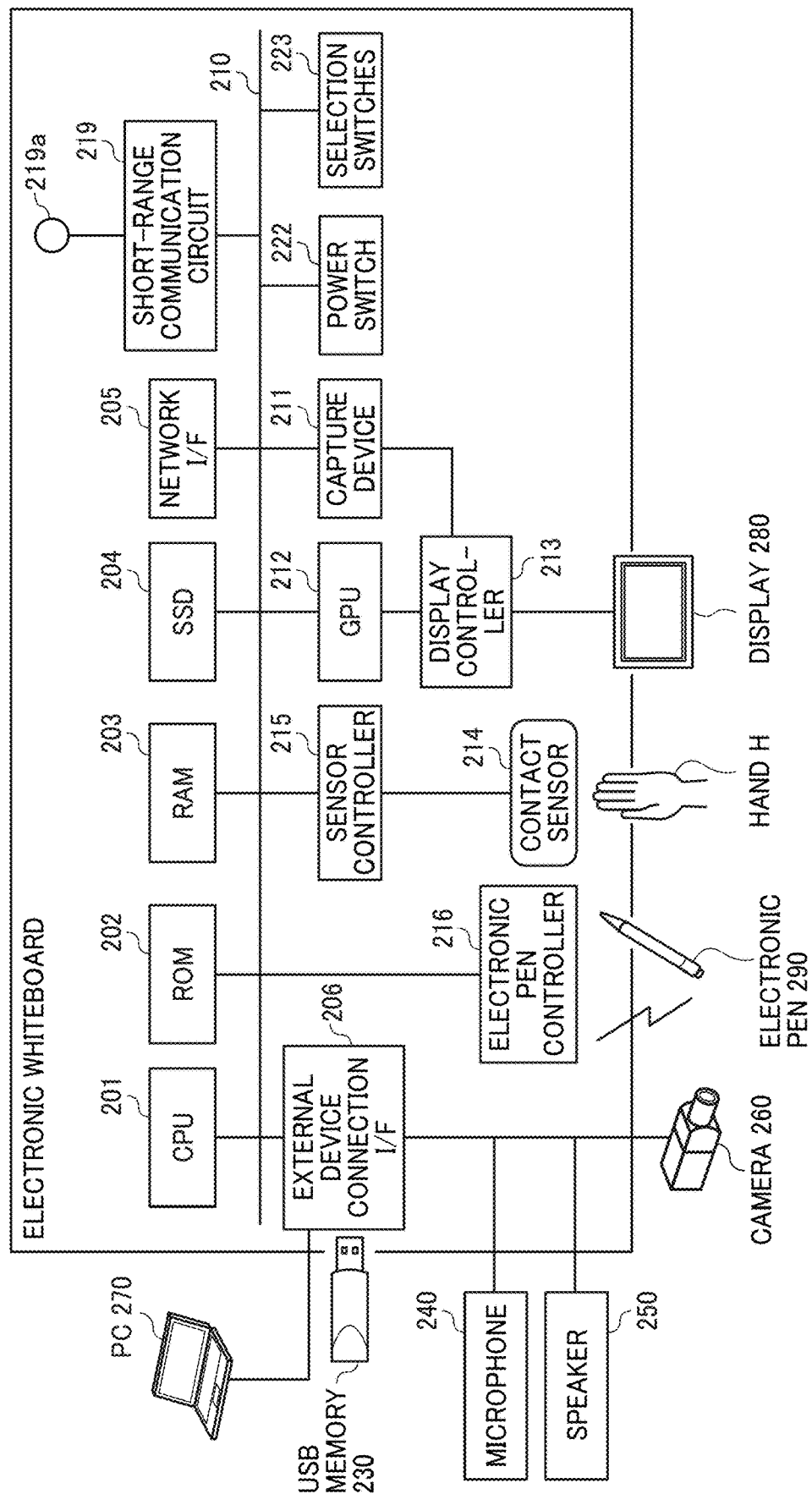
FIG. 4 is a block diagram illustrating an example of a hardware configuration of an electronic whiteboard, according to an embodiment of the present disclosure.
Figure 5:
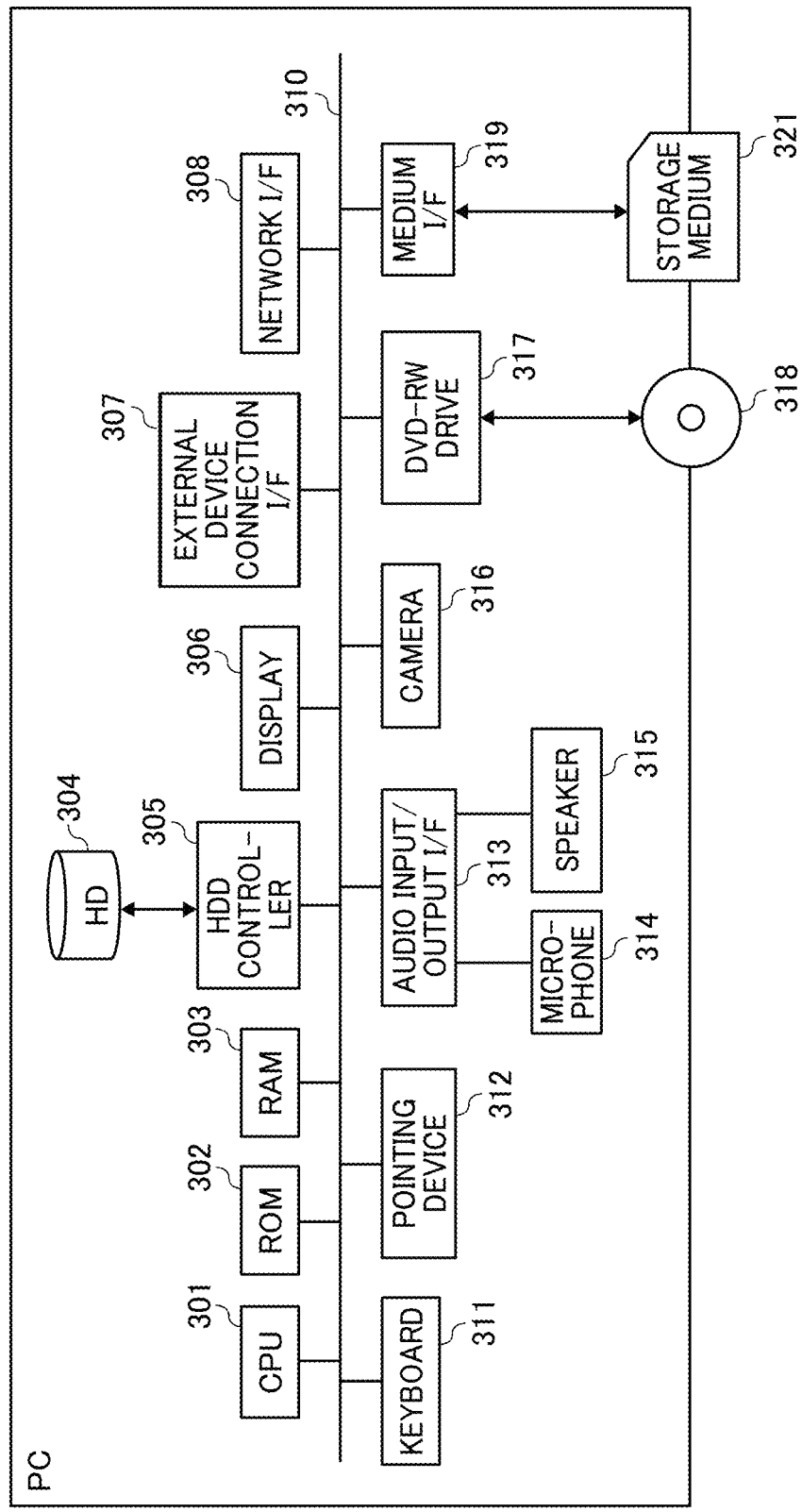
FIG. 5 is a block diagram illustrating an example of a hardware configuration of a personal computer (PC), according to an embodiment of the present disclosure.
Figure 6:
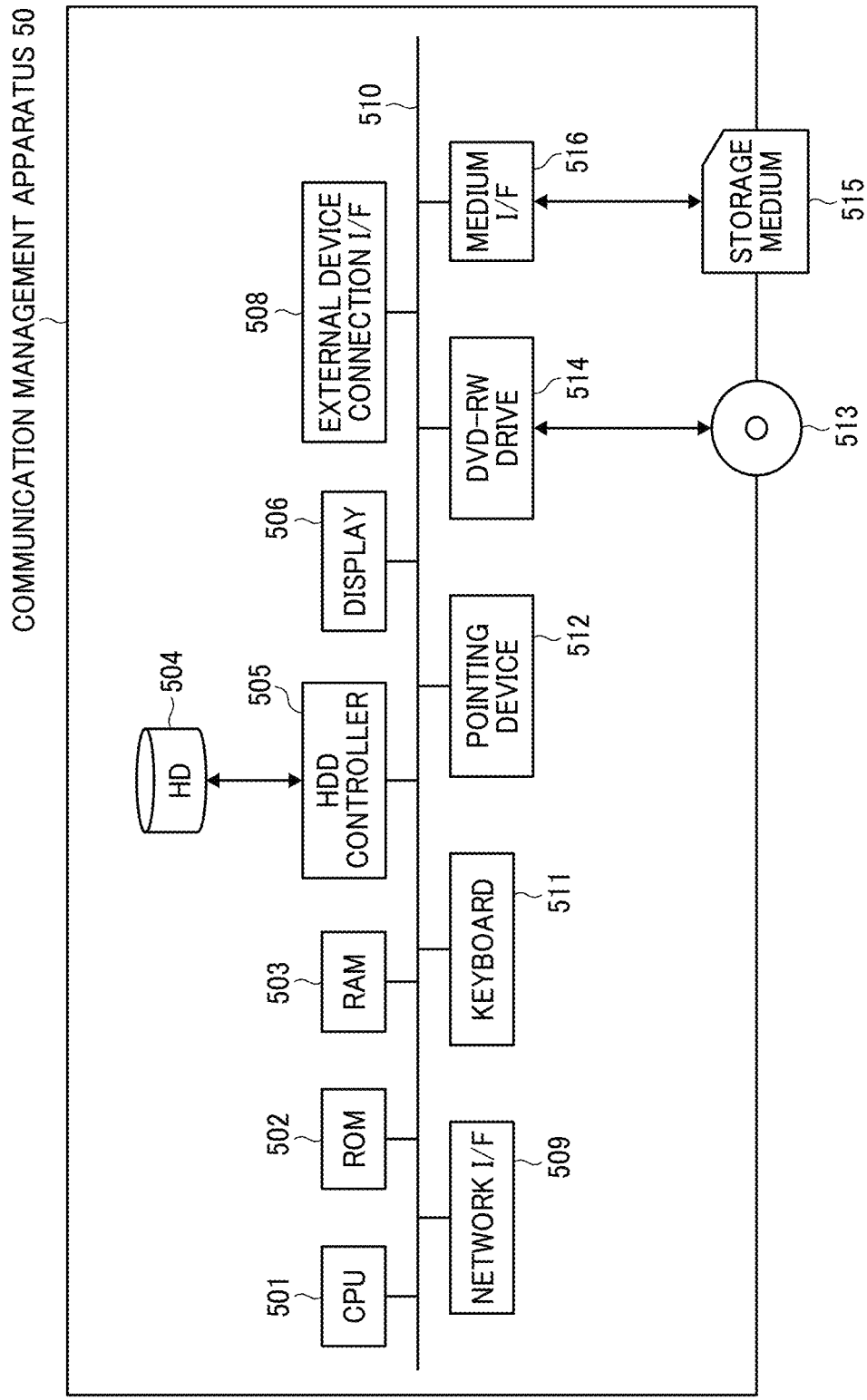
FIG. 6 is a block diagram illustrating an example of a hardware configuration of a communication management apparatus, according to an embodiment of the present disclosure.

Hardware Configuration:

Referring to FIG. 4 to FIG. 6, examples of hardware configurations of each apparatus, device, and terminal of the display system 1 are described, according to an embodiment. In the hardware configurations illustrated in FIG. 4 to FIG. 6, certain hardware elements may be added or omitted as needed.

Hardware Configuration of Electronic Whiteboard:

Referring to FIG. 4, a hardware configuration of the electronic whiteboard as an example of the display apparatus 10 is described. FIG. 4 is a block diagram illustrating an example of a hardware configuration of the electronic whiteboard. Each hardware element of the electronic whiteboard as an example of the display apparatus 10 is denoted by a reference numeral in 200 series. As illustrated in FIG. 4, the electronic whiteboard includes a CPU 201, a read only memory (ROM) 202, a random access memory (RAM) 203, a solid state drive (SSD) 204, a network interface (I/F) 205, and an external device connection I/F 206.

The CPU 201 controls overall operation of the electronic whiteboard. The ROM 202 stores a control program such as an initial program loader (IPL) to boot the CPU 201. The RAM 203 is used as a work area for the CPU 201. The SSD 204 stores various data such as a control program for the electronic whiteboard. The network I/F 205 controls communication with the communication network 5. The external device connection I/F 206 controls communication with an external device such as a universal serial bus (USB) memory 230, a PC 270, a microphone 240, a speaker 250, or a camera 260.

The electronic whiteboard further includes a capturing device 211, a graphics processing unit (GPU) 212, a display controller 213, a contact sensor 214, a sensor controller 215, an electronic pen controller 216, a short-range communication circuit 219, an antenna 219a of the short-range communication circuit 219, a power switch 222, and selection switches 223.

The capturing device 211 acquires image data of an image displayed on a display 280, as an example of a display (display device), under control of the display controller 213, and stores the image data in the RAM 203, for example. The GPU 212 is a semiconductor chip (processor) dedicated to processing a graphical image. The display controller 213 controls and manages a screen display to output an image output from the capturing device 211 or the GPU 212 to the display 280, for example. The contact sensor 214 detects a touch onto the display 280 with the electronic pen 290 or a user's hand H. The sensor controller 215 controls processing performed by the contact sensor 214. The contact sensor 214 senses a touch input to a specific coordinate on the display 280 using the infrared blocking system. More specifically, the display 280 is provided with two light receiving elements disposed on both upper side ends of the display 280, and a reflector frame surrounding the sides of the display 280. The light receiving elements emit a plurality of infrared rays in parallel to a surface of the display 280. The light receiving elements receive lights passing in the direction that is the same as an optical path of the emitted infrared rays, which are reflected by the reflector frame. The contact sensor 214 outputs an identifier (ID) of the infrared ray that is blocked by an object (such as the user's hand) after being emitted from the two light receiving elements, to the sensor controller 215. Based on the ID of the infrared ray, the sensor controller 215 detects a specific coordinate that is touched by the object. The electronic pen controller 216 communicates with the electronic pen 290 to detect contact by the tip or bottom of the electronic pen with the display 280. The short-range communication circuit 219 is a communication circuit that communicates in compliance with the near field communication (NFC), the Bluetooth®, and the like. The power switch 222 turns on or off the power of the electronic whiteboard. The selection switches 223 are a group of switches for adjusting brightness, hue, etc., of display on the display 280, for example.

The electronic whiteboard further includes a bus line 210. The bus line 210 is an address bus, a data bus, or the like, which electrically connects the elements in FIG. 4 such as the CPU 201.

The contact sensor 214 is not limited to the infrared blocking system type, and may be a different type of detector, such as a capacitance touch panel that identifies the contact position by detecting a change in capacitance, a resistance film touch panel that identifies the contact position by detecting a change in voltage of two opposed resistance films, or an electromagnetic induction touch panel that identifies the contact position by detecting electromagnetic induction caused by contact of an object to a display. In addition to or in alternative to detecting a touch by the tip or bottom of the electronic pen 290, the electronic pen controller 216 may also detect a touch by another part of the electronic pen 290, such as a part held by a hand of the user.

Hardware Configuration of PC:

Referring to FIG. 5, a hardware configuration of the PC as an example of the display apparatus 10 is described. FIG. 5 is a block diagram illustrating an example of a hardware configuration of the PC. Each hardware element of the PC as an example of the display apparatus 10 is denoted by a reference numeral in 300 series. As illustrated in FIG. 5, the PC includes a CPU 301, a ROM 302, a RAM 303, a hard disk (HD) 304, a hard disk drive (HDD) controller 305, a display 306, an external device connection I/F 307, a network I/F 308, a bus line 310, a keyboard 311, a pointing device 312, an audio input/output I/F 313, a microphone 314, a speaker 315, a camera 316, a digital versatile disk-rewritable (DVD-RW) drive 317, and a medium I/F 319.

The CPU 301 controls overall operation of the PC. The CPU 301 is an arithmetic device that reads programs and data stored in, for example, the ROM 302 or the HD 304 to the RAM 303 and executes processing according to the programs or data to implement functions of the PC. The ROM 302 is a nonvolatile memory in which a control program such as an IPL used for booting the CPU 301 are stored. The RAM 303 is a volatile memory used as a work area for the CPU 301. The HD 304 stores various data such as a control program. The HDD controller 305 controls reading or writing of various data to or from the HD 304 under control of the CPU 301. The display 306 displays various information such as a cursor, menu, window, characters, or image. In one example, the display 306 is a touch panel display provided with an input device. The display 306 is an example of a display (display device). The external device connection I/F 307 is an interface that connects the PC to various external devices. Examples of the external devices include, but are not limited to, a USB memory and a printer. The network I/F 308 is an interface that controls communication of data with an external device through the communication network 5. The bus line 310 is an address bus or a data bus, which electrically connects the hardware elements in FIG. 5 such as the CPU 301.

The keyboard 311 is an example of an input device (input means) including a plurality of keys for inputting characters, numerical values, various instructions, and the like. The pointing device 312 is an example of an input device (input means) that allows a user to select or execute a specific instruction, select a target for processing, or move a cursor being displayed. The keyboard 311 and the pointing device 312 are merely examples of the input device (input means). In another example, a touch panel, a voice input device, or the like is used as the input device (input means). The audio input/output I/F 313 is a circuit for inputting or outputting an audio signal to the microphone 314 or from the speaker 315 under control of the CPU 301. The microphone 314 is an example of audio collecting device, which is a built-in type, capable of inputting audio. The speaker 315 is an example of an output device, which is a built-in type, capable of outputting an audio signal. The camera 316 is an example of an imaging device, which is a built-in type, capable of capturing a subject obtain image data. Note that the microphone 314, the speaker 315, and the camera 316 may be an external device in alternative to the built-in device of the PC. The DVD-RW drive 317 controls reading or writing of various data from or to a DVD-RW 318, which is an example of a removable storage medium. In alternative to the DVD-RW, any storage medium may be used such as a digital versatile disk-recordable (DVD-R) and Blu-ray® disk. The medium I/F 319 controls reading or writing (storing) of data with from or to a storage medium 321 such as a flash memory.

Hardware Configuration of Communication Management Apparatus:

Referring to FIG. 6, a hardware configuration of the communication management apparatus 50 is described. FIG. 6 is a block diagram illustrating an example of a hardware configuration of the communication management apparatus 50. Each hardware element of the communication management apparatus 50 is denoted by a reference numeral in 500 series. The communication management apparatus 50 is implemented by a computer as illustrated in FIG. 6 including a CPU 501, a ROM 502, a RAM 503, an HD 504, an HDD controller 505, a display 506, an external device connection I/F 508, a network I/F 509, a bus line 510, a keyboard 511, a pointing device 512, a DVD-RW drive 514, and a medium I/F 516.

The CPU 501 controls overall operation of the communication management apparatus 50. The CPU 501 is an arithmetic device that reads programs and data stored in, for example, the ROM 502 or the HD 504 to the RAM 503 and executes processing according to the programs or data to implement functions of the communication management apparatus 50. The ROM 502 is a nonvolatile memory in which a control program such as an IPL used for booting the CPU 501 are stored. The RAM 503 is a volatile memory used as a work area for the CPU 501. The HD 504 stores various data such as a control program. The HDD controller 505 controls reading or writing of various data to or from the HD 504 under control of the CPU 501. The display 506 displays various information such as a cursor, menu, window, characters, or image. The external device connection I/F 508 is an interface that connects the communication management apparatus 50 to various external devices. Examples of the external devices include, but are not limited to, a USB memory. The network I/F 509 is an interface that controls communication of data with an external device through the communication network 5. The bus line 510 is, for example, an address bus or a data bus, which electrically connects the elements such as the CPU 501 illustrated in FIG. 6.

The keyboard 511 is an example of an input device including a plurality of keys for inputting characters, numerical values, various instructions, and the like. The pointing device 512 is an example of an input device that allows a user to select or execute a specific instruction, select a target for processing, or move a cursor being displayed. The DVD-RW drive 514 controls reading or writing of various data from or to a DVD-RW 513, which is an example of a removable storage medium. In alternative to the DVD-RW, any storage medium may be used such as a DVD-R and Blu-ray® disk. The medium I/F 516 controls reading or writing (storing) of data from or to a storage medium 515 such as a flash memory.

Any one of the above-described control programs may be recorded in a file in a format installable or executable on a computer-readable storage medium for distribution. Examples of the storage medium include, but are not limited to, a compact disk-recordable (CD-R), a DVD, a Blu-ray® disk, a secure digital (SD) card, and a USB memory. In addition, such storage medium may be provided in the form of a program product to users within a certain country or outside that country. For example, the display apparatus 10 executes the control program to implement a display control method according to the present disclosure.

Overview:

Referring to FIG. 7, a description is provided of a relation between a sharing area and display screens. The sharing area is shared between the display apparatus 10A, the display apparatus 10B, and the display apparatus 10C. The display screens are displayed by the display apparatus 10A, the display apparatus 10B, the display apparatus 10C, respectively. FIG. 7 is a schematic diagram illustrating a relation between the sharing area shared by a plurality of display apparatuses 10 and the display screens, each being displayed on each of the display apparatuses.

In FIG. 7, the display apparatus 10A, the display apparatus 10B, and the display apparatus 10C share objects drawn on their respective displays as a sharing area, to conduct an event such as a teleconference. The sharing area is a handwriting input area that is shared by a plurality of users and receives handwriting inputs by the plurality of users. The sharing area is also referred to as a whiteboard, a shared canvas, a handwriting input area, a drawing area, or a writing area, for example. The display apparatus 10A, the display apparatus 10B, and the display apparatus 10C exchange handwriting input data for displaying objects drawn on the display apparatuses. Thus, the sharing area is displayed on a display screen as being shared.

The sharing area is an expandable area. In other words, the sharing area is an area in which handwriting can be input without any size restrictions. The sharing area includes, for example, a so-called infinite canvas or a finite canvas. In other words, the sharing area is an area larger than an area that can be displayed on a display screen of the display apparatus 10. Accordingly, as illustrated in FIG. 7, each of the display apparatus 10A, the display apparatus 10B, and the display apparatus 10C displays at least a part of the sharing area on the display screen. The display apparatus 10A, the display apparatus 10B, and the display apparatus 10C displays a part of the sharing area instead of displaying the entire area. This makes it easy for a user to perform handwriting input and to recognize content of an object input by handwriting. Further, since the display apparatus 10A, the display apparatus 10B, and the display apparatus 10C can display different areas of the sharing area, the user can view a desired area while the event is being conducted.

When the handwriting input area is shared by the users at multiple sites, the users sometimes want to know operation content by other users at the other sites. In this case, as illustrated in FIG. 7, since a display area that is displayed on a given display apparatus 10 is a part of the sharing area shared with other display apparatuses 10, when an operation such as writing is performed by one or more other users outside the display area, the user of the given display apparatus 10 cannot smoothly recognize that the operation by one or more other user has been performed. Further, in order to check content of the operation performed outside the display area by one or more other users, the user has to perform an operation of moving the display area by enlarging or reducing the display area or scrolling the display area. This prevents the user from efficiently performing the user's own input operation to the handwriting input area and recognizing the content handwritten by one or more other users.

To address such an issue, the display system 1 displays, on a display screen of the display apparatus 10, a panoramic screen area, which includes handwriting input data (object) that is outside the display area displayed on the display apparatus 10, the panoramic screen area being superimposed on the display screen. Accordingly, when the user performs handwriting input on a displayed partial area of the handwriting input area, the display system 1 allows the user to recognize specific handwriting input contents through the panoramic screen area even in a case that one or more users at other sites performs an operation outside the displayed partial area. Further, when the user performs handwriting input on a displayed partial area of the handwriting input area, the display system 1 allows the user to efficiently perform an input operation on the handwriting input area and recognize contents of handwriting input by one or more other users.

Functional Configuration:

Referring to FIG. 8 to FIG. 13, a functional configuration of the display system 1 is described according to an embodiment. FIG. 8 is a diagram illustrating an example of a functional configuration of the display system 1. FIG. 8 illustrates a part of apparatuses and terminals of FIG. 1, which are related to processing or operation described below.

Functional Configuration of Display Apparatus:

Referring to FIG. 8, functional configurations of the display apparatus 10A, the display apparatus 10B, and the display apparatus 10C are described. Since the display apparatus 10A, the display apparatus 10B, and the display apparatus 10C have the same or substantially the same functions, the functions of the display apparatus 10 are described below. The display apparatus 10 includes a transmission/reception unit 11, a reception unit 12, a display control unit 13, a determination unit 14, a sharing area generation unit 15, a screen data creation unit 16, an image processing unit 17, a panoramic screen area generation unit 18, a panoramic screen area display unit 19, a display position calculation unit 21, an external device communication unit 22, and a storing/reading unit 29. These units are functions that are implemented by or that are caused to function by operating any of the hardware elements illustrated in FIG. 4 or FIG. 5 in cooperation with the instructions of the CPU 201 according to the control program expanded from the SSD 204 to the RAM 203 or the instruction of the CPU 301 according to the control program expanded from the HD 304 to the RAM 303. The display apparatus 10 further includes a storage unit 1000 that is implemented by the ROM 202, the SSD 204, or the USB memory 230 illustrated in FIG. 4, or the ROM 302, the HD 304, or the storage medium 321 illustrated in FIG. 5.

The transmission/reception unit 11 is mainly implemented by the network I/F 205 that operates according to instructions of the CPU 201, or the network I/F 308 that operates according to instructions of the CPU 301. The transmission/reception unit 11 transmits or receives various data or information to or from other apparatuses or terminals through the communication network 5. The transmission/reception unit 11 functions as an acquisition unit, for example, and acquires handwriting input data transmitted from another display apparatus 10.

The reception unit 12 is mainly implemented by the contact sensor 214 and the electronic pen controller 216 that operate according to instructions of CPU 201, or the pointing device 312 or the touch panel 309 that operates according to instructions of the CPU 301. The reception unit 12 receives various inputs from a user.

The display control unit 13 is mainly implemented by the display controller 213 that operates according to instructions of the CPU 201, or instructions of the CPU 301. The display control unit 13 controls the display 280 or the display 306 to display a drawn-image, or to access the communication management apparatus 50 using a web browser or the like to display various screen data. Specifically, the display control unit 13 activates and executes various applications that operate on an operating system (OS), to control the display 280 or the display 306 to display various screens drawn by an application programming interface (API) provided by the OS.

The determination unit 14, which is implemented by instructions of the CPU 201 or the CPU 301, performs various determinations. The sharing area generation unit 15, which is mainly implemented by instructions of the CPU 201 or the CPU 301, generates the sharing area that is displayed as being shared with the other display apparatuses 10.

The screen data creation unit 16, which is mainly implemented by instructions of the CPU 201 or the CPU 301, creates screen data of the sharing area. The screen data creation unit 16 functions as an acquisition unit, for example. The screen data creation unit 16 creates handwriting input data based on a stroke (handwriting input) of the electronic pen 190, for example, received by the reception unit 12, to acquire the handwriting input data. The screen data creation unit 16 converts an object obtained by, for example, the handwriting input on the display by a user into coordinate data. Further, the screen data creation unit 16 creates metadata relating to a display log of the display screen. The metadata and the handwriting input data created generated by the screen data creation unit 16 are examples of log data indicating a conduct history of conducted events.

The image processing unit 17, which is mainly implemented by instructions of the CPU 201 or the CPU 301, performs main processing of a handwriting input and a display function. For example, the image processing unit 17 generates an object image, which is an image of an object input by handwriting, based on the handwriting input data created by the screen data creation unit 16. Further, for example, the image processing unit 17 generates an object image for displaying, on the display of the display apparatus 10 itself, an object having the same content as an object that is input to another display apparatus 10 at another site, based on handwriting input data representing the object input to another display apparatus 10 received by the transmission/reception unit 11.

The panoramic screen area generation unit 18, which is mainly implemented by instructions of the CPU 201 or the CPU 301, generates a panoramic screen area representing an overview of a sharing area 700 generated in an event. In the disclosure, the panoramic screen area is, for example, an area in the sharing area 700, the panoramic screen area being lager than the display area displayed on the display screen. The panoramic screen area is generated based on handwriting input data (object) that is input to the sharing area 700. The panoramic screen area is, for example, an area including all handwriting input data (objects) that are input to the sharing area 700.

The panoramic screen area display unit 19 is mainly implemented by the display controller 213 that operates according to instructions of the CPU 201, or instructions of the CPU 301. The panoramic screen area display unit 19 displays the panoramic screen area generated by the panoramic screen area generation unit 18 on the display screen. For example, the panoramic screen area display unit 19 displays a reduced image obtained by reducing an image of the generated panoramic screen area at a predetermined scaling factor on the display screen, the image of the panoramic screen area being superimposed on the display screen.

The display position calculation unit 21, which is mainly implemented by instructions of the CPU 201 or the CPU 301, calculates a position on the sharing area corresponding to a position selected on the panoramic screen area.

The external device communication unit 22 is mainly implemented by the external device connection I/F 206 that operates according to instructions of the CPU 201, or the external device connection I/F 307 that operates according to instructions of the CPU 301. The external device communication unit 22 receives input of various data or information from the external device connected to the display apparatus 10.

The storing/reading unit 29, which is implemented by instructions of the CPU 201 or the CPU 301, stores various data or information in the storage unit 1000 or reads out various data or information from the storage unit 1000.

Functional Configuration of Communication Management Apparatus:

Referring to FIG. 8, a functional configuration of the communication management apparatus 50 is described according to the embodiment. The communication management apparatus 50 includes a transmission/reception unit 51, an authentication unit 52, an event information generation unit 53, a sharing area generation unit 54, an event information management unit 55, a panoramic screen information generation unit 56, a panoramic screen information management unit 57, a sharing area duplication unit 58, and a storing/reading unit 59. These units are functions that are implemented by or that are caused to function by operating any of the hardware elements illustrated in FIG. 6 in cooperation with the instructions of the CPU 501 according to the control program for the communication management apparatus, the control program being expanded from the HD 504 to the RAM 503. The communication management apparatus 50 further includes a storage unit 5000 that is implemented by the ROM 502, the HD 504, or the storage medium 515 illustrated in FIG. 6.

The transmission/reception unit 51 is mainly implemented by the network I/F 509 that operates according to instructions of the CPU 501. The transmission/reception unit 51 transmits or receives various data or information to or from other apparatuses or terminals through the communication network 5.

The authentication unit 52, which is implemented by instructions of the CPU 501, performs authentication processing of a user who participates in an event using the display apparatus 10.

The event information generation unit 53, which is mainly implemented by instructions of the CPU 501, generates event information relating to an event conducted by a user.

The sharing area generation unit 54, which is mainly implemented by instructions of the CPU 501, generates the sharing area that is displayed as being shared by the plurality of display apparatuses 10.

The event information management unit 55, which is mainly implemented by instructions of the CPU 501, manages the event information generated by the event information generation unit 53.

The panoramic screen information generation unit 56, which is mainly implemented by instructions of the CPU 501, generates panoramic screen information for specifying a panoramic screen area to be displayed on the display apparatus 10. The panoramic screen information management unit 57, which is mainly implemented by instructions of the CPU 501, manages the panoramic screen information generated by the panoramic screen information generation unit 56.

The sharing area duplication unit 58, which is mainly implemented by instructions of the CPU 501, duplicates a sharing area generated in an event. For example, the sharing area duplication unit 58 duplicates a sharing area including handwriting input data (object), to generate sharing area duplication data, which is data different from screen data forming the sharing area.

The storing/reading unit 59, which is implemented by instructions of the CPU 501, stores various data or information in the storage unit 5000 or reads out various data or information from the storage unit 5000.

User Information Management Table:

FIG. 9 is a conceptual diagram illustrating an example of a user information management table according to the embodiment. The user information management table stores user information identifying users who participate in an event. In the storage unit 5000, a user information management database (DB) 5001 is stored, for example, in the form of the user information management table as illustrated in FIG. 9. The user information management table stores the user information associating a user ID identifying a user, a user name, a password, and an e-mail address with each other. The e-mail address is an example of destination information indicating a user destination.

Event Information Management Table:

FIG. 10 is a conceptual diagram illustrating an example of an event information management table according to the embodiment. The event information management table stores the event information relating to an event conducted by a user. In the storage unit 5000, an event information management DB 5002 is stored, for example, in the form of the event information management table as illustrated in FIG. 10. The event information management table stores the event information associating an event ID identifying an event, an event name, an event date/time when the event is conducted, a participating user who participates in the event, and a file storage location where an event file generated in the event is stored with each other.

The event date/time indicates, for example, the date and time when the event file was updated most recently. In another example, the event date/time indicates the date and time when the corresponding event is first conducted. In still another example, the start date/time and the end date/time of the event are be stored. The participating user indicates a user name of a user who has participates in the event. Further, the file storage location indicates information of a storage destination in which various event files are stored. For example, the file storage location is a data path in the communication management apparatus 50. In another example, the file storage location is a uniform resource locator (URL) or a uniform resource identifier (URI) external to the communication management apparatus 50. Example of the event file stored in the file storage location includes, but are not limited to, a metadata file 500, a handwriting input data file 550, and sharing area data of an event generated by the sharing area generation unit 54.

Metadata File:

FIG. 11 is a view of an example of the metadata file 500 according to the embodiment. The metadata file 500 illustrated in FIG. 11 is an event file generated in a conducted event. The metadata file 500 indicates, as metadata, a log of operations performed on the display screen, such as moving, enlarging, or reducing the display screen, for each user. The metadata file 500 illustrated in FIG. 11 includes an event name ("Name",) a start time ("Start") and an end time ("End") of an event, and an operation log ("OperationLog") for each user. The operation log includes, as a display area ("ViewArea") for each user, area information indicating a coordinate position ("X", "Y") and a size ("Width", "Height") of the display area, and display log data indicating a display time ("Time").

The example illustrated in FIG. 11 indicates that an event named "Theme A, Regular meeting 1" was conducted from "Jan. 15, 2021, 13:00" to "Jan. 15, 2021, 15:00". Further, the example of FIG. 11 indicates that the display apparatus 10 used by a participant "userA" first displays an area whose upper left corner is at (X, Y)=(10, 310) of the sharing area and having a width of 100 pixels and a height of 80 pixels for 100 seconds, and the displayed area moves to an area whose upper left corner is (X, Y)=(100, 210) according to an operation by "user A". The area last displayed by the display apparatus 10 used by "userA" is an area of (X, Y)–(150, 130). Furthermore, the example of FIG. 11 indicates that an area last displayed by the display apparatus 10 used by "userB" is an area of (X, Y)=(105, 1200). Moreover, the example of FIG. 11 indicates that an area last displayed by the display apparatus 10 used by "userC" is an area of (X, Y)=(130, 1300). The metadata file 500 stores such an operation log for each user. Although FIG. 11 illustrates an example in which a data format of the metadata file 500 is a JavaScript Object Notation (Json) format, the metadata file 500 is in any other data format.

Handwriting Input Data File:

FIG. 12 is a view of an example of the handwriting input data file 550 according to the embodiment. The handwriting input data file 550 illustrated in FIG. 12 is an event file generated in a conducted event. The handwriting input data file 550 indicates, as object data, an operation log of handwriting input objects such as a stroke or a stamp. The handwriting input data file 550 illustrated in FIG. 12 includes a background color ("BackgroundColor") of the sharing area and object data ("Objects") indicating an input log of objects input by handwriting. The object data includes an object type ("Type"), detailed data information ("Data") indicating content of an object, a user name ("User") who has input the object, and a date/time ("Date") when the object has been input. Examples of the object type include, but are not limited to, a stroke and a stamp. When the object type is a stroke, for example, the detailed data information includes data of a trajectory ("Points") of coordinate positions of the stroke, a line thickness ("Thin"), and a line color ("Color"). When the object type is a stamp, for example, the detailed data information includes data of a coordinate position ("Points"), a size ("Size"), and an image file ("Image") of the stamp.

The example illustrated in FIG. 12 indicates that "userA" inputs, to the sharing area having a background color (BackgroundColor) of white, a black stroke having a thickness of five pixels from the coordinates (X, Y)=(10, 10) to (X, Y)=(30, 30) at "Jan. 15, 2021, 13:32". The example of FIG. 12 further indicates that, after the above input of the stroke, "userB" inputs an image file "Circle.jpg" having a size of 20 pixels×20 pixels at a position with coordinates (X, Y)=(100, 200) as the left upper corner at "Jan. 15, 2021, 13:40". The handwriting input data file 550 stores such object data for each object that is input. Although FIG. 12 illustrates an example in which a data format of the handwriting input data file 550 is a Json format, the handwriting input data file 550 is in any other data format. The stroke and the stamp merely examples of the object type. In another example, the object type includes texts obtained by applying optical character reader (OCR) processing to strokes representing symbols such as characters or numbers, system-generated characters such as date or time, certain figures such as triangles, stars or circles, or lines such as arrows, line segments, or Bezier curves.

In another example, the metadata file 500 and the handwriting input data file 550 are stored in the storage unit 1000 of the display apparatus 10 participating in the event, in addition to in the storage unit 5000 of the communication management apparatus 50. In this case, the display apparatus 10 stores the log data including metadata indicating an operation log of operations by a user who uses the display apparatus 10 and handwriting input data in the storage unit 1000. In another example, in a case the display apparatus 10 has a server function, metadata including operation logs of operations by all users participating in an event and handwriting input data are stored in the storage unit 1000.

Panoramic Screen Information Management Table:

FIG. 13 is a conceptual diagram illustrating an example of a panoramic screen information management table according to the embodiment. The panoramic screen information management table manages the panoramic screen information specifying a panoramic screen area displayed on the display apparatus 10 participating in an event. In the storage unit 5000, a panoramic screen information management DB 5003 is stored, for example, in the form of the panoramic screen information management table as illustrated in FIG. 13. The screen information management table stores, for each event ID identifying an event, the panoramic screen information that associates area data, a display size, and information of a display user with each other. The area data indicates a position (area) of a panoramic screen area on a sharing area. The display size indicates a size of the panoramic screen area displayed on the display screen. The display user information indicates a user who uses the display apparatus 10 displaying the panoramic screen.

The area data indicates a range (width Dx, height Dy) of the panoramic screen area on the sharing area in the form of coordinate information. When the display size of the panoramic screen is fixed, information "fixed" is assigned in the display size. When the display size of the panoramic screen is variable, information of the corresponding display size (e.g., "large" or "small") is assigned in the display size. In the display user, information (user ID or user name) identifying a user who uses the display apparatus 10 displaying the panoramic screen on the display screen is assigned.

Figure 14:
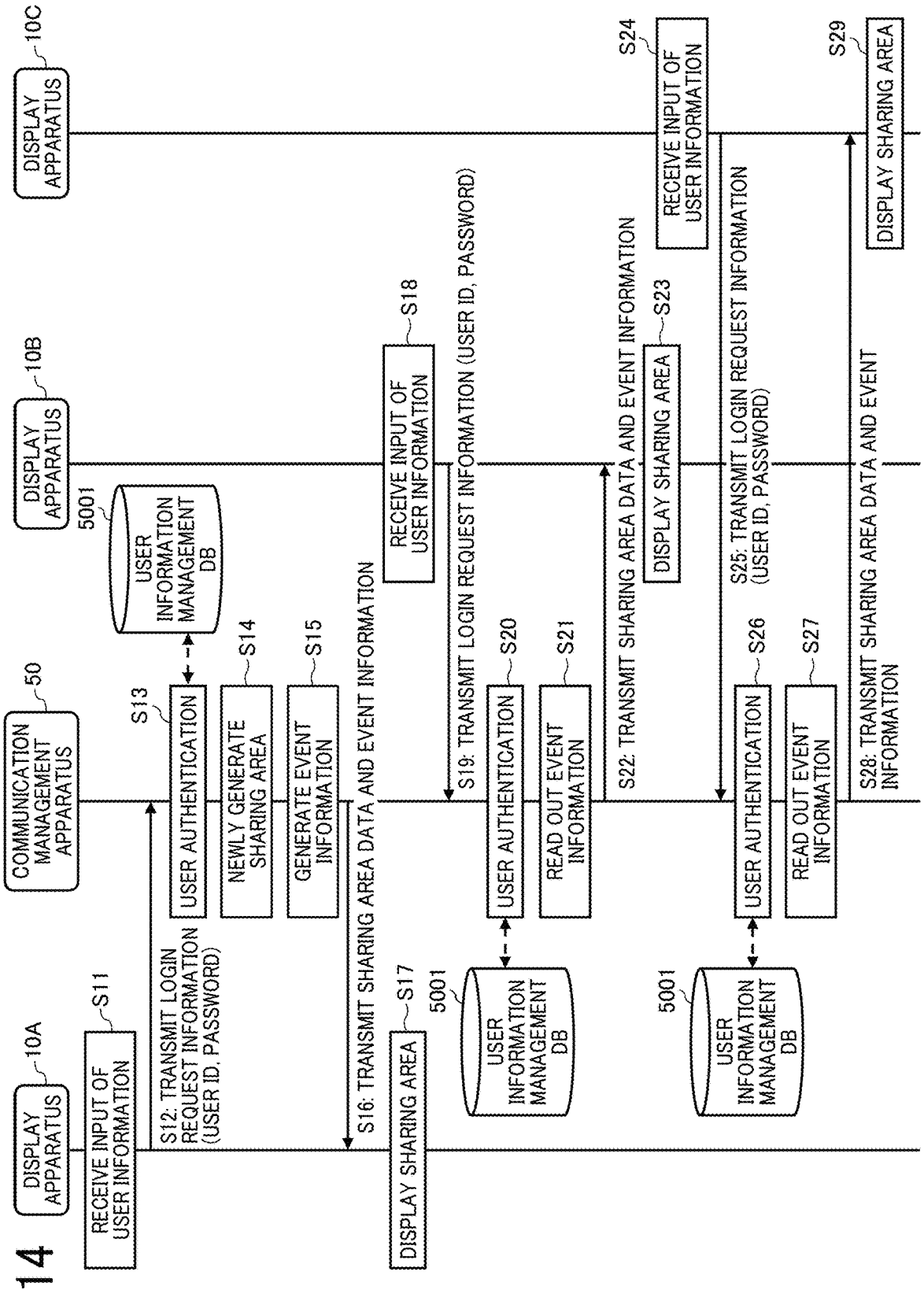
FIG. 14 is a sequence diagram illustrating an example of an operation of displaying a screen at the start of an event, according to an embodiment of the present disclosure.

Processes or Operation of Embodiment:

Operation at Event Start:

Referring to FIG. 14 to FIG. 42, processes and operations performed by the display system 1 according to the embodiment is described. First, referring to FIG. 14 and FIG. 15, a display screen displayed on the display apparatus 10 at the start of an event is described. FIG. 14 is a sequence diagram illustrating an example of operation of displaying a screen at the start of an event.

First, in response to an operation by the user A to the input device of the display apparatus 10A, the reception unit 12A of the display apparatus 10A receives an input of a user ID and a password (step S11). Next, the transmission/reception unit 11A transmits login request information to the communication management apparatus 50 (step S12). The login request information includes the user ID and password received in step S11. Thereby, the transmission/reception unit 51 of the communication management apparatus 50 receives the login request information transmitted from the display apparatus 10A.

Next, the authentication unit 52 of the communication management apparatus 50 performs user authentication using the user ID and password received in step S12 (step S13). Specifically, the storing/reading unit 59 searches the user information management DB 5001 (see FIG. 9) using a set of the user ID and the password received in step S12 as a search key, to determine whether the same set of the user ID and the password is stored. When the same set of the user ID and the password is stored, the authentication unit 52 determines that the user A who has sent the login request is an authorized user. When the same set of the user ID and the password is not stored, the authentication unit 52 determines that the user A who has sent the login request is not authorized (unauthorized) user. When the user A is an unauthorized user, the transmission/reception unit 51 transmits, to the display apparatus 10A, a notification indicating that the user A is an unauthorized user. In the following, an example in which the user A is an authorized user is described.

Next, the sharing area generation unit 54 newly generates a sharing area, which is a handwriting input area that is displayed as being shared by a plurality of display apparatuses (step S14). Next, the event information management unit 55 generates event information relating to an event to be started (step S15). Specifically, the event information generated in step S15 is information indicating an event ID identifying the event, an event name, a start time of the event, and a storage location where an event file generated in the event is stored. The event information management unit 55 stores the generated event information in an event information management DB 5002 (see FIG. 10) via the storing/reading unit 59.

Next, the transmission/reception unit 51 transmits data of the sharing area generated in step S14 and the event information generated in step S15 to the display apparatus 10A (step S16). Thereby, the transmission/reception unit 11A of the display apparatus 10A receives the data of the sharing area and the event information transmitted from the communication management apparatus 50.

Figure 15:
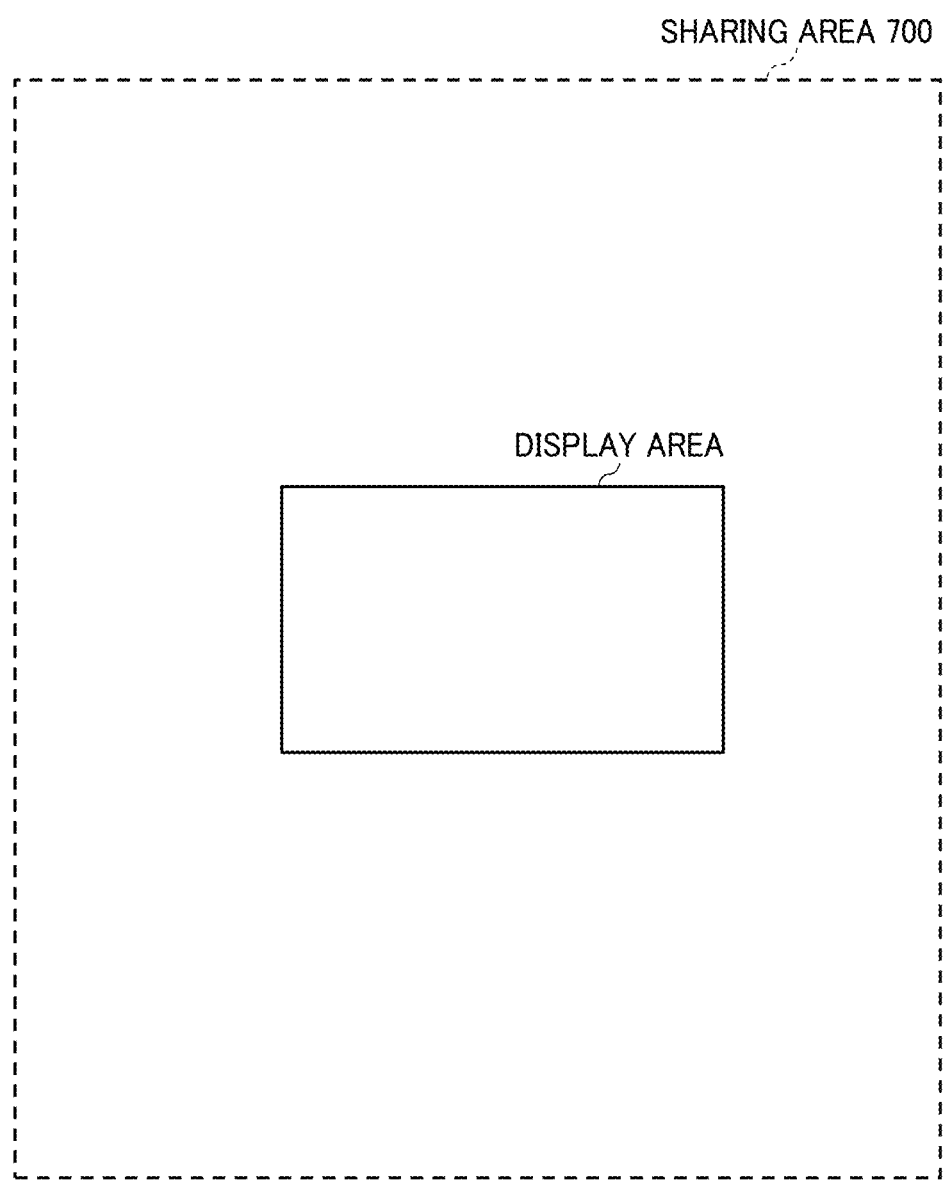
FIG. 15 is an illustration of an example of a sharing area, according to an embodiment of the present disclosure.

Then, the display control unit 13A of the display apparatus 10A controls the display (e.g., the display 280 or the display 306) to display a sharing area 700 represented by the data of the sharing area received in step S16 (step S17). FIG. 15 is an illustration of an example of the sharing area 700. The sharing area 700 illustrated in FIG. 15 is a handwriting input screen that is displayed as being shared with one or more other display apparatuses 10 in the event. The sharing area 700 is a state in which multiple objects are input by handwriting input operations performed by users participating in the event on the display screen. As illustrated in FIG. 15, since the sharing area 700 has an area sufficiently larger than a display area on the display screen of the display apparatus 10, at least a part of the sharing area 700 is displayed as the display area on the display screen of the display apparatus 10. The user participating in the event displays a desired area of the sharing area 700 in the event, to perform handwriting input of an object.

The positions of coordinates of the display area are expressed by display coordinates in which the origin is a pixel position at an upper left corner of the display screen of the display apparatus 10, the rightward direction is a positive direction of an X axis, and a downward direction is a positive direction of a Y axis. In other words, the display coordinates are the number of pixels in the X-axis direction from the pixel at the origin position, and the number of pixels in the Y-axis direction from the pixel at the origin position. The coordinates of the sharing area 700 are represented by display coordinates in which the origin is a pixel position at an upper left corner of the display area that is initially displayed on the display apparatus 10A in an event, the rightward direction is a positive direction of the X axis, the leftward direction is a negative direction of the X axis, the downward direction is a positive direction of the Y axis, and the upward direction is a negative direction of the Y axis.

Further, in substantially the same manner as the above-described processing by the display apparatus 10A, in response to an operation by the user B to the input device of the display apparatus 10B, the reception unit 12B of the display apparatus 10B receives an input of user information including a user ID and a password (step S18). Next, the transmission/reception unit 11B transmits login request information to the communication management apparatus 50 (step S19). The login request information includes the user ID and password received in step S18. Thereby, the transmission/reception unit 51 of the communication management apparatus 50 receives the login request information transmitted from the display apparatus 10B.

Next, the authentication unit 52 of the communication management apparatus 50 performs user authentication using the user ID and password received in step S19 in substantially the same manner as processing of step S13 (step S20). Next, based on the completion of authentication of the user B by the authentication unit 52, the event information management unit 55 reads the event information generated in step S15 from the event information management DB 5002 via the storing/reading unit 59 (step S21).

Next, the transmission/reception unit 51 transmits, to the display apparatus 10B, data of the sharing area generated in step S14, and the event information read in step S21 (step S22). Thereby, the transmission/reception unit 11B of the display apparatus 10B receives the data of the sharing area and the event information transmitted from the communication management apparatus 50. Then, the display control unit 13B of the display apparatus 10B controls the display device (e.g., the display 280 or the display 306) to display the sharing area 700 represented by the received data of the sharing area, in substantially the same manner as processing by the display apparatus 10A in step S17 (step S23).

Further, in substantially the same manner as the above-described processing by each of the display apparatus 10A and the display apparatus 10B, in response to an operation by the user C to the input device of the display apparatus 10C, the reception unit 12C of the display apparatus 10C receives an input of user information including a user ID and a password (step S24). Next, the transmission/reception unit 11C transmits login request information to the communication management apparatus 50 (step S25). The login request information includes the user ID and password received in step S24. Thereby, the transmission/reception unit 51 of the communication management apparatus 50 receives the login request information transmitted from the display apparatus 10C.

Next, the authentication unit 52 of the communication management apparatus 50 performs user authentication using the user ID and password received in step S25 in substantially the same manner as processing of step S13 and step S20 (step S26). Next, based on the completion of authentication of the user C by the authentication unit 52, the event information management unit 55 reads the event information generated in step S15 from the event information management DB 5002 via the storing/reading unit 59 (step S27).

Next, the transmission/reception unit 51 transmits, to the display apparatus 10C, data of the sharing area generated in step S14, and the event information read in step S27 (step S28). Thereby, the transmission/reception unit 11C of the display apparatus 10C receives the data of the sharing area and the event information transmitted from the communication management apparatus 50. Then, the display control unit 13C of the display apparatus 10C controls the display device (e.g., the display 280 or the display 306) to display the sharing area 700 represented by the received data of the sharing area, in substantially the same manner as processing by the display apparatus 10A in step S17 and processing by the display apparatus 10 in step S23 (step S29).

Thus, the display system 1 allows the plurality of display apparatuses 10 participating in the event to share and display the sharing area 700 as the handwriting input screen.

Figure 18:
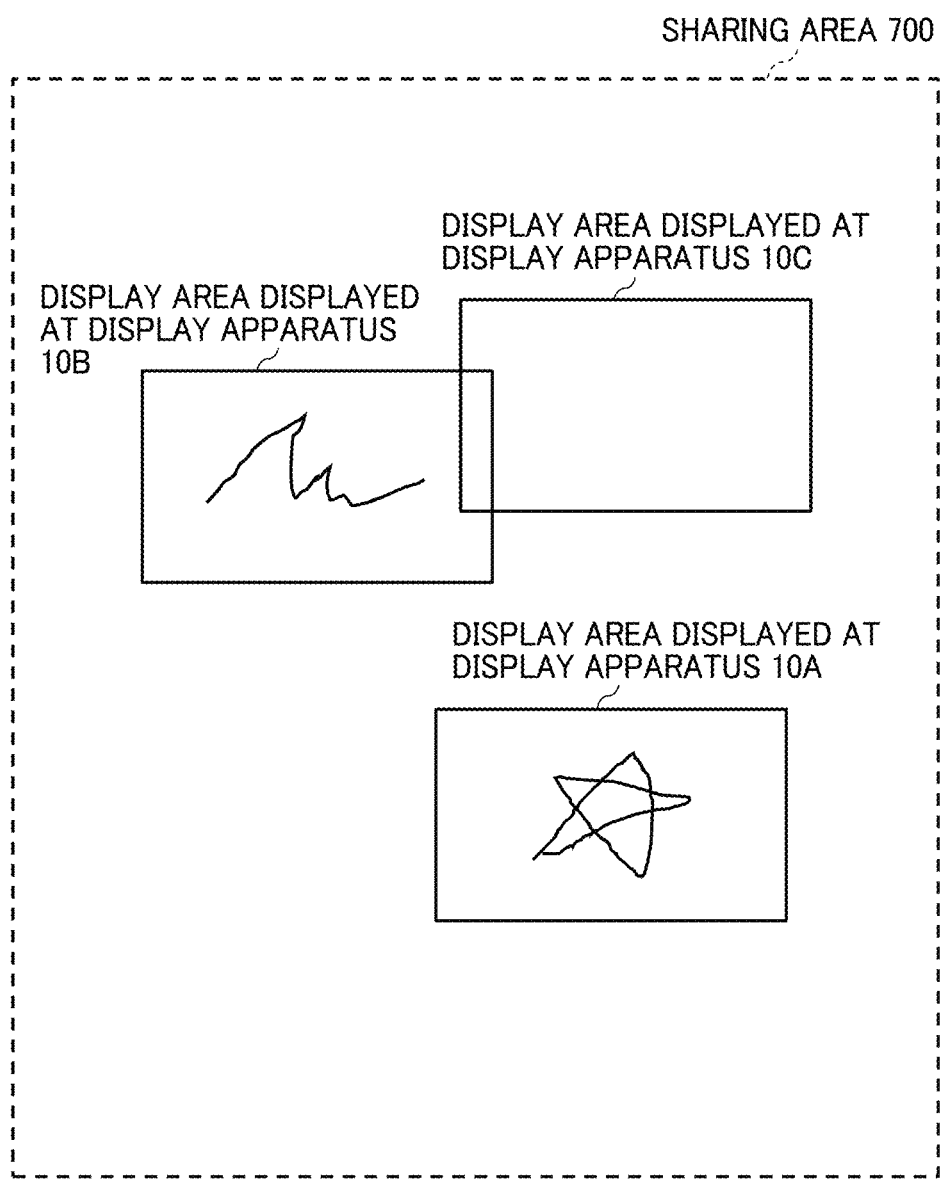
FIG. 18 is an illustration for describing an example of a display area displayed on the display apparatus, according to an embodiment of the present disclosure.

Operation of Sharing Handwriting Input Data:

Referring to FIG. 16 to FIG. 18, operation of sharing handwriting input data that is input by a user on the display screen (handwriting input screen) is described. FIG. 16 is a sequence diagram illustrating an example of operation of sharing handwriting input data. FIG. 17A to FIG. 17C are illustrations for describing an example of handwriting input process by the display apparatus 10. A description provided with reference to FIG. 16 and FIG. 17A to FIG. 17C is of an example in which handwriting input data that is input to the display apparatus 10A is shared by the display apparatus 10B and the display apparatus 10C. In another example, the same or substantially the same operation is performed when handwritten input data that is input to the display apparatus 10B is shared by the display apparatus 10A and the display apparatus 10C and when handwriting input data that is input to the display apparatus 10C is shared by the display apparatus 10A and the display apparatus 10C.

First, as illustrated in FIG. 17A, it is assumed that a part of the sharing area 700 is displayed as a display area, on the display screen of the display apparatus 10A. For example, in response to the user A's operation of scrolling the display screen, the display control unit 13A changes the display area displayed on the display screen as illustrated in FIG. 17B (step S31). Next, for example, when the user A moves the electronic pen 290 or the user's hand H with the electronic pen or the hand H being in contact with the display device, the reception unit 12A receives a handwriting input such as a stroke (trajectory) of the movement (step S32). The screen data creation unit 16A creates handwriting input data (e.g., coordinate data (x, y)) for displaying an object on the two-dimensional display device based on the input stroke, for example (step S33). Then, the display control unit 13A displays an object image as illustrated in FIG. 17C on the display screen (step S34).

Next, the transmission/reception unit 11A of the display apparatus 10A transmits the handwriting input data created in step S33 to the communication management apparatus 50 (step S35). Thereby, the transmission/reception unit 51 of the communication management apparatus 50 receives the handwriting input data transmitted from the display apparatus 10A. Transmission The event information management unit 55 of the communication management apparatus 50 updates the handwriting input data file 550 stored in the storage unit 5000 based on the handwriting input data received in step S35 (step S36). In this case, as illustrated in FIG. 12, the event information management unit 55 stores the handwriting input data received by the transmission/reception unit 51 in the event file of the event being executed in the order of occurrence (sequence order).

Next, the transmission/reception unit 51 transmits the handwriting input data received in step S35 to the display apparatus 10B (step S37). Thereby, the transmission/reception unit 11B of the display apparatus 10B receives the handwriting input data transmitted by the display apparatus 10A. The transmission/reception unit 51 also transmits the handwriting input data received in step S35 to the display apparatus 10C (step S38). Thereby, the transmission/reception unit 11C of the display apparatus 10C receives the handwriting input data transmitted by the display apparatus 10A.

Thus, the display system 1 allows multiple display apparatuses 10 to share handwriting input data that is input at the display apparatus 10 (e.g., the display apparatus 10A) with other display apparatuses (e.g., the display apparatus 10B and the display apparatus 10C). This allows the multiple display apparatuses 10 participating in an event to share the sharing area 700 including the handwriting input data that is input during the event.

Referring to FIG. 18, a display area displayed on each display apparatus 10 is described. FIG. 18 is an illustration for describing an example of a display area displayed on the display apparatus 10. As illustrated in FIG. 18, the display apparatus 10A, the display apparatus 10B, and the display apparatus 10C can display different areas respectively among areas included in the sharing area 700 as display areas on the respective display screens. Each display apparatus 10 generates and displays an object image at a coordinate position corresponding to the display area to be displayed on the display screen in the sharing area 700 based on shared handwriting input data. In the disclosure, the display area displayed on the display screen is an example of a first area, the display area being at least a part of the sharing area 700.

Figure 19:
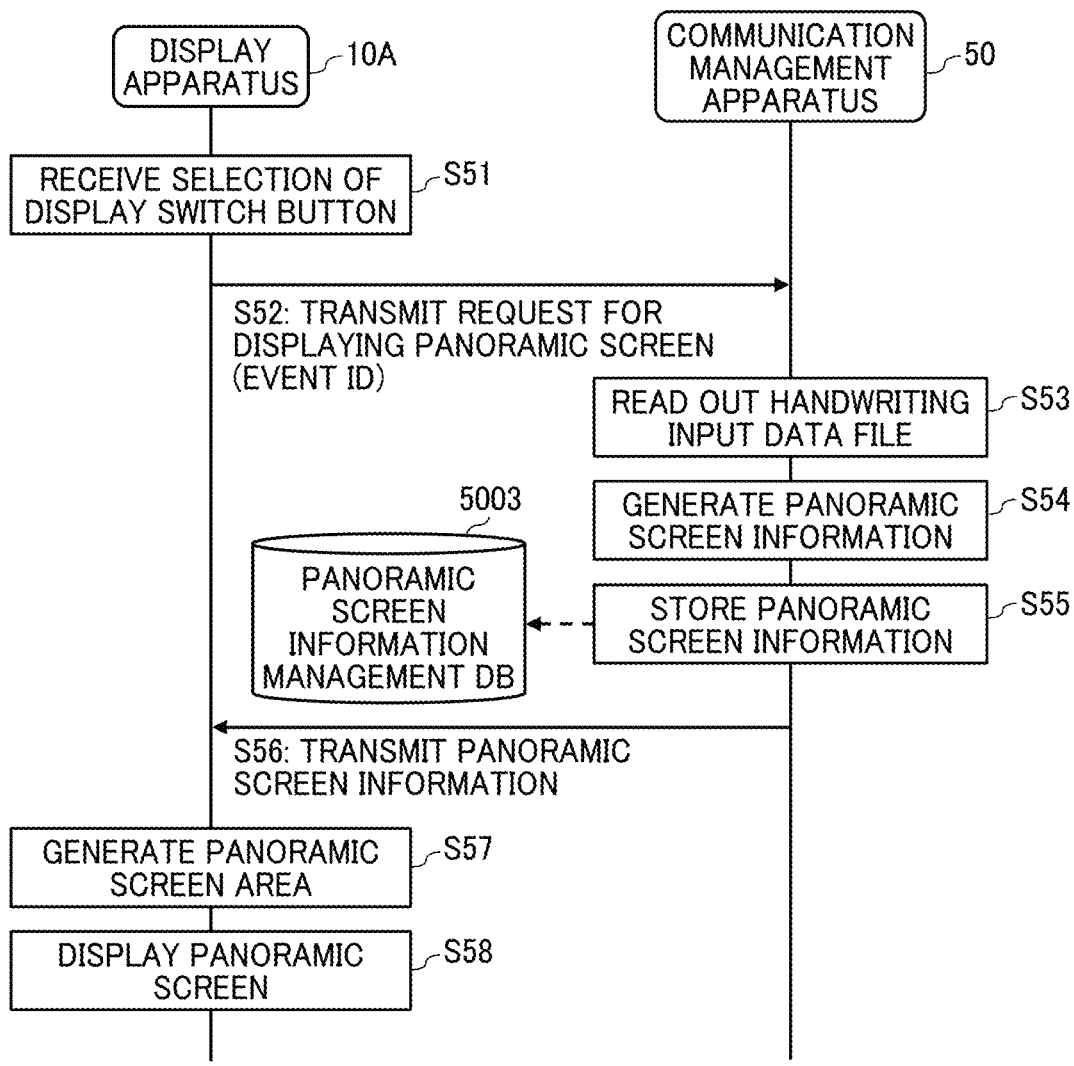
FIG. 19 is a sequence diagram illustrating an example of operation of displaying a panoramic screen, according to an embodiment of the present disclosure.

Operation of Displaying Panoramic Screen:

Referring to FIG. 19 to FIG. 22, operation of displaying a panoramic screen representing an overview of the sharing area 700 generated in an event on the display screen of the display apparatus 10 is described. A description provided with reference to FIG. 19 to FIG. 22 is of an example in which the display apparatus 10A displays the panoramic screen. In another example, each of the display apparatus 10B and the display apparatus 10C displays the panoramic screen in the same or substantially the same manner. FIG. 19 is a sequence diagram illustrating an example of operation of displaying the panoramic screen. The display size of the panoramic screen is fixed or variable. FIG. 19 illustrates an example in which the display size of the panoramic screen is fixed.

Figure 20:
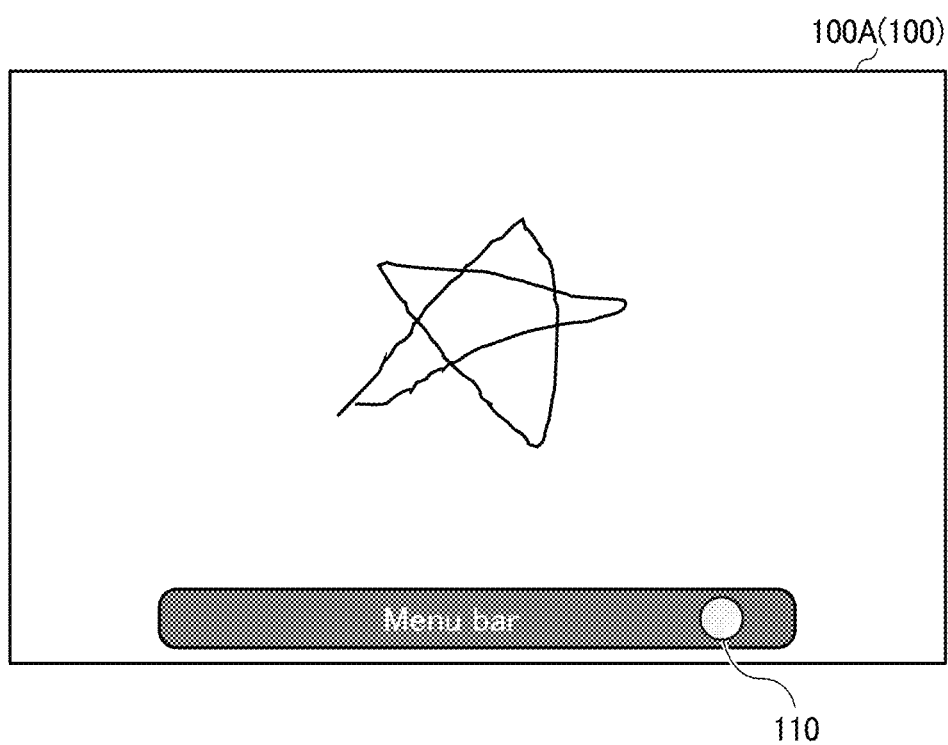
FIG. 20 is an illustration of an example of a display screen, according to an embodiment of the present disclosure.

FIG. 20 is an illustration of an example of a display screen displayed on the display apparatus 10A. A display screen 100A of the display apparatus 10A illustrated in FIG. 20 displays a partial area of the sharing area 700 shared with other display apparatus 10, and includes a display switch button 110 for switching whether to display the panoramic screen. In the disclosure, the panoramic screen is a screen that displays the sharing area 700 including an area that is not displayed on the display screen. The panoramic screen displays an area including all handwriting input data items (objects) that are input to the sharing area 700. The display screen 100A illustrated in FIG. 20 is in a state (non-display state) in which the panoramic screen is not displayed. The display switch button 110 is an example of a switch means or a graphical representation for switching between display of the panoramic screen area and non-display of the panoramic screen area.

The reception unit 12A of the display apparatus 10A receives selection of the display switch button 110 according to an input operation by the user A on the display screen 100A (step S51). Next, the transmission/reception unit 11A transmits, to the communication management apparatus 50, a panoramic screen display request indicating a request for displaying of the panoramic screen (step S52). The panoramic screen display request includes an event ID of an event conducted by the display apparatus 10A. Thereby, the transmission/reception unit 51 of the communication management apparatus 50 receives the panoramic screen display request transmitted from the display apparatus 10A.

Figure 21:
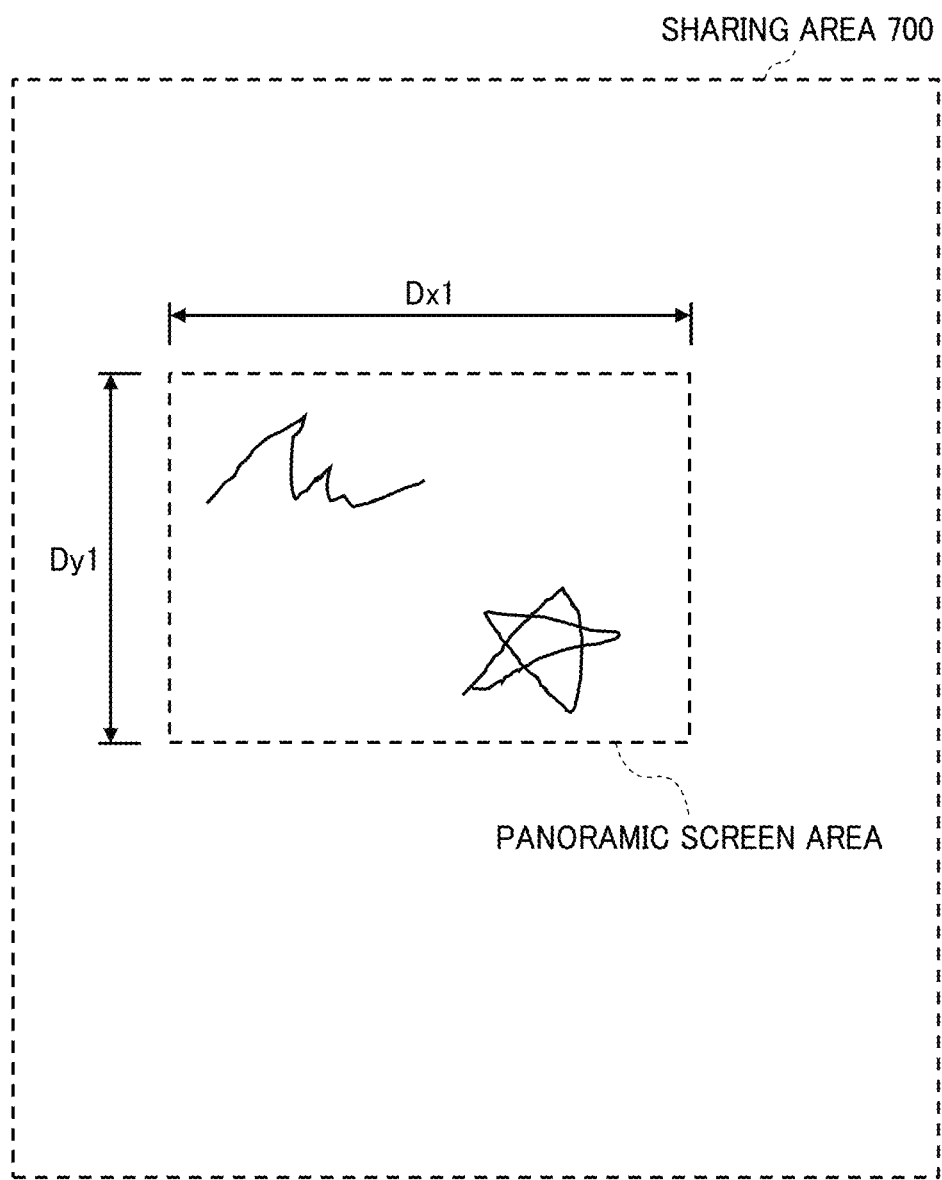
FIG. 21 is an illustration for describing an example of a panoramic screen area included in a sharing area, according to an embodiment of the present disclosure.

Next, the event information management unit 55 of the communication management apparatus 50 reads the handwriting input data file 550 of the event associated with the received event ID stored in the storage unit 5000 via the storing/reading unit 59 (step S53). Next, the panoramic screen information generation unit 56 generates panoramic screen information based on the handwriting input data file 550 read in step S53 (step S54). For example, the panoramic screen information generation unit 56 generates, as the panoramic screen information, area data indicating a position of a panoramic screen area to be displayed on a panoramic screen on the sharing area 700. FIG. 21 is an illustration for describing an example of the panoramic screen area included in the sharing area 700. As illustrated in FIG. 21, the panoramic screen area is a rectangular area including all objects that are input by handwriting in the sharing area 700. The size of the panoramic screen area is represented by, for example, a width Dx1 and a height Dy1. The panoramic screen area is an example of a second area.

The panoramic screen information management unit 57 stores the panoramic screen information generated in step S54 in the panoramic screen information management DB 5003 (see FIG. 13) via the storing/reading unit 59 (step S55). In this case, the panoramic screen information management unit 57 stores, as the area data, information on the position (Dx1, Dy1) of the panoramic screen area on the sharing area 700, the information on the position being included in the panoramic screen information generated in step S54, in association with the event ID of the event being conducted. Next, the transmission/reception unit 51 transmits the panoramic screen information generated in step S54 to the display apparatus 10A (step S56). Thereby, the transmission/reception unit 11A of the display apparatus 10A receives the panoramic screen information transmitted from the communication management apparatus 50.

The panoramic screen area generation unit 18A of the display apparatus 10A generates a panoramic screen area to be displayed on the display screen 100A based on the panoramic screen information received in step S56 (step S57). The panoramic screen area generation unit 18A generates, as the panoramic screen area, an image of an area on the sharing area 700 corresponding to the area data (Dx1, Dy1) indicated in the received panoramic screen information. Then, the panoramic screen area display unit 19A displays, on the display screen 100A, a panoramic screen 400 indicating the panoramic screen area generated in step S57 (step S58).

Figure 22:
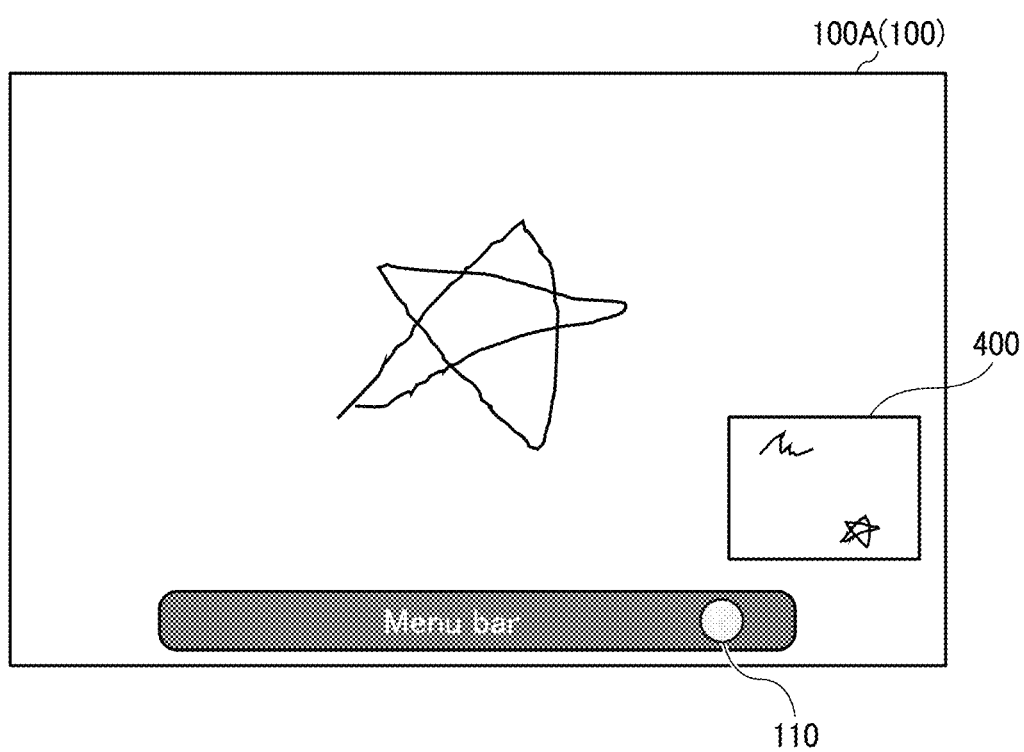
FIG. 22 is an illustration of an example of a panoramic screen, according to an embodiment of the present disclosure.

FIG. 22 is an illustration of an example of the panoramic screen 400 displayed on the display screen 100A. The panoramic screen 400 illustrated in FIG. 22 is displayed as being superimposed on the display screen 100A that displays a part of the display area of the sharing area 700. On the panoramic screen 400, an image of the panoramic screen area generated in step S57 is displayed in reduced size. On the panoramic screen 400, as described above, an area including all handwriting input data items (objects) that are input to the sharing area 700 is displayed in reduced size. Assuming that the display size of the panoramic screen 400 is represented by a width Dx2 and a height Dy2, the panoramic screen area generation unit 18A calculates, for each of the width and the height, a ratio (Dx2/Dx1, Dy2/Dy1) of the panoramic screen display area to the panoramic screen 400. The panoramic screen area generation unit 18 reduces the image of the panoramic screen area using one of the calculated ratios having a smaller value as a scaling factor. Then, the panoramic screen area display unit 19A displays the reduced image of the panoramic screen area on the panoramic screen 400.

The description given with reference to FIG. 19 is of an example in which whether to display the panoramic screen is switched by selection of the display switch button 110. In another example, the display apparatus 10A may automatically display the panoramic screen in response to a handwriting input in the sharing area 700 outside the display area displayed on the display screen 100A. Further, the description given above is of an example in which the panoramic screen area is an area including all handwriting input data items in the entirety of the shared area 700. In another example, the panoramic screen area may be an area including all handwriting input data items within a predetermined area of the sharing area 700. In another example, the panoramic screen area is an area including only handwriting input data that is input by a particular user.

Thus, in a state in which the display apparatus 10A displays a partial area of the sharing area 700 on the display screen 100A, the display apparatus 10A displays, on the display screen 100A, the panoramic screen 400 representing the panoramic screen area, which is an area including one or more handwriting input data items (objects) that is present outside the display area. This allows the user A to efficiently recognize contents input by handwriting in an event being conducted. The description given above is of an example in which the panoramic screen 400 displayed as being superimposed on the display screen 100A of the display apparatus 10A. In another example, in a case that the user A conducts an event using multiple displays, the panoramic screen 400 may be displayed on an external device having a display capability connected to the display apparatus 10A.

Figure 23:
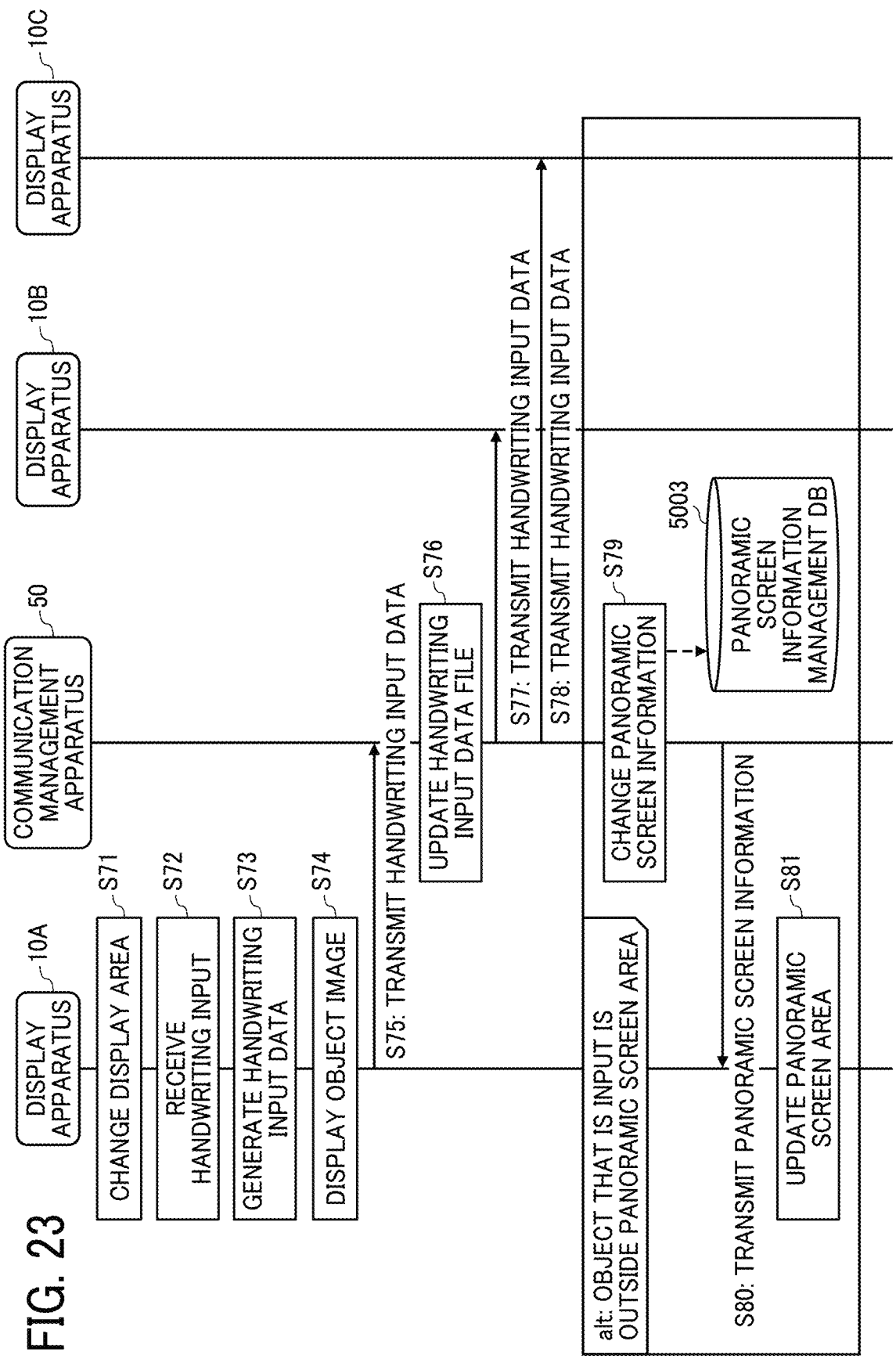
FIG. 23 is a sequence diagram illustrating an example of operation of updating a panoramic screen area, according to an embodiment of the present disclosure.
Figure 24:
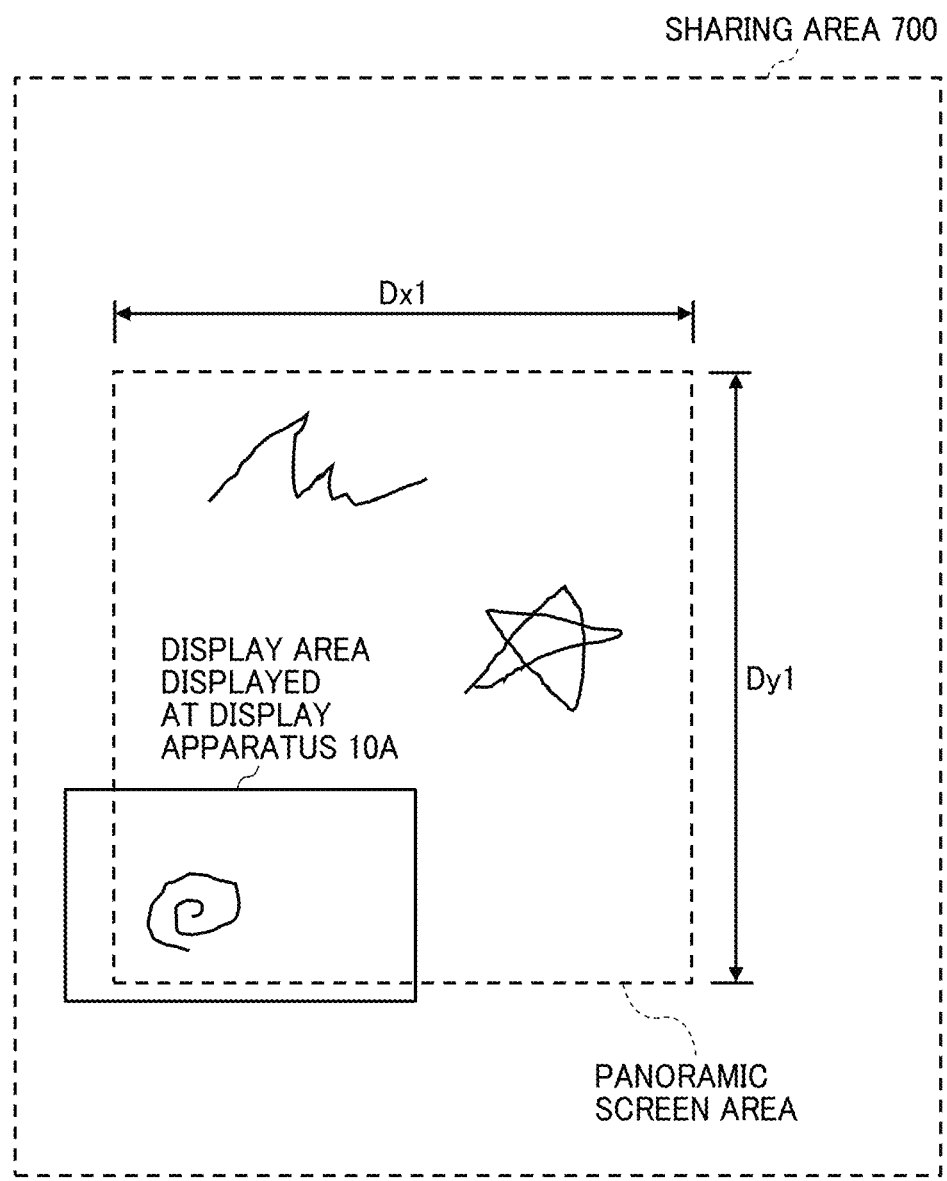
FIG. 24 is an illustration for describing an example of how to calculate a panoramic screen area, according to an embodiment of the present disclosure.
Figure 25:
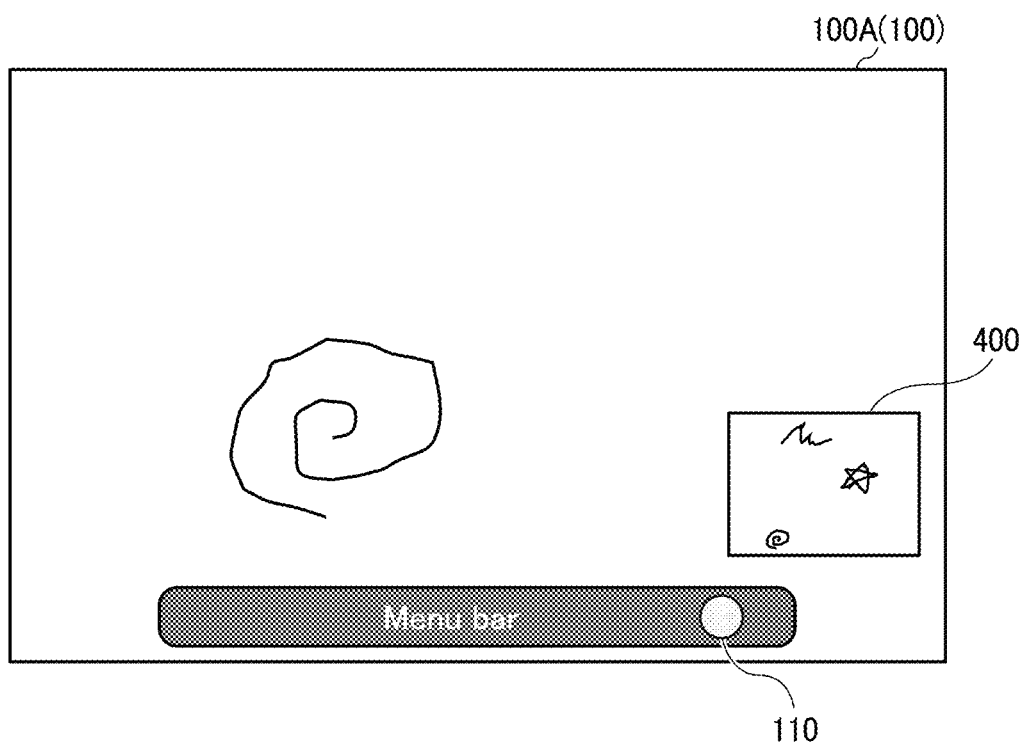
FIG. 25 is an illustration of an example of an updated panoramic screen area, according to an embodiment of the present disclosure.

Operation of Updating Panoramic Screen Area:

Referring to FIG. 23 to FIG. 25, operation of updating the panoramic screen area displayed on the display screen is described. FIG. 23 is a sequence diagram illustrating an example of operation of updating a panoramic screen area. The processes of step S71 to S78 illustrated in FIG. 23 are performed in the similar or substantially the similar manner as the processes of S31 to S38 described with reference to FIG. 16, and redundant description thereof is omitted below. A description provided with reference to FIG. 23 to FIG. 25 is of an example in which the display apparatus 10A updates the panoramic screen. In another example, each of the display apparatus 10B and the display apparatus 10C updates the panoramic screen in the same or substantially the same manner.

The panoramic screen information management unit 57 of the communication management apparatus 50 determines whether the object that is input to the display apparatus 10A is outside the panoramic screen area based on the handwriting input data received in step S75. When the input object is outside the panoramic screen area, the panoramic screen information management unit 57 changes the panoramic screen information stored in the panoramic screen information management DB 5003 (see FIG. 13) (step S79). FIG. 24 is an illustration for describing an example of how to calculate the panoramic screen area. Compared with a state illustrated in FIG. 21, the sharing area 700 has a larger area in which the handwriting input data items are included because the user A who uses the display apparatus 10A performs a new handwriting input. Accordingly, the panoramic screen information management unit 57 changes the size of the panoramic screen area based on a coordinate position of the newly input handwriting input data. For example, the panoramic screen information management unit 57 changes the coordinates of the area data (Dx1, Dy1) indicating the position of the panoramic screen area on the sharing area 700 so that the newly input object is included in the panoramic screen area. When the input object is within the range of the panoramic screen area, the panoramic screen information management unit 57 does not perform the processes of step S79 and subsequent steps.

Then, the transmission/reception unit 51 transmits the panoramic screen information changed in step S79 to the display apparatus 10A (step S80). Thereby, the transmission/reception unit 11A of the display apparatus 10A receives the panoramic screen information transmitted from the communication management apparatus 50. The communication management apparatus 50 further transmits the panoramic screen information transmitted to the display apparatus 10A to one or more other display apparatuses 10 in a state (display state) in which the panoramic screen is being displayed.

The panoramic screen area generation unit 18A of the display apparatus 10A updates the panoramic screen area being displayed on the display screen 100A based on the panoramic screen information received in step S80 (step S81). The panoramic screen area generation unit 18A updates, as the panoramic screen area, an area on the sharing area 700 corresponding to the area data (Dx1, Dy1) indicated in the received panoramic screen information. Then, the panoramic screen area display unit 19A displays, on the display screen 100A, the panoramic screen 400 indicating an image of the updated panoramic screen area. FIG. 25 is an illustration of an example of the updated panoramic screen area. On the panoramic screen 400 illustrated in FIG. 25, an image of the panoramic screen area updated in step S81 is displayed in reduced size. In the disclosure, the display area displayed on the display screen 100A is an example of the first area. The panoramic screen area displayed on the panoramic screen 400 is an example of the second area.

As described above, when the display apparatus 10A receives a handwriting input outside the panoramic screen area in a state in which the panoramic screen 400 is being displayed, the display apparatus 10A automatically changes the panoramic screen area to be displayed on the panoramic screen 400 so that the received handwriting input data (object) is displayed. This allows, for example, the user A to smoothly recognize that another user has performed handwriting input outside the panoramic screen area and to check content of the handwriting input data (object) that is input by another user.

Figure 26:
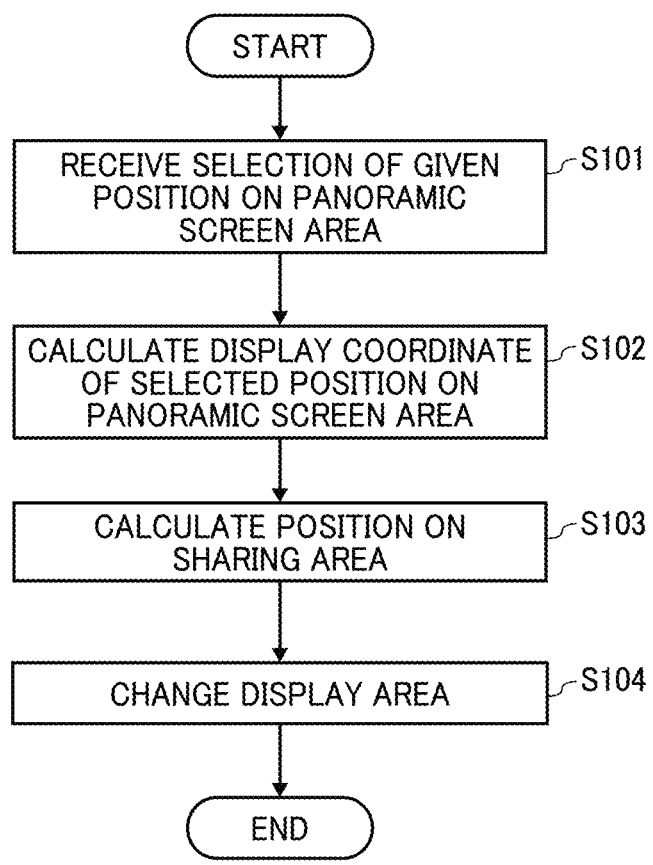
FIG. 26 is a flowchart illustrating an example of operation of changing a display area using a panoramic screen, according to an embodiment of the present disclosure.

Operation of Updating Display Area Using Panoramic Screen:

Referring to FIG. 26 to FIG. 29, operation of changing a display area displayed on the display screen using the panoramic screen is described. FIG. 26 is a flowchart illustrating an example of operation of changing a display area using the panoramic screen. A description provided with reference to FIG. 26 to FIG. 29 is of an example in which the display apparatus 10A changes the display area. In another example, each of the display apparatus 10B and the display apparatus 10C changes a display area in the same or substantially the same manner.

Figure 27:
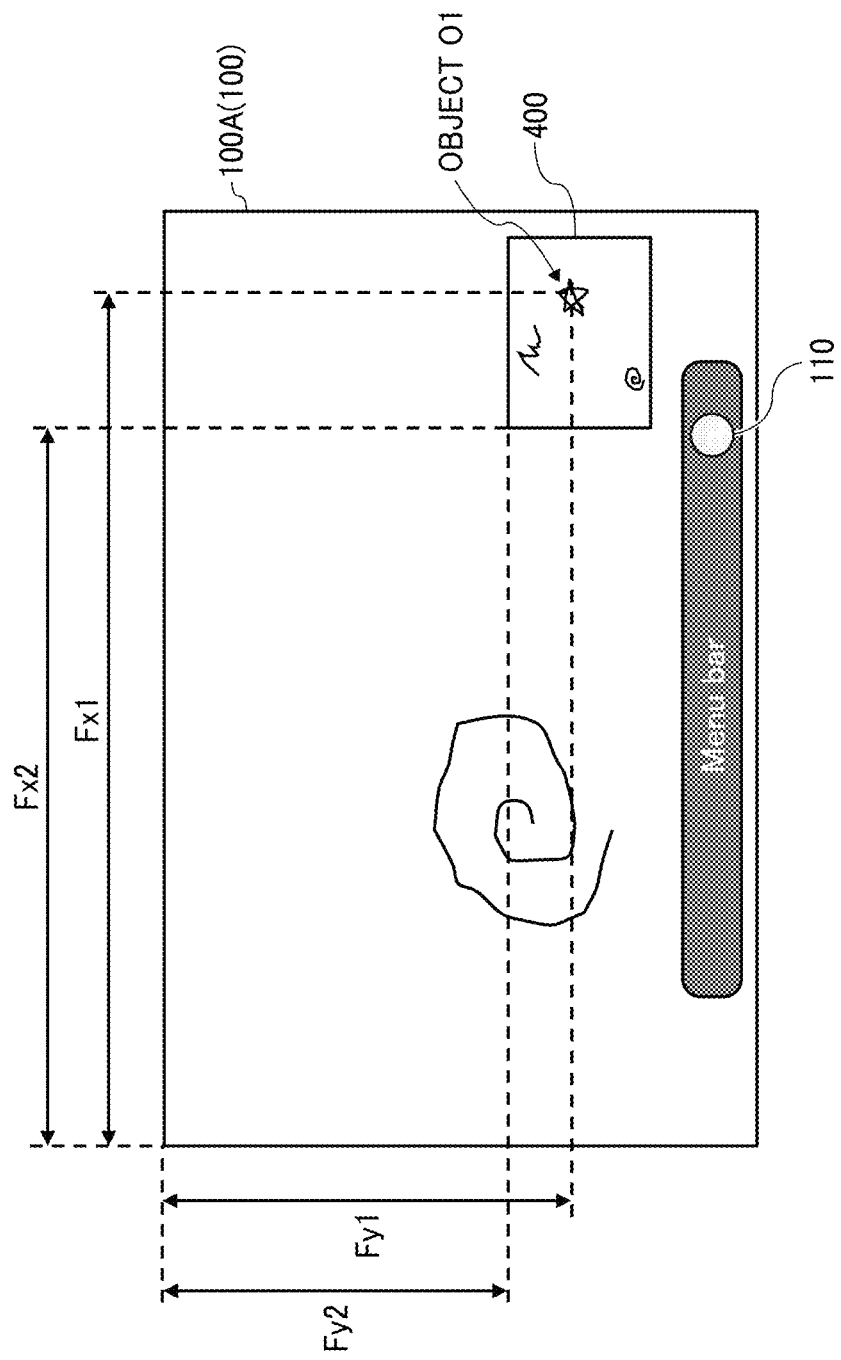
FIG. 27 is a diagram for explaining an example of how to identify a display area, according to an embodiment of the present disclosure.

In response to the user A's touch (selection) operation on the panoramic screen 400, the reception unit 12A on the display apparatus 10A receives selection of a certain position on the panoramic screen area indicated on the panoramic screen 400 displayed on the display screen 100A (step S101). Next, the display position calculation unit 21A calculates display coordinates on the panoramic screen area of the position selected in step S101 (step S102). Specifically, as illustrated in FIG. 27, when the user A touches (selects) a position of Object O1 on the panoramic screen 400, the selected position is coordinates (Fx1, Fy1). Assuming that the coordinates of the upper left corner of the panoramic screen 400 are (Fx2, Fy2), the selected position is represented by display coordinates (Fx1-Fx2, Fy1-Fy2) on panoramic screen 400.

Figure 28:
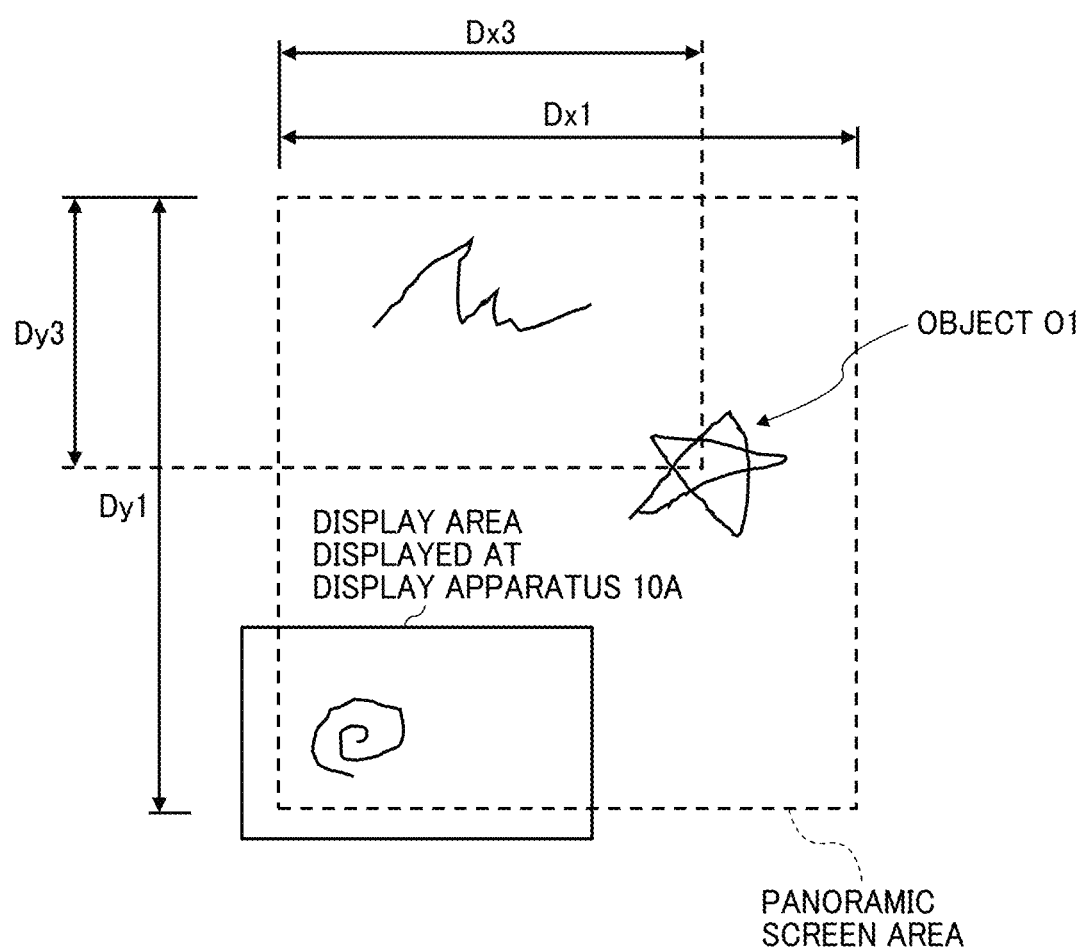
FIG. 28 is a diagram for explaining an example of how to identify a display area, according to an embodiment of the present disclosure.

Next, the display position calculation unit 21A calculates the position of the selected position on the sharing area (step S103). Specifically, as illustrated in FIG. 28, since the upper left corner of the panoramic screen 400 corresponds to the position of the upper left corner of the panoramic screen display area, the display position calculation unit 21A calculates the position (Dx3, Dy3) of the object O1 by returning the scaling factor when displayed on the panoramic screen 400 to an actual size.

Figure 29:
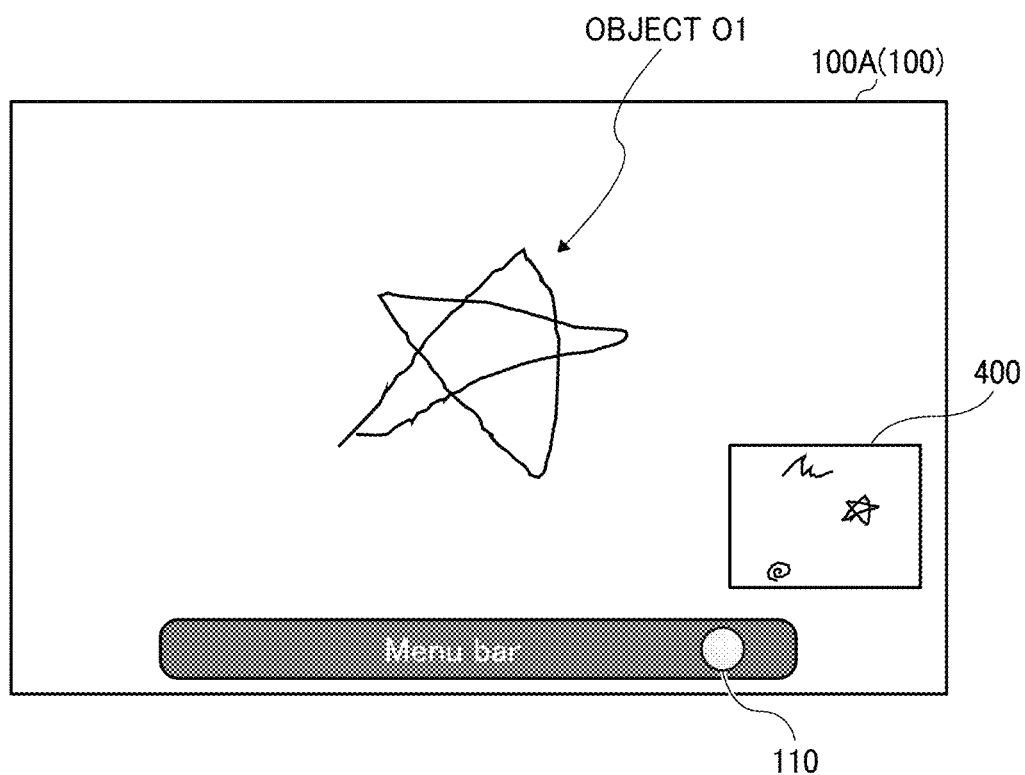
FIG. 29 is an illustration of an example of a display screen in which a display area has been changed, according to an embodiment of the present disclosure.

Then, the display control unit 13A changes the display area to be displayed on the display screen 100A based on the calculation result by the display position calculation unit 21A (step S104). FIG. 29 is an illustration of an example of the display screen 100A in which the display area has been changed. On the display screen 100A illustrated in FIG. 29, a display area is displayed in which Object O1 selected on the panoramic screen 400 in step S101 is positioned at the center of the display area.

As described above, the display apparatus 10A automatically displays an area corresponding to a position selected by the user A on the panoramic screen 400 as a display area on the display screen 100A. This allows the user A to efficiently switch the display area and advance an event smoothly.

Figure 30:
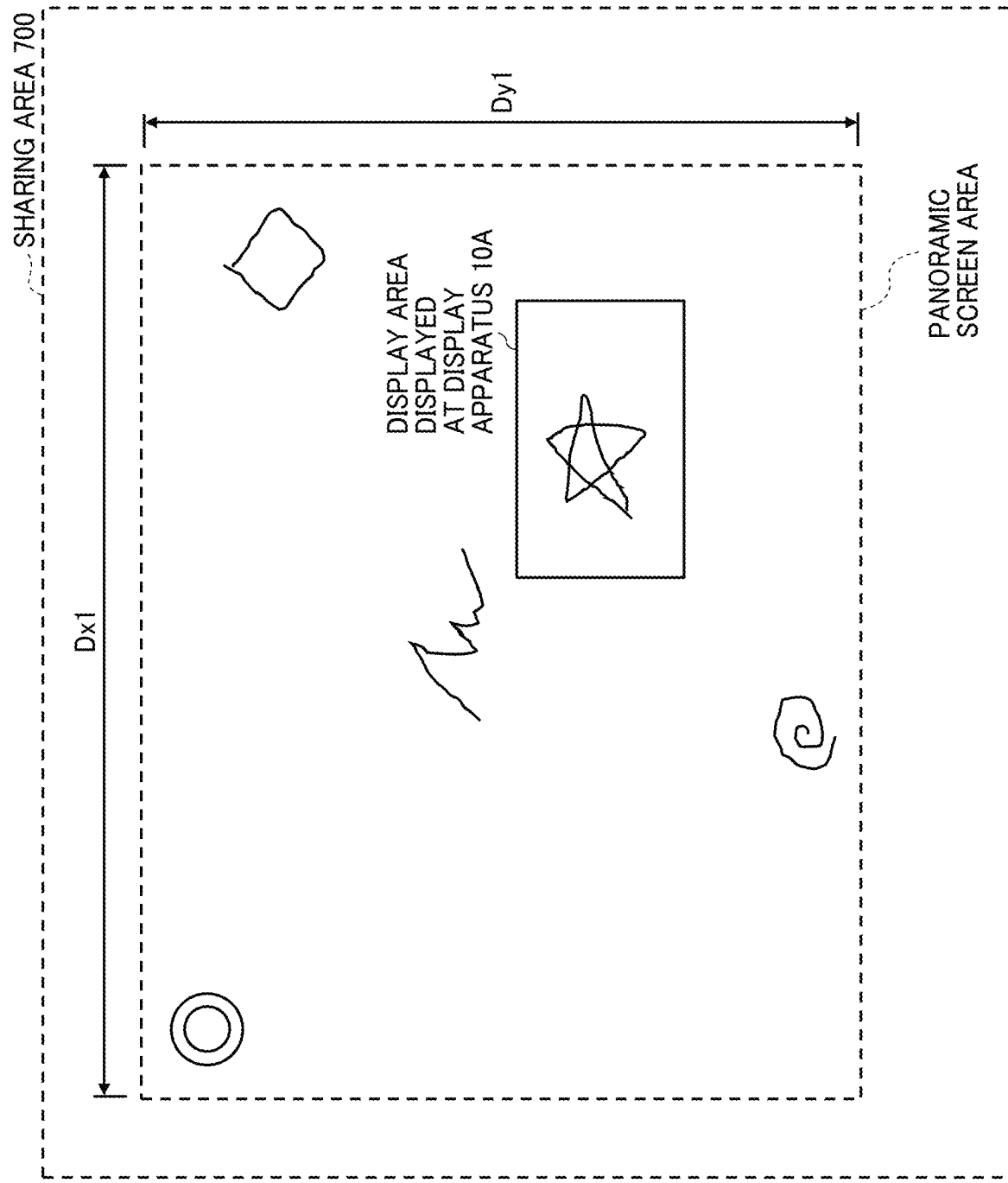
FIG. 30 is an illustration of an example of handwriting input data that is input to a sharing area, according to an embodiment of the present disclosure.

Operation of Changing Display Size of Panoramic Screen:

Referring to FIG. 30 to FIG. 39, operation of changing a display size of a panoramic screen is described. A description provided with reference to FIG. 30 to FIG. 39 is of an example in which a display size of a panoramic screen displayed at the display apparatus 10A is changed. In another example, at each of the display apparatus 10B and the display apparatus 10C, a display size of a panoramic screen is changed in the same or substantially the same manner. The description given above is of an example in which a display size of a panoramic screen is fixed. By contrast, referring to FIG. 30 to FIG. 39, an example in which a display size of to panoramic screen varies is described. FIG. 30 is an illustration of an example of handwriting input data that is input to the sharing area 700. As illustrated in FIG. 30, when the handwriting input data (objects) are present in a large part of the sharing area 700, a size of the panoramic screen area is large. In this case, when an image of the panoramic screen area is displayed in reduced size on the panoramic screen, each of the objects displayed small and not suitable for viewing.

Figure 31:
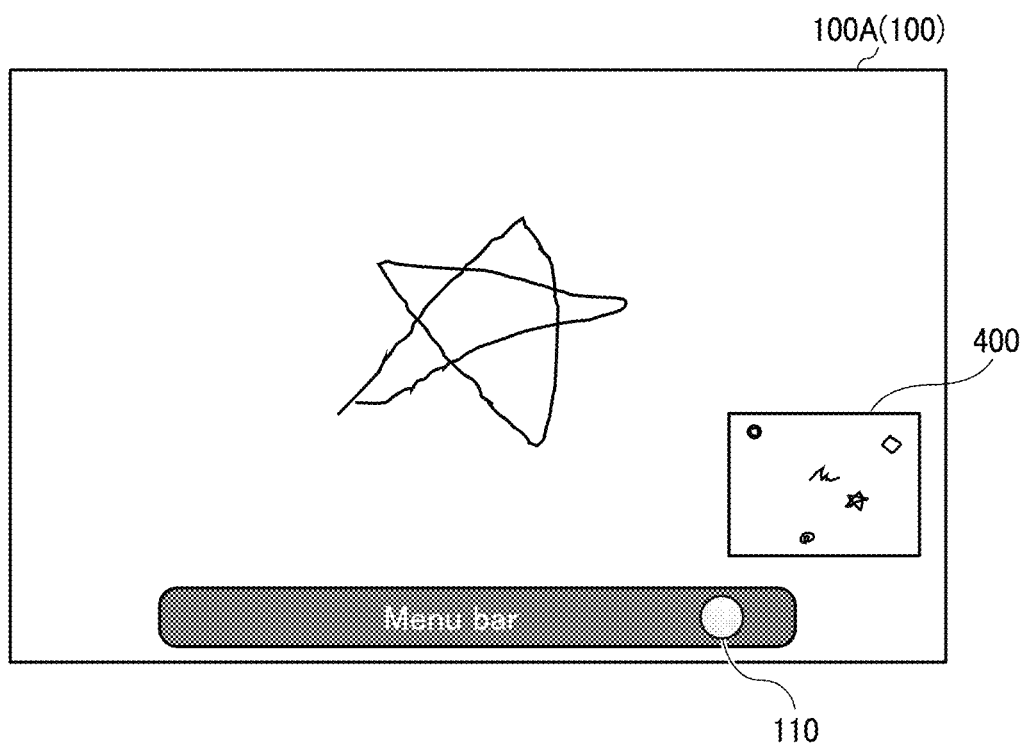
FIG. 31 is an illustration of an example of a panoramic screen area, according to an embodiment of the present disclosure.

FIG. 31 is an illustration of an example of the panoramic screen 400 corresponding to the sharing area 700 illustrated in FIG. 30. As illustrated in FIG. 31, since the area including objects that are input to the sharing area 700 is large, the panoramic screen area displayed on the panoramic screen 400 is also large. This makes it difficult for the user A viewing the display screen 100A to recognize the content of writings even when viewing the panoramic screen 400. To address such an issue, when objects are present in a large part of the sharing area 700, the display system 1 changes the display size of the panoramic screen according to the size of the panoramic screen area so that the objects in the panoramic screen are not displayed too small.

Figure 32:
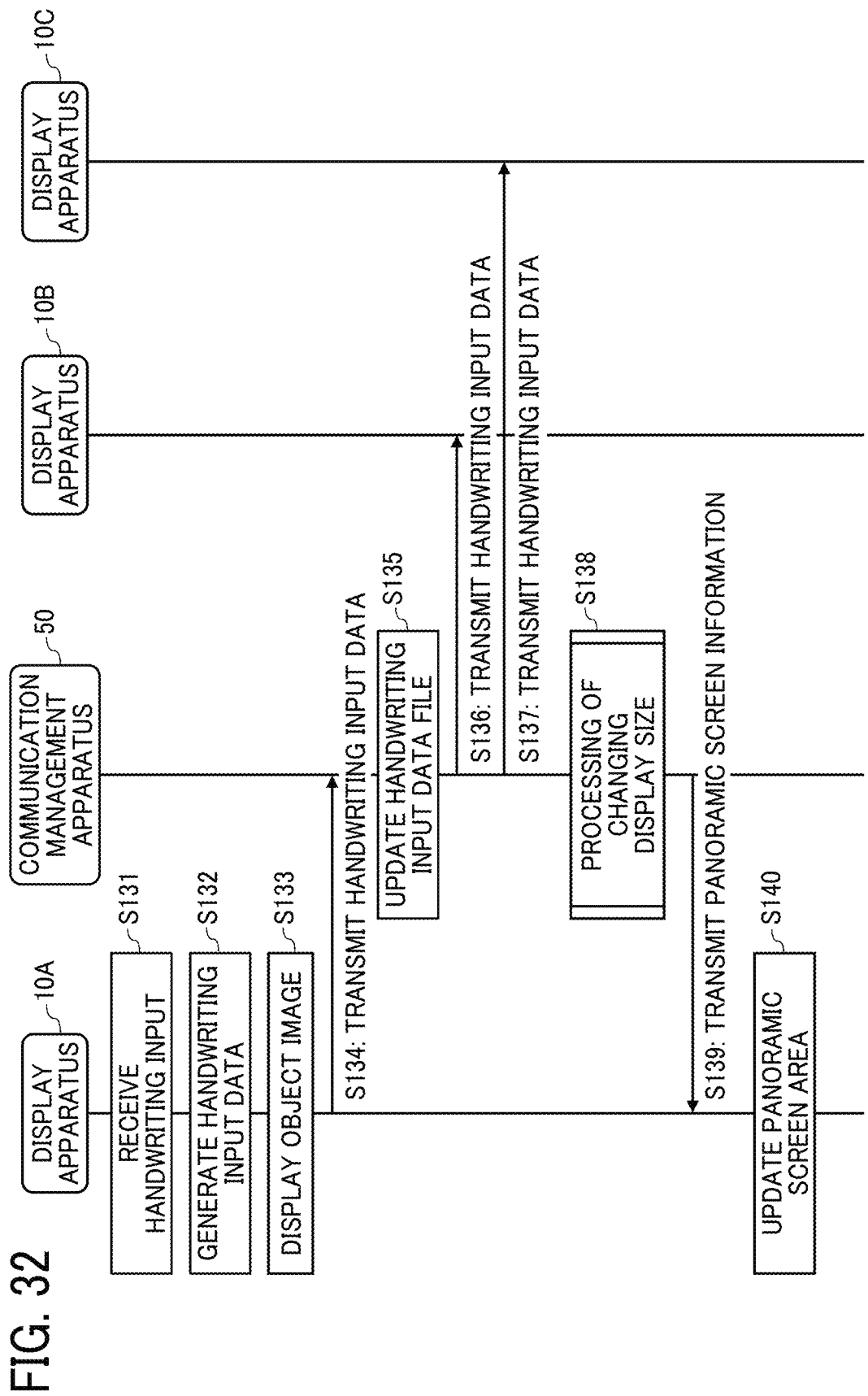
FIG. 32 is a sequence diagram illustrating an example of operation of changing a display size of a panoramic screen, according to an embodiment of the present disclosure.

FIG. 32 is a sequence diagram illustrating an example of operation of changing the display size of the panoramic screen. The processes of step S131 to S137 illustrated in FIG. 32 are performed in the similar or substantially the similar manner as the processes of S32 to S38 described with reference to FIG. 16, and redundant description thereof is omitted below.

Figure 33:
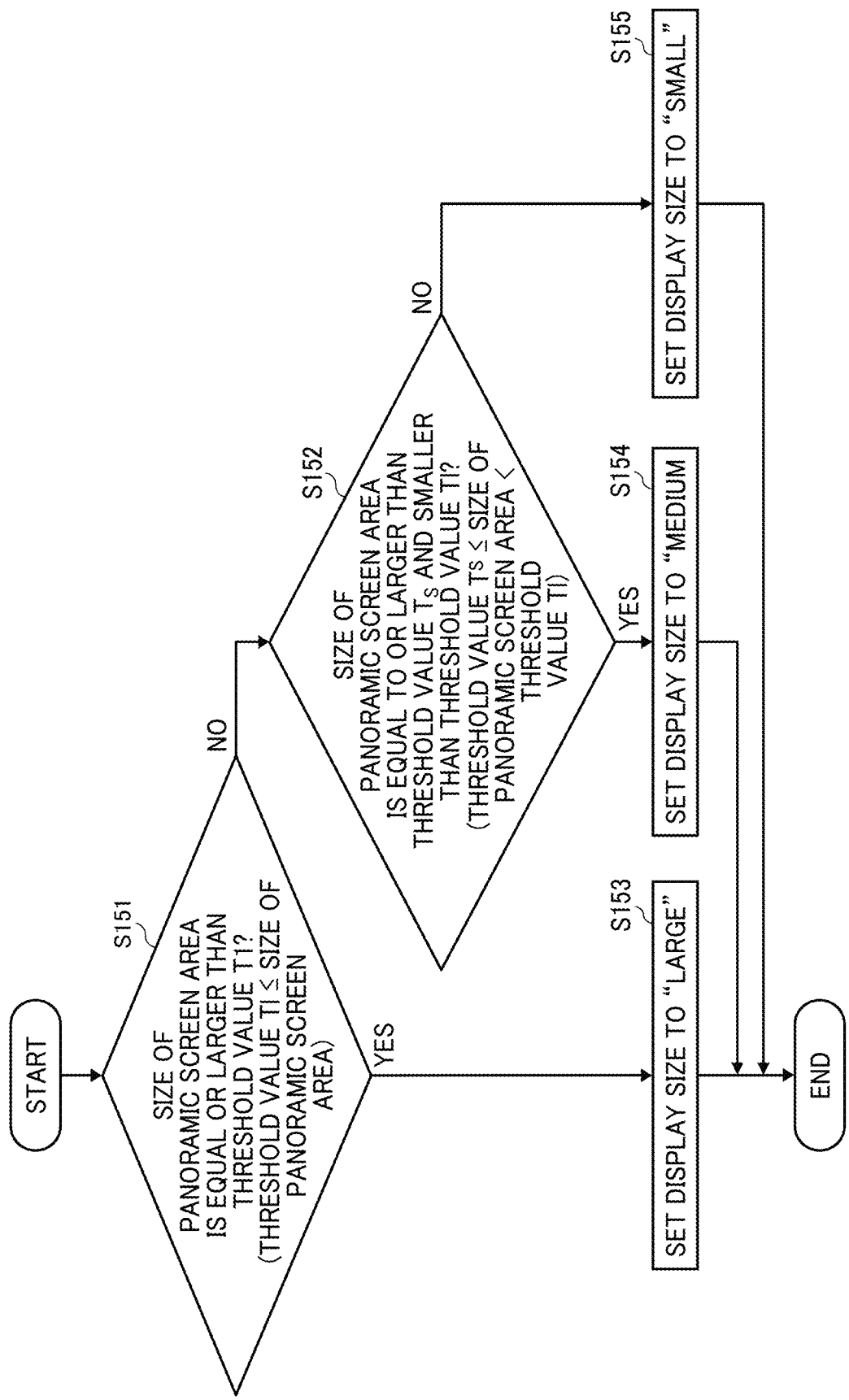
FIG. 33 is a flowchart illustrating an example of operation of changing a display size of a panoramic screen, according to an embodiment of the present disclosure.

In step S138, the communication management apparatus 50 performs a process of changing the display size of the panoramic screen. Referring to FIG. 33, the process of step S138 is described in detail. FIG. 33 is a flowchart illustrating an example of operation of changing the display size of the panoramic screen.

Figure 34:
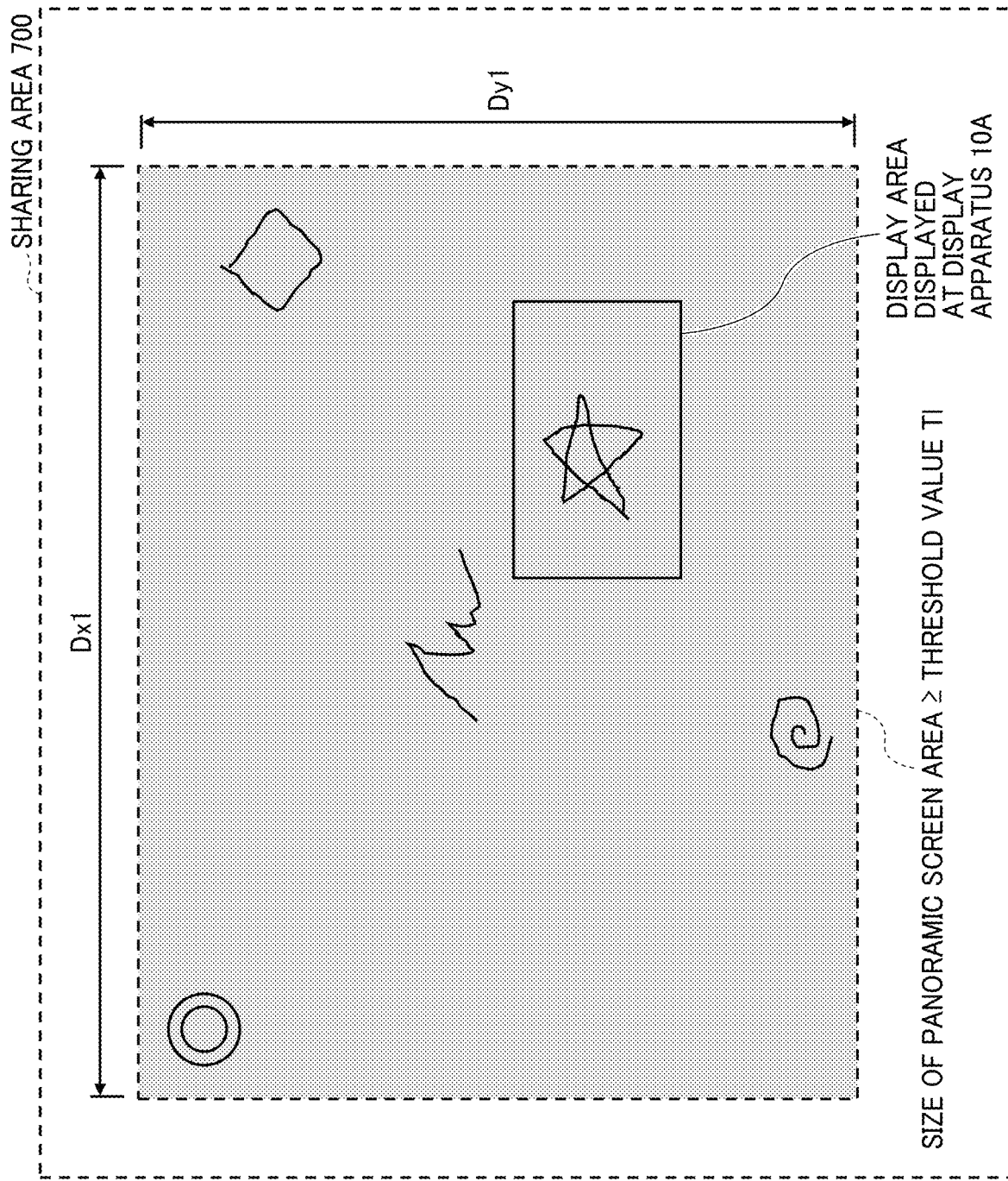
FIG. 34 is an illustration for describing an example of a sharing area when a large-size panoramic screen is set, according to an embodiment of the present disclosure.

First, the panoramic screen information management unit 57 determines whether the size of the panoramic screen area is equal to or larger than a threshold value T1 (threshold value T1≤size of the panoramic screen area) based on the panoramic screen information stored in the panoramic screen information management DB 5003 (step S151). The threshold value T1 is a value indicating a predetermined threshold value with respect to the size of the panoramic screen area, and is a threshold value based on which the display size of the panoramic screen is switched. As illustrated in FIG. 34, the panoramic screen formation management unit 57 determines whether the size (Dx1×Dy1) of the panoramic screen area including all objects that are input to the handwriting input screen, which is the sharing area 700, is equal to or larger than the threshold value T1.

When the panoramic screen information management unit 57 determines that the size of the panoramic screen area is equal to or larger than the threshold value T1 (YES in step S151), the operation proceeds to step S153. In step S153, the panoramic screen information management unit 57 sets the display size of the panoramic screen to "large". The panoramic screen information management unit 57 stores the set display size ("large" size) as the display size of the panoramic screen in the panoramic screen information stored in the panoramic screen information management DB 5003 (see FIG. 13) via the storing/reading unit 59.

Figure 35:
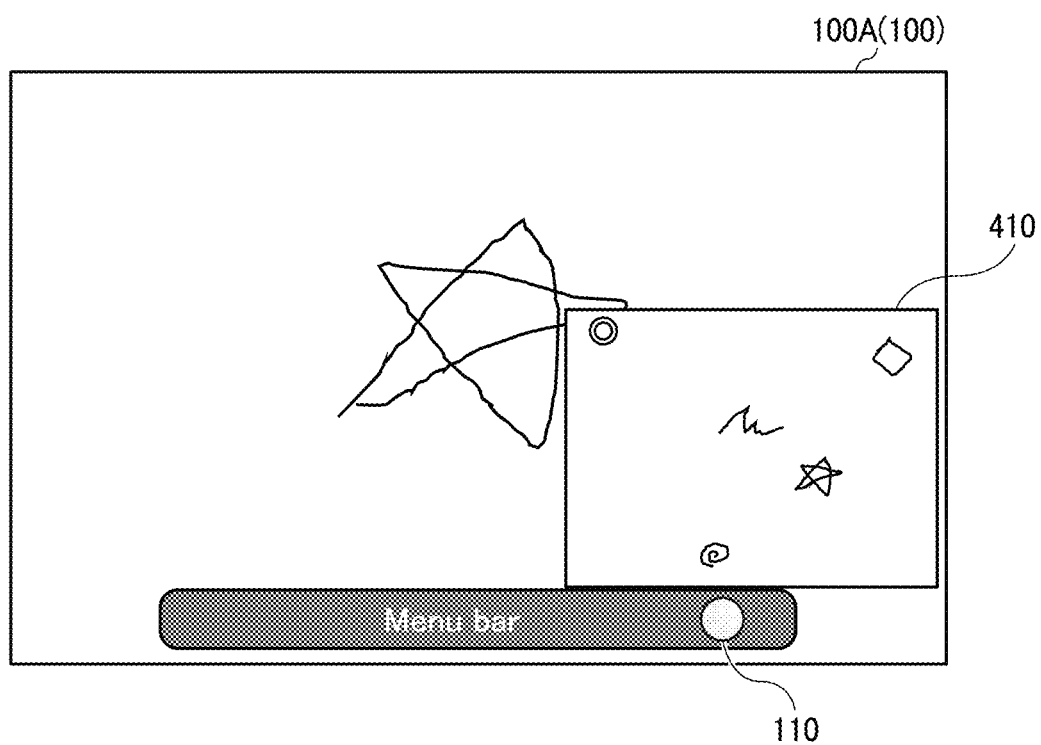
FIG. 35 is an illustration of an example of a large-size panoramic screen, according to an embodiment of the present disclosure.

FIG. 35 is an illustration of an example of a large-size panoramic screen. A panoramic screen 410 illustrated in FIG. 35 is displayed when the display size of the panoramic screen is set to the "large" size. Since objects are included in a large part of the sharing area 700, the panoramic screen area displayed on the panoramic screen 410 is displayed as an image reduced by a scaling factor corresponding to the panoramic screen 410 having the "large" size, so that the user A can view each objects without difficulty.

Figure 36:
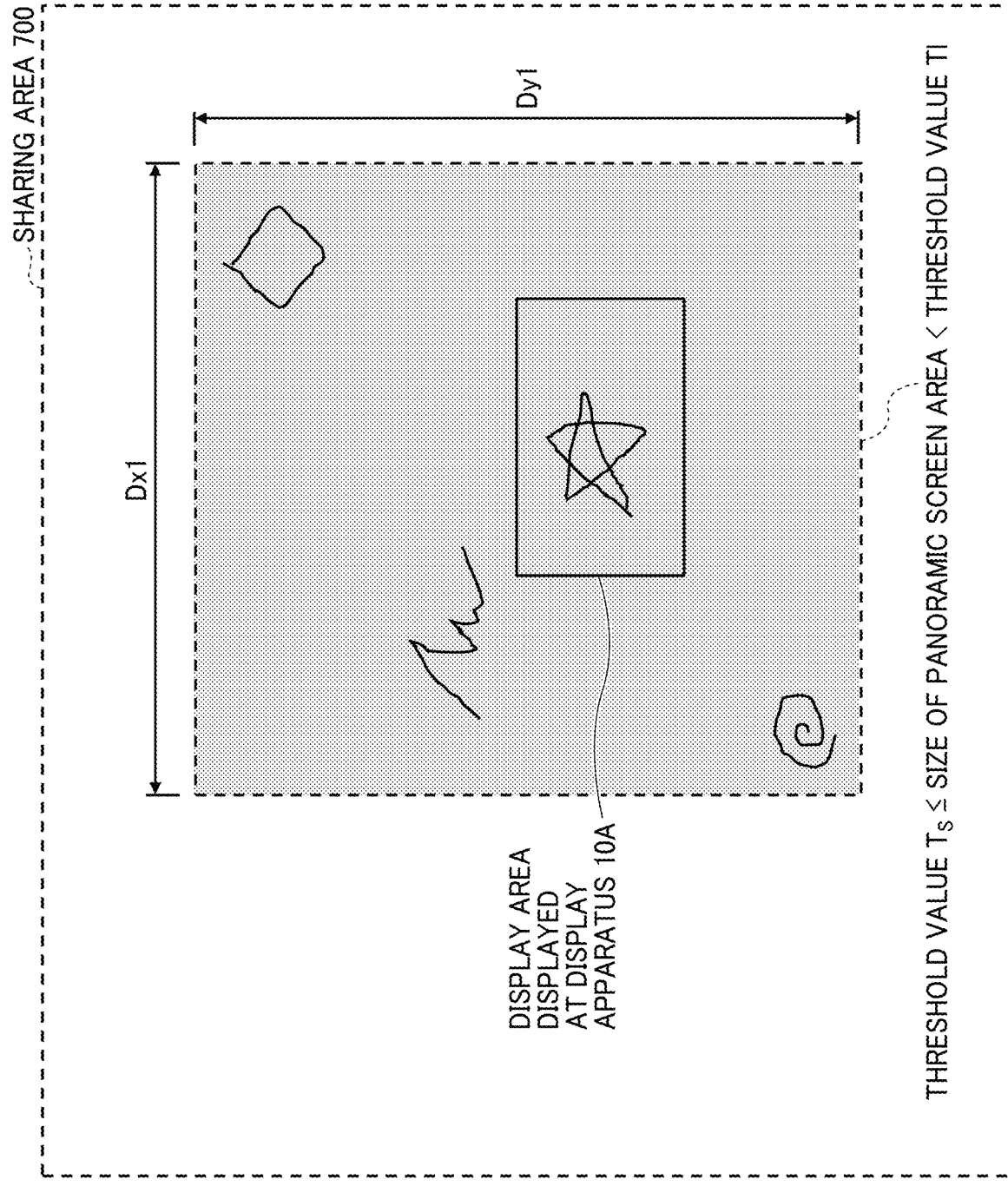
FIG. 36 is an illustration for describing an example of a sharing area when a medium-size panoramic screen is set, according to an embodiment of the present disclosure.

By contrast, when the panoramic screen information management unit 57 determines that the size of the panoramic screen area is smaller than the threshold value T1 (NO in step S151), the operation proceeds to step S152. In step S152, the panoramic screen information management unit 57 determines whether the size of the panoramic screen area is equal to or larger than a threshold value Ts and smaller than the threshold value T1 (threshold value Ts≤size of the panoramic screen area <threshold value T1) based on the panoramic screen information stored in the panoramic screen information management DB 5003. The threshold value Ts is a value indicating a predetermined threshold value with respect to the panoramic screen area, and is a value smaller than the threshold value T1 As illustrated in FIG. 36, the panoramic screen information management unit 57 determines whether the size (Dx1×Dy1) of the panoramic screen area including all objects that are input to the handwriting input screen, which is the sharing area 700, is equal to or larger than the threshold value Ts and smaller than the threshold value T1.

When the panoramic screen information management unit 57 determines that the size of the panoramic screen area is equal to or larger than the threshold value Ts and smaller than T1 (YES in step S152), the operation proceeds to step S154. In step S154, the panoramic screen information management unit 57 sets the display size of the panoramic screen to "medium". The panoramic screen information management unit 57 stores the set display size ("medium" size) as the display size of the panoramic screen in the panoramic screen information stored in the panoramic screen information management DB 5003 via the storing/reading unit 59.

Figure 37:
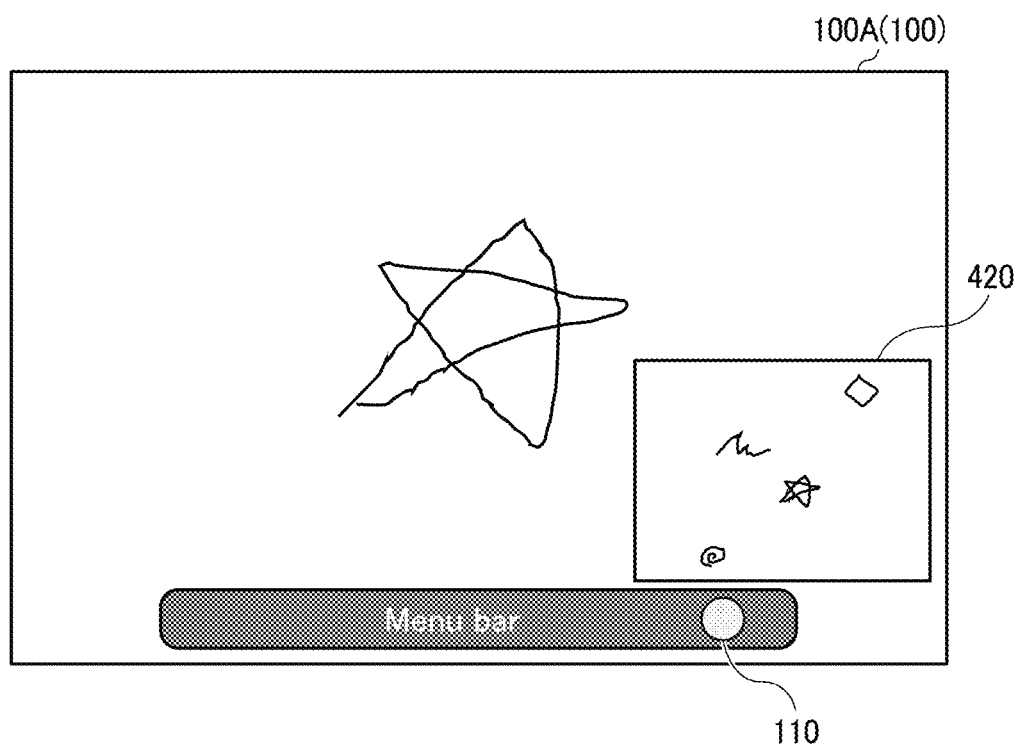
FIG. 37 is an illustration of an example of a medium-size panoramic screen, according to an embodiment of the present disclosure.

FIG. 37 is an illustration of an example of a medium-size panoramic screen. A panoramic screen 420 illustrated in FIG. 37 is displayed when the display size of the panoramic screen is set to the "medium" size. Compared with the panoramic screen area illustrated in each of FIG. 34 and FIG. 35, a part including objects in the panoramic screen area displayed on the panoramic screen 420 is smaller and the size of the panoramic screen area is smaller. Accordingly, on the panoramic screen 420, an image of the panoramic screen area reduced by a scaling factor corresponding to the "medium" size, which is larger than the scaling factor applied to the image of the panoramic screen area displayed on the panoramic screen 410.

Figure 38:
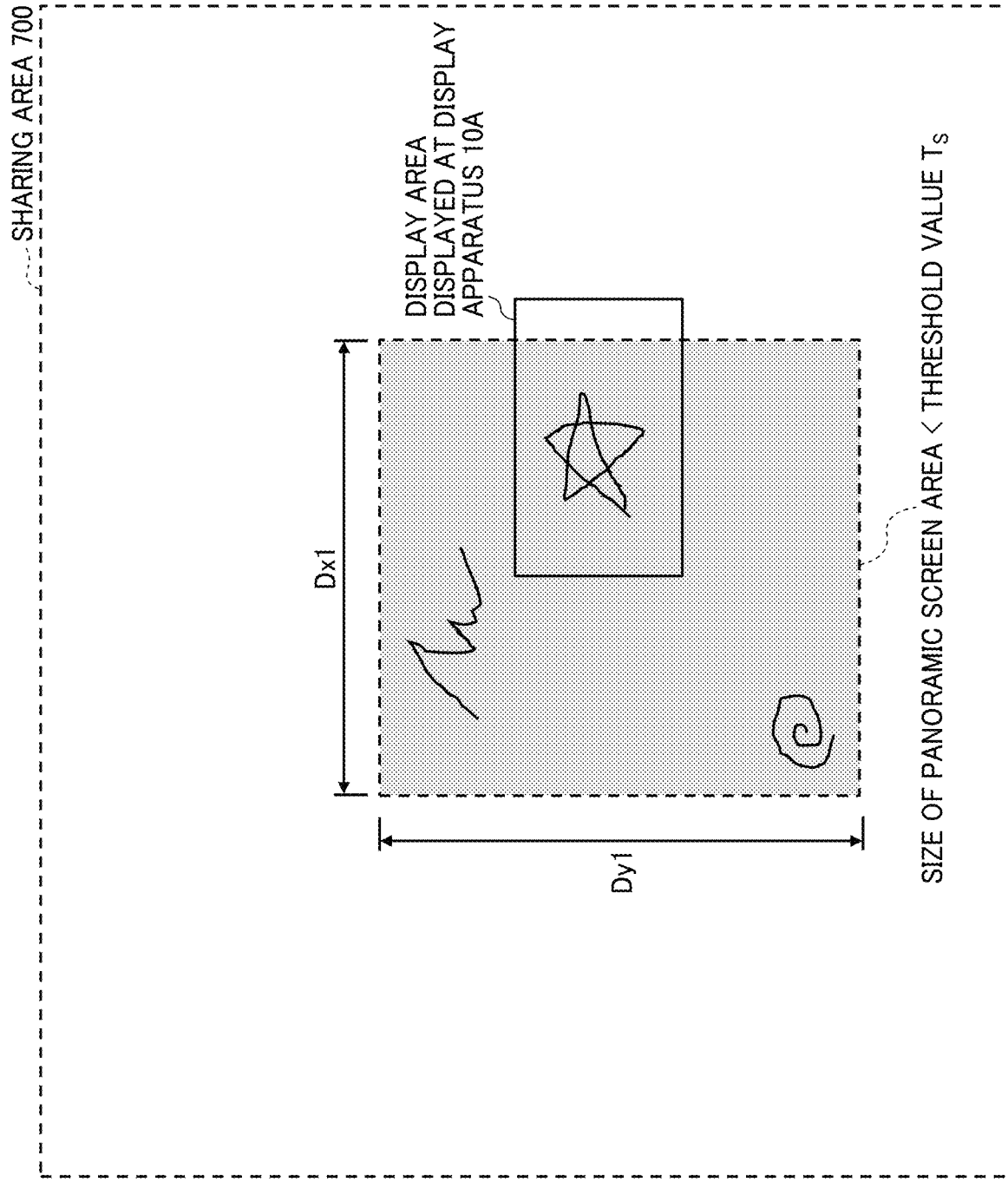
FIG. 38 is an illustration for describing an example of a sharing area when a small-size panoramic screen is set, according to an embodiment of the present disclosure.

By contrast, when the panoramic screen information management unit 57 determines that the size of the panoramic screen area is smaller than the threshold value Ts (NO in step S152), the operation proceeds to step S155. In step S155, the panoramic screen information management unit 57 sets the display size of the panoramic screen to "small". As illustrated in FIG. 38, the panoramic screen information management unit 57 determines whether the size (Dx1×Dy1) of the panoramic screen area including all objects that are input to the handwriting input screen, which is the sharing area 700, is smaller than the threshold value Ts, and sets the display size to "small". The panoramic screen information management unit 57 stores the set display size ("small" size) as the display size of the panoramic screen in the panoramic screen information stored in the panoramic screen information management DB 5003 via the storing/reading unit 59.

Figure 39:
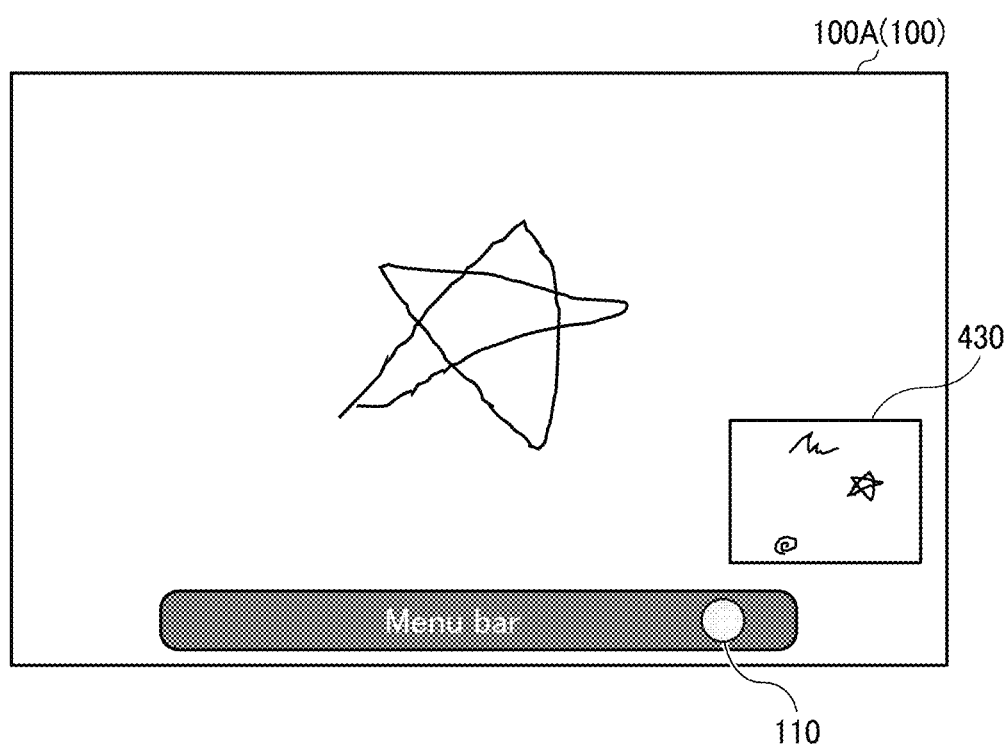
FIG. 39 is an illustration of an example of a small-size panoramic screen, according to an embodiment of the present disclosure.

FIG. 39 is an illustration of an example of a small-size panoramic screen. A panoramic screen 430 illustrated in FIG. 39 is displayed when the display size of the panoramic screen is set to the "small" size. Compared with the panoramic screen areas corresponding to the above-described "large size" and "medium size" panoramic screens, a part including objects in the panoramic screen area displayed on the panoramic screen 430 is smaller and the size of the panoramic screen area is smaller. Accordingly, on the panoramic screen 430, an image of the panoramic screen area reduced by a scaling factor corresponding to the "small" size, which is larger than the scaling factors applied respectively to the images of the panoramic screen areas displayed on the panoramic screen 410 and the panoramic screen 420.

As described above, the communication management apparatus 50 switches the display size of the panoramic screen displayed on the display screen 100A displaying the panoramic screen area to three patterns, i.e., "large", "medium", and "small" according to the size of the panoramic screen area determined based on a part including handwriting input data (objects) in the sharing area 700. The three patterns "large", "medium", and "small" are merely examples of the display size of the panoramic screen. In another example, the display size of the panoramic screen is switched between two patterns. In still another example, the display size of the panoramic screen is switched between four or more patterns.

Referring again to FIG. 32, the transmission/reception unit 51 of the communication management apparatus 50 transmits, to the display apparatus 10A, the panoramic screen information whose display size information is set in the process of step S138 (step S139). Thereby, the transmission/reception unit 11A of the display apparatus 10A receives the panoramic screen information transmitted from the communication management apparatus 50. The communication management apparatus 50 further transmits the panoramic screen information transmitted to the display apparatus 10A to one or more other display apparatuses 10 in a state (display state) in which the panoramic screen is being displayed.

The panoramic screen area generation unit 18A of the display apparatus 10A updates the panoramic screen area being displayed on the display screen 100A based on the panoramic screen information received in step S139 (step S140). Then, as illustrated in FIG. 35, FIG. 37, or FIG. 39, the panoramic screen area display unit 19A displays the panoramic screen corresponding to the updated display size of the panoramic screen area on the display screen 100A.

As described above, even when handwriting input data items (objects) are included in a large part of the sharing area 700, the display apparatus 10A displays the panoramic screen having a display size corresponding to the size of the panoramic screen area so that the objects in the panoramic screen are not displayed too small. Thus, even when objects are input in a large part of the sharing area 700, the user A can easily recognize content of the input objects by viewing the panoramic screen whose display size is variable.

Figure 40:
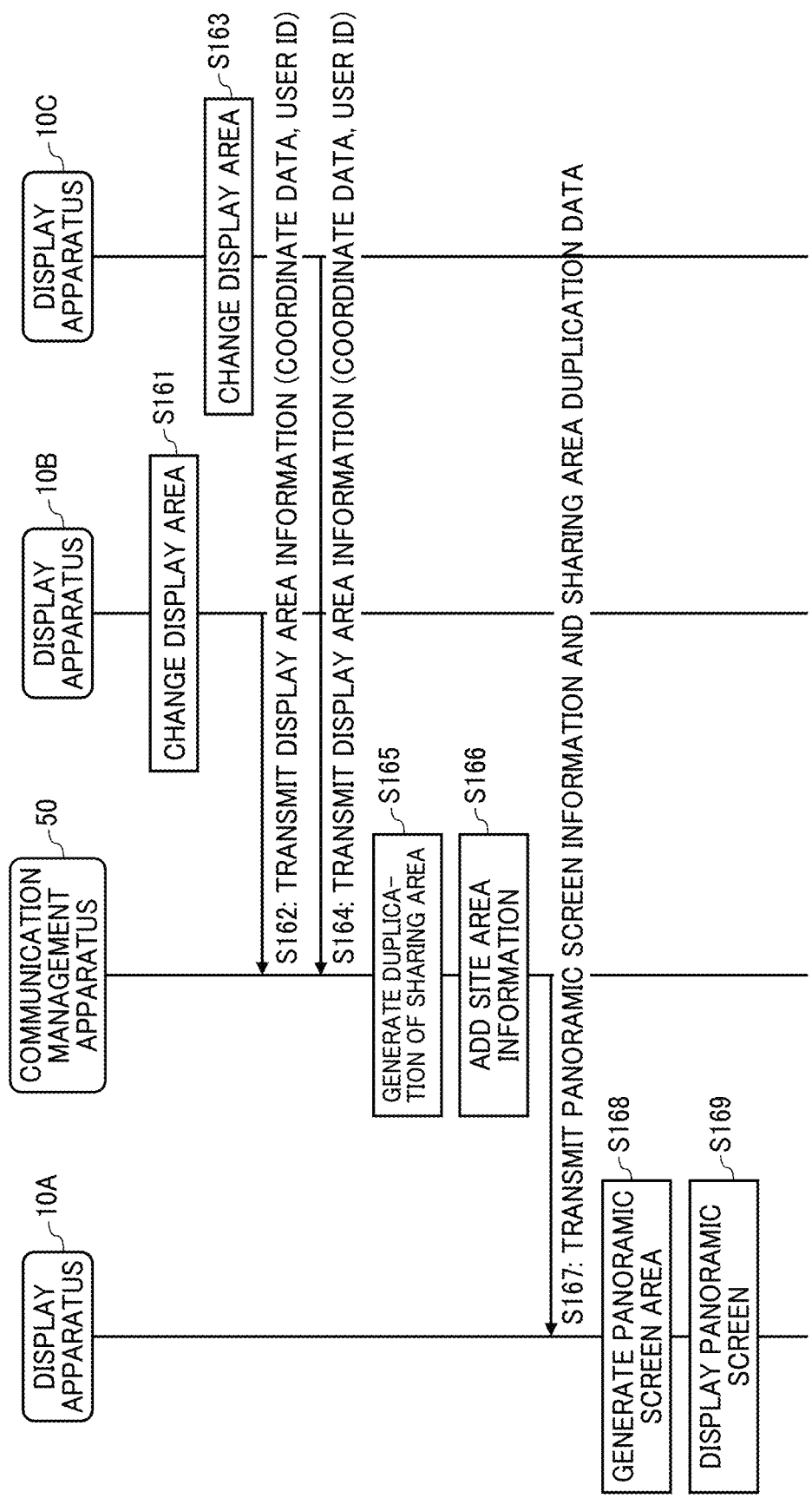
FIG. 40 is a sequence diagram illustrating an example of operation of displaying site area information on a panoramic screen, according to an embodiment of the present disclosure.
Figure 41:
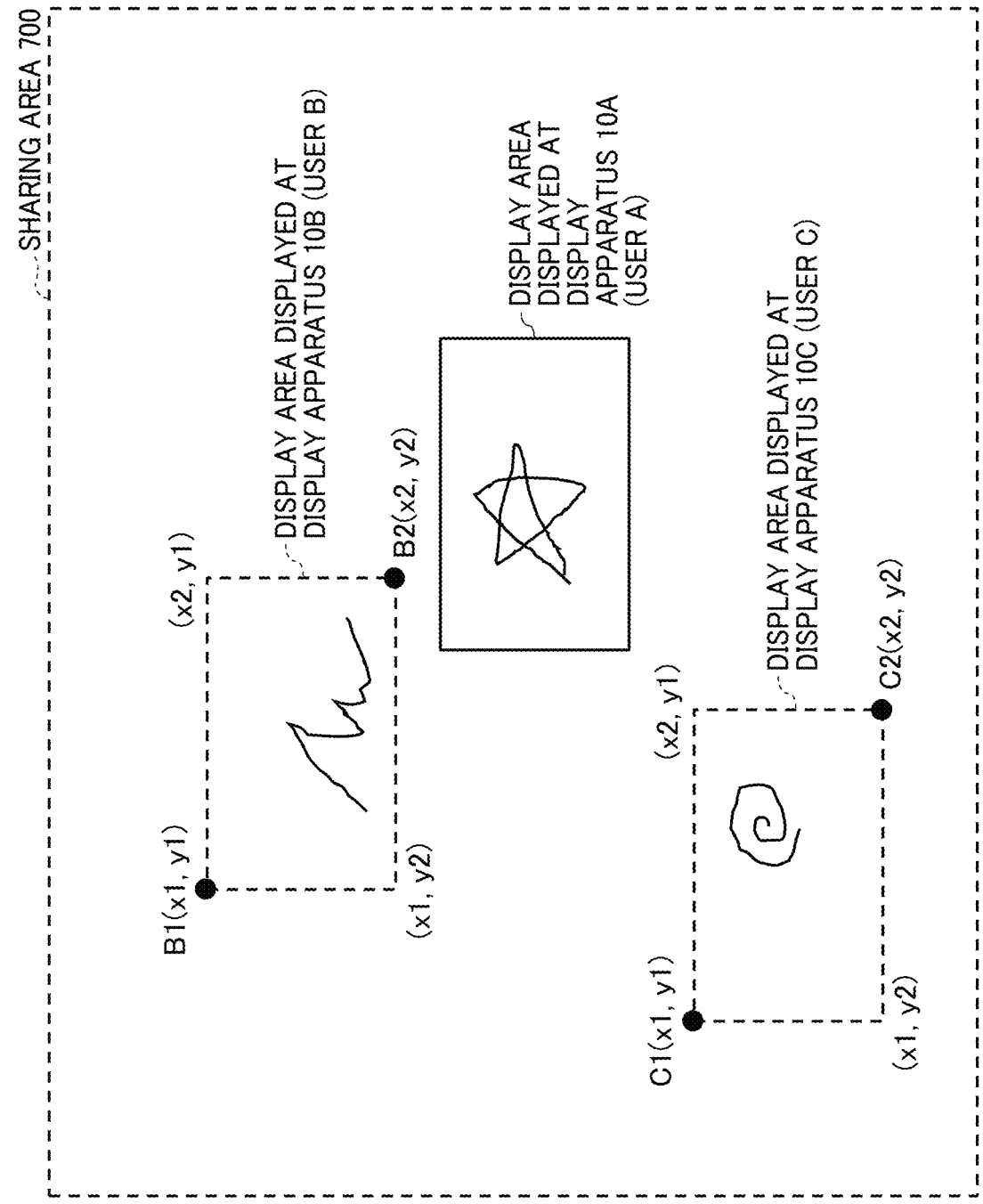
FIG. 41 is an illustration for describing an example of how to calculate a display area displayed on the display apparatus included in a sharing area, according to an embodiment of the present disclosure.
Figure 42:
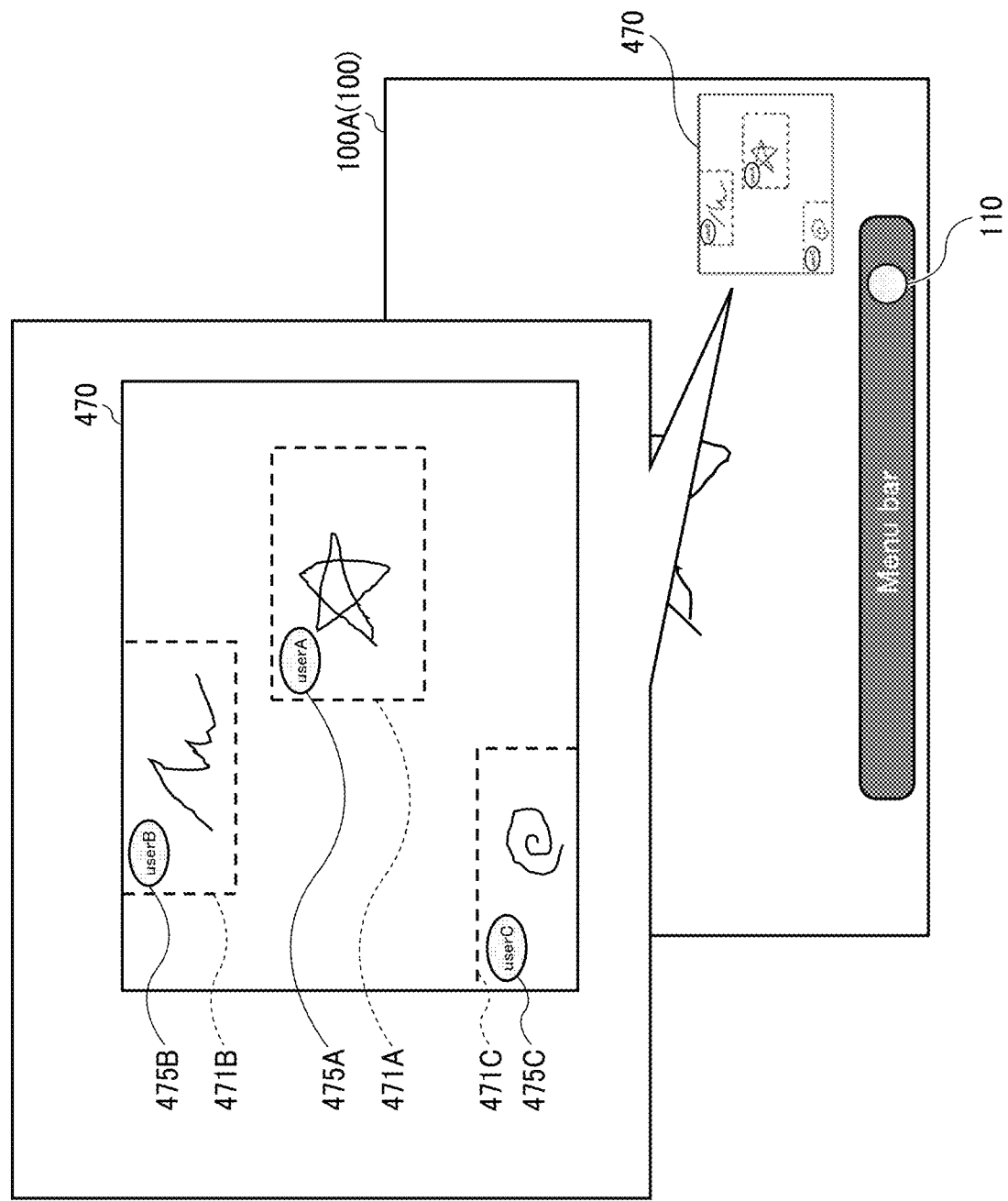
FIG. 42 is an illustration of an example of a panoramic screen on which site area information is displayed, according to an embodiment of the present disclosure.

Operation of Displaying Site Area Information on Panoramic Screen:

Referring to FIG. 40 to FIG. 42, operation of displaying the display areas respectively displayed on the display screens of the display apparatuses participating in an event on a panoramic screen is described. FIG. 40 is a sequence diagram illustrating an example of operation of displaying site area information on the panoramic screen. A description provided with reference to FIG. 40 to FIG. 42 is of an example in which the panoramic screen is displayed at the display apparatus 10A. In another example, at each of the display apparatus 10B and the display apparatus 10C, the panoramic screen is displayed in the same or substantially the same manner.

First, in substantially the same manner as the example described with reference to FIG. 17A and FIG. 17B, the display control unit 13B of the display apparatus 10B changes the display area of the display screen 100B in which a part of the sharing area 700 is displayed (step S161). Then, the transmission/reception unit 11B transmits display area information indicating the display area displayed on the display screen 100B to the communication management apparatus 50 (step S162). The display area information includes coordinate data for specifying the display area displayed on a display screen (e.g., the display screen 100B) of the display apparatus 10B and a user ID identifying a user (e.g., the user B) who uses the display apparatus 10B. Thereby, the transmission/reception unit 51 of the communication management apparatus 50 receives the display area information transmitted from the display apparatus 10B.

Further, in substantially the same manner as the example described with reference to FIG. 17A and FIG. 17B, the display control unit 13C of the display apparatus 10C changes the display area of the display screen 100C on which a part of the sharing area 700 is displayed (step S163). Then, the transmission/reception unit 11C transmits display area information indicating the display area displayed on the display screen 100C to the communication management apparatus 50 (step S164). The display area information includes coordinate data for specifying the display area displayed on a display screen (e.g., the display screen 100C) of the display apparatus 10C and a user ID identifying a user (e.g., the user C) who uses the display apparatus 10C. Thereby, the transmission/reception unit 51 of the communication management apparatus 50 receives the display area information transmitted from the display apparatus 10C. In another example, the display area information exchanged in step S162 and step S164 include information of a user name identifying the corresponding user, in addition to or instead of the user ID.

Next, based on the metadata file 500 and the handwriting input data file 550 stored in the storage unit 5000, the sharing area duplication unit 58 of the communication management apparatus 50 generates a duplication of the sharing area shared in an event being conducted (step S165). Next, based on the display area information received in step S162 and in step S164, the sharing area duplication unit 58 adds site display information indicating the display area displayed on each of the display apparatuses 10 at the multiple site to the generated duplication of the sharing area (step S166). The site display information includes information indicating the position on the sharing area 700 of the display area displayed on each of the display apparatuses 10 at the multiple sites and information identifying the user who is using each of the display apparatuses 10 displaying the display area. The information indicating the position on the sharing area 700 of the display area corresponds to the coordinate data included in the display area information received in step S162 and step S164. The information identifying the user who is using the display apparatus 10 displaying the display area corresponds to the user ID (or the user name) included in the display area information received in step S162 and step S164.

FIG. 41 is an illustration for describing an example of how to calculate the display area displayed on the display apparatus 10 included in the sharing area 700. As illustrated in FIG. 41, for example, the display apparatus 10A, the display apparatus 10B, and the display apparatus 10C participating in an event sometimes display different areas included in the sharing area 700. In this case, the display area displayed on the display screen 100A of the display apparatus 10A does not include the display areas displayed on the display apparatus 10B and the display apparatus 10C at other sites. If the user A who uses the display apparatus 10A can recognize which area in the sharing area 700 is being displayed by the display apparatuses 10 at other sites, the user A can determine, for example, whether the user A can continue the presentation or conversation or whether the user A has to request the other users to move the display area. This allows the user to advance an event smoothly. To address such an issue, the display system 1 is configured to allow the display apparatus 10 to display, on the panoramic screen, site display information indicating the display area displayed on the display screen by the display apparatus 10 at each site.

As illustrated in FIG. 41, the display area displayed by each of the display apparatuses 10 at the multiple sites is expressed by the values of the coordinates of the upper left corner and the lower right corner of each display area on the sharing area 700. For example, the display area displayed by the display apparatus 10B is expressed by B1 (x1, y1), which is the coordinates of an upper left corner of the display area, and B2 (x2, y2), which is the coordinates of a lower right corner of the display area. Further, for example, the display area displayed by the display apparatus 10C is expressed by C1 (x1, y1), which is coordinates of an upper left corner of the display area, and C2 (x2, y2), which is coordinates of a lower right corner of the display area. The sharing area duplication unit 58 identifies the position on the panoramic screen of the display area displayed by each of the display apparatuses 10 at the multiple sites based on the coordinate data for specifying the display area included in the received display area information. Further, the sharing area duplication unit 58 adds the site display information indicating the display area displayed by each of the display apparatuses 10 at the multiple sites at the identified position of the display area displayed by each of the display apparatuses 10 at the multiple sites to the duplication of the sharing area, to generate sharing area duplication data.

The transmission/reception unit 51 of the communication management apparatus 50 transmits, to the display apparatus 10A, the panoramic screen information stored in the panoramic screen information management DB 5003, and the sharing area duplication data generated in step S165 and step S166 (step S167). Thereby, the transmission/reception unit 11A of the display apparatus 10A receives the panoramic screen information and the sharing area duplication data transmitted from the communication management apparatus 50.

The panoramic screen area generation unit 18A of the display apparatus 10A generates a panoramic screen area using the received sharing area duplication data based on the panoramic screen information received in step S167 (step S168). Then, the panoramic screen area display unit 19A displays, on the display screen 100A, a panoramic screen 470 indicating the panoramic screen area generated in step S168 (step S169). FIG. 42 is an illustration of an example of a panoramic screen on which the site area information is displayed. On the panoramic screen 470, the display areas displayed by the display apparatuses 10 participating in an event are displayed. The panoramic screen 470 includes, as the site display information, area information 471 (471A, 471B, 471C) indicating the display area displayed by each of the display apparatuses at multiple sites and a user indication image 475 (475A, 475B, 475C) specifying each of the users using the display apparatuses 10 at multiple sites. Although in FIG. 42, the area information 471 expresses the display area displayed by each of the display apparatuses 10 at multiple sites by a dotted line, such the dotted line is merely one example. In another example, the area information 471 is expressed in any other suitable manner, e.g., by lines (frames) of different colors. The user indication image 475 is an image representing a user name of a user who uses the display apparatus 10 on which the display area corresponding to the area information 471 is displayed. The display area displayed by each of the other display apparatuses 10 indicated by the area information 471 is an example of a third area.

In another example, in a case where any one or more of the display apparatuses 10 at multiple sites displays a display area that is not included in the panoramic screen area displayed on the panoramic screen 470, only the user indication image 475 is displayed at an end portion of the screen in a direction in which the display area exists. In this case, for example, when the user A views the panoramic screen 470 on which only the user indication image 475 is displayed, the user A can recognize that the display apparatus 10 used by the user corresponding to the user indication image is displaying an area in which no handwriting is input.

Thus, the display apparatus 10A displays the panoramic screen area including the information on the display area displayed by other display apparatuses at the other sites on the panoramic screen 470. This allows the user A to recognize which area in the sharing area 700 is being displayed by the other display apparatuses 10 used by the other users. Accordingly, the event is advanced smoothly. Further, for example, the user A can recognize whether the other users at the other sites pay attention to content to which the user gives explanation by checking the panoramic screen 470. Accordingly, the quality of the event is improved.

Variations of Embodiment

Referring to FIG. 43 to FIG. 47, a variation of the display system according to an embodiment is described. In the variation, the same reference numbers are allocated to elements (members or components) having the same function as those of the above-described embodiments, and redundant description thereof is omitted below. The display system 1a according to the variation is an example in which the display apparatus 10 generates and manages a panoramic screen to be displayed on the display apparatus 10.

Figure 43:
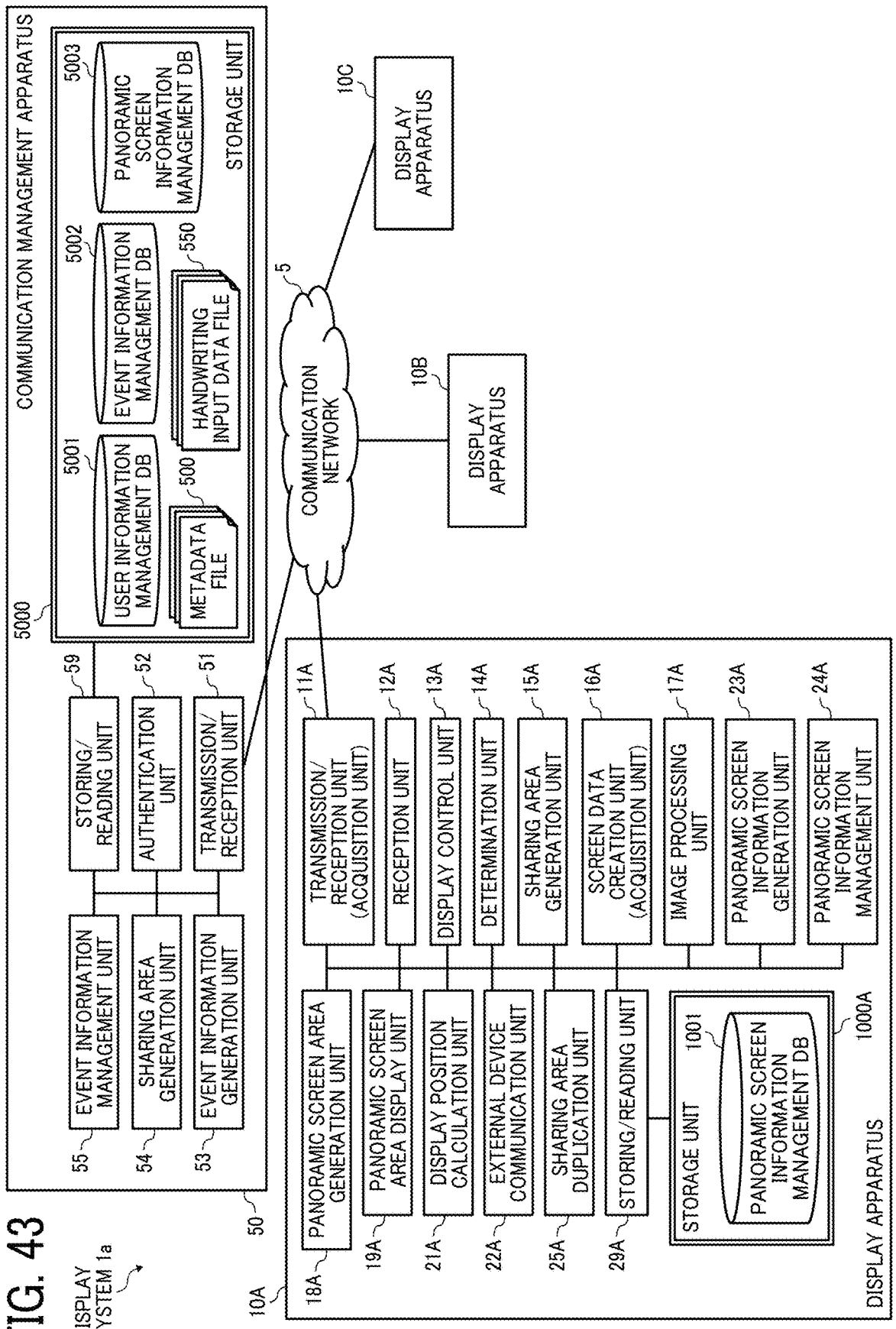
FIG. 43 is a block diagram illustrating an example of a functional configuration of a display system, according to a variation of an embodiment of the present disclosure.

FIG. 43 is a block diagram illustrating an example of a functional configuration of the display system 1a, according to the variation of the embodiment. The display apparatus 10 according to the variation illustrated in FIG. 43 includes a panoramic screen information generation unit 23, a panoramic screen information management unit 24, and a sharing area duplication unit 25 in addition to the functional units of the display apparatus 10 illustrated in FIG. 8. The panoramic screen information generation unit 23, the panoramic screen information management unit 24, and the sharing area duplication unit 25 implements the same or substantially the same functions as those of the panoramic screen information generation unit 56, the panoramic screen information management unit 57, and the sharing area duplication unit 58, respectively. The display apparatus 10 according to the variation further includes a panoramic screen information management DB 1001 stored in the storage unit 1000. The panoramic screen information management DB 1001 is configured by the panoramic screen information management table illustrated in FIG. 13. Thus, in the display system 1a according to the variation, the display apparatus 10 generates and manages the panoramic screen information for specifying the panoramic screen area. For example, all the display apparatuses 10 includes the functions of generating and managing the panoramic screen information according to the variation. In another example, only a particular display apparatus 10 used by a user who hosts an event to be conducted includes the functions of generating and managing the panoramic screen information according to the variation.

Figure 44:
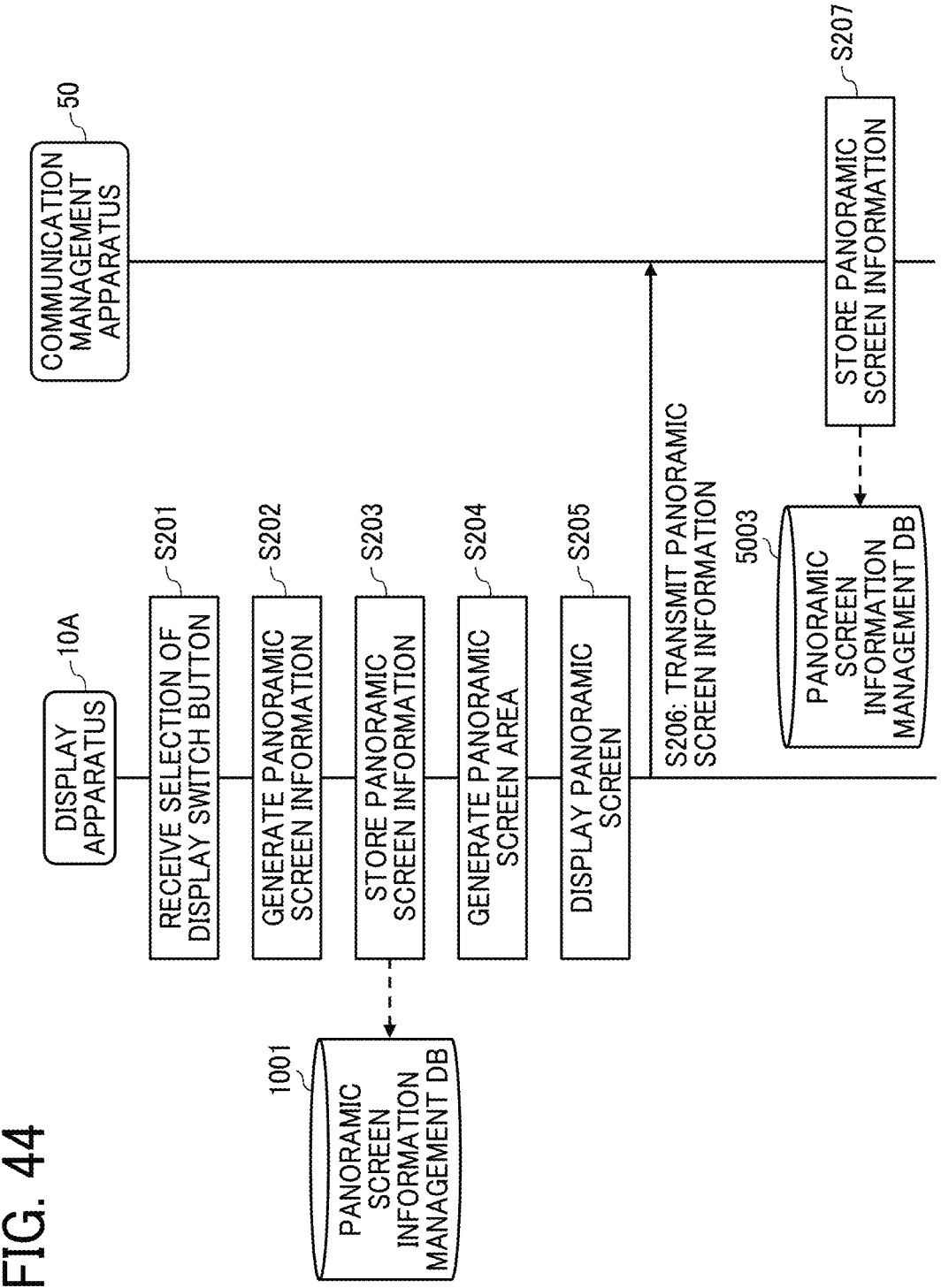
FIG. 44 is a sequence diagram illustrating an example of operation of displaying a panoramic screen, according to a variation of an embodiment of the present disclosure.

Operation of Displaying Panoramic Screen:

FIG. 44 is a sequence diagram illustrating an example of operation of displaying the panoramic screen, according to the variation of the embodiment. First, the reception unit 12A of the display apparatus 10A receives selection of the display switch button 110 illustrated in FIG. 20 according to an input operation by the user A on the display screen 100A (step S201). Next, the panoramic screen information generation unit 23A generates panoramic screen information based on handwriting input data of an event being conducted stored in the storage unit 1000 (step S202). For example, as illustrated in FIG. 21, the panoramic screen information generation unit 23A generates, as the panoramic screen information, area data indicating a position of a panoramic screen area to be displayed on a panoramic screen on the sharing area 700. The panoramic screen information management unit 24A stores the panoramic screen information generated in step S202 in the panoramic screen information management DB 1001A via the storing/reading unit 29A (step S203).

Next, the panoramic screen area generation unit 18A generates a panoramic screen area to be displayed on the display screen 100A based on the panoramic screen information generated in step S202 (step S204). The panoramic screen area generation unit 18A generates, as the panoramic screen area, an image of an area on the sharing area 700 corresponding to the area data (Dx1, Dy1) indicated in the generated panoramic screen information. Then, as illustrated in FIG. 22, the panoramic screen area display unit 19A displays, on the display screen 100A, the panoramic screen 400 indicating the panoramic screen area generated in step S204 (step S205).

Next, the transmission/reception unit 11A transmits the panoramic screen information generated in step S202 to the communication management apparatus 50 (step S206). Thereby, the transmission/reception unit 51 of the communication management apparatus 50 receives the panoramic screen information transmitted from the display apparatus 10A. Then, the panoramic screen information management unit 57 of the communication management apparatus 50 stores the panoramic screen information received in step S206 in the panoramic screen information management DB 5003 via the storing/reading unit 59 (step S207).

Figure 45:
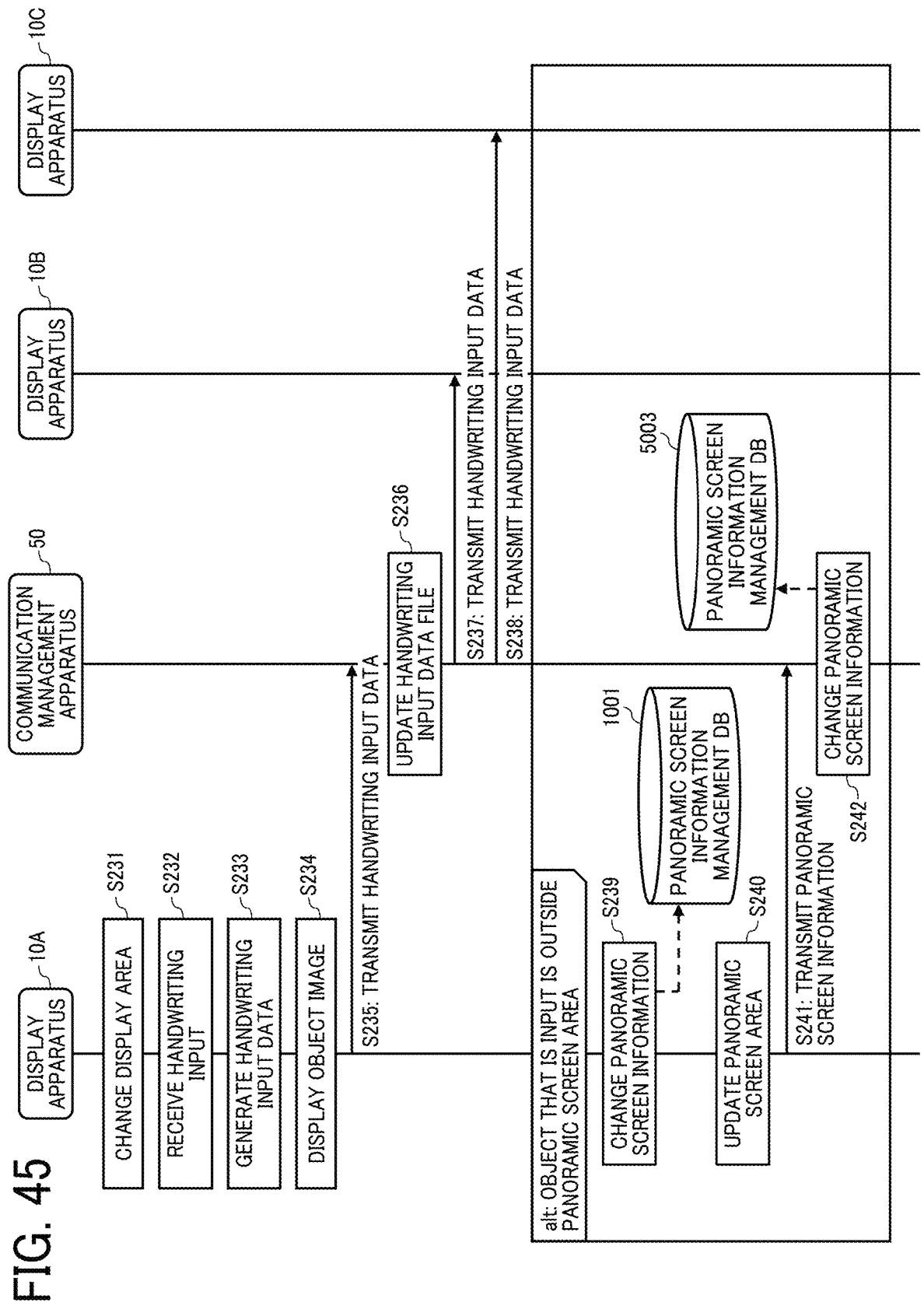
FIG. 45 is a sequence diagram illustrating an example of operation of updating a panoramic screen area, according to a variation of an embodiment of the present disclosure.

Operation of Updating Panoramic Screen Area:

FIG. 45 is a sequence diagram illustrating an example of operation of updating a panoramic screen area, according to the variation of the embodiment. The processes of step S231 to S238 illustrated in FIG. 45 are performed in the similar or substantially the similar manner as the processes of S71 to S78 described with reference to FIG. 23, and redundant description thereof is omitted below.

The panoramic screen information management unit 24A of the display apparatus 10A determines whether the object that is input to the display apparatus 10A is outside the panoramic screen area based on the handwriting input data generated in step S233. When the input object is outside the panoramic screen area, the panoramic screen information management unit 24A changes the panoramic screen information stored in the panoramic screen information management DB 1001, as illustrated in FIG. 24 (step S239).

Next, the panoramic screen area generation unit 18A updates the panoramic screen area being displayed on the display screen 100A based on the panoramic screen information changed in step S239 (step S240). The panoramic screen area generation unit 18 updates, as the panoramic screen area, an area on the sharing area 700 corresponding to the area data (Dx1, Dy1) indicated in the changed panoramic screen information. Then, the panoramic screen area display unit 19A displays, on the display screen 100A, the panoramic screen 400 indicating an image of the updated panoramic screen area, as illustrated in FIG. 25.

Next, the transmission/reception unit 11A transmits the panoramic screen information changed in step S239 to the communication management apparatus 50 (step S241). Thereby, the transmission/reception unit 51 of the communication management apparatus 50 receives the panoramic screen information transmitted from the display apparatus 10A. Then, the panoramic screen information management unit 57 of the communication management apparatus 50 changes the panoramic screen information stored in the panoramic screen information management DB 5003 to the panoramic screen information received in step S241 (step S242).

Operation of Changing Display Size of Panoramic Screen:

FIG. 46 is a sequence diagram illustrating an example of operation of changing the display size of the panoramic screen, according to the variation of the embodiment. The processes of step S251 to S257 illustrated in FIG. 46 are performed in the similar or substantially the similar manner as the processes of S131 to S137 described with reference to FIG. 32, and redundant description thereof is omitted below.

In step S238, the panoramic screen information management unit 24A of the display apparatus 10A performs the operation described above with reference to FIG. 33, to change a display size of the panoramic screen. Next, the panoramic screen area generation unit 18A updates the panoramic screen area being displayed on the display screen 100A based on the panoramic screen information whose display size is changed by the process of step S238 (step S259). Then, as illustrated in FIG. 35, FIG. 37, or FIG. 39, the panoramic screen area display unit 19A displays the panoramic screen corresponding to the updated display size of the panoramic screen area on the display screen 100A.

Next, the transmission/reception unit 11A transmits, to the communication management apparatus 50, the panoramic screen information whose display size is changed by the process of step S238 (step S260). Thereby, the transmission/reception unit 51 of the communication management apparatus 50 receives the panoramic screen information transmitted from the display apparatus 10A. Then, the panoramic screen information management unit 57 of the communication management apparatus 50 changes the panoramic screen information stored in the panoramic screen information management DB 5003 to the panoramic screen information received in step S260 (step S261).

Operation of Displaying Site Area Information on Panoramic Screen:

FIG. 47 is a sequence diagram illustrating an example of operation of displaying display area information on the panoramic screen, according to the variation of the embodiment. First, the display control unit 13B of the display apparatus 10B changes a display area on the display screen 100B in which a part of the sharing area 700 is displayed, in substantially the same manner as the process of step S151 described with reference to FIG. 40 (step S271). Then, the transmission/reception unit 11B transmits display area information indicating the display area displayed on the display screen 100B to the communication management apparatus 50 (step S272). The display area information includes coordinate data for specifying the display area displayed on a display screen (e.g., the display screen 100B) of the display apparatus 10B and a user ID identifying a user (e.g., the user B) who uses the display apparatus 10B. Then, the transmission/reception unit 51 of the communication management apparatus 50 transmits (transfers), to the display apparatus 10A, the display area information transmitted from the display apparatus 10B (step S273). Thereby, the transmission/reception unit 11A of the display apparatus 10A receives the display area information transmitted from the display apparatus 10B.

Further, the display control unit 13C of the display apparatus 10C changes a display area on the display screen 100C in which a part of the sharing area 700 is displayed, in substantially the same manner as the process of step S153 described with reference to FIG. 30 (step S274). Then, the transmission/reception unit 11C transmits display area information indicating the display area displayed on the display screen 100C to the communication management apparatus 50 (step S275). The display area information includes coordinate data for specifying the display area displayed on a display screen (e.g., the display screen 100C) of the display apparatus 10C and a user ID identifying a user (e.g., the user C) who uses the display apparatus 10C. Then, the transmission/reception unit 51 of the communication management apparatus 50 transmits (transfers), to the display apparatus 10A, the display area information transmitted from the display apparatus 10C (step S276). Thereby, the transmission/reception unit 11A of the display apparatus 10A receives the display area information transmitted from the display apparatus 10C. In another example, the display area information exchanged in step S272 and step S275 include information of a user name identifying the corresponding user, in addition to or instead of the user ID.

Next, based on the metadata and the handwriting input data and the handwriting input data of an event being conducted stored in the storage unit 1000, the sharing area duplication unit 25A of the display apparatus 10A generates a duplication of the sharing area shared in the event being conducted (step S277). Next, based on the display area information received in step S273 and in step S276, the sharing area duplication unit 25A adds site display information indicating the display area displayed on each of the display apparatuses 10 at the multiple sites to the generated duplication of the sharing area, as illustrated in FIG. 41 (step S278). The site display information includes information indicating the position on the sharing area 700 of the display area displayed on each of the display apparatuses 10 at the multiple sites and information identifying the user who is using each of the display apparatuses 10 displaying the display area. The information indicating the position on the sharing area 700 of the display area corresponds to the coordinate data included in the display area information received in step S273 and step S276. The information identifying the user who is using each of the display apparatuses 10 displaying the display area corresponds to the user ID included in the display area information received in step S273 and step S276.

Next, the panoramic screen area generation unit 18A generates the panoramic screen area using the sharing area duplication data generated in step S277 and step S278 based on the panoramic screen information stored in the panoramic screen information management DB 1001 (step S279). Then, as illustrated in FIG. 42, the panoramic screen area display unit 19A displays, on the display screen 100A, the panoramic screen 470 indicating the panoramic screen area generated in step S279 (step S280).

Thus, even when the display apparatus 10 generates and manages the panoramic screen information for specifying the panoramic screen area, the display system 1a according to the variation can perform various processes relating to the panoramic screen area displayed on the display apparatus 10.

As described above, the display system 1 and the display system 1a display a partial area of the sharing area 700 on the display screen 100 on which a panoramic screen area is superimposed, the panoramic screen area being an area including one or more handwriting input data items (objects) that are present outside the display area. Thus, the display system 1 and the display system 1a allow the user to efficiently recognize contents input by handwriting in an event being conducted.

Further, when the display system 1 and the display system 1a receive a handwriting input outside the panoramic screen area, the display system 1 and the display system 1a automatically change the panoramic screen area so that the received handwriting input data (object) is displayed. Thus, the display system 1 and the display system 1a allows the user to smoothly recognize that a handwriting input is performed outside the panoramic screen area and to check content of handwriting input data (object) that is input by another user.

Further, the display system 1 and the display system 1a display the panoramic screen area including information on a display area displayed by each of the other display apparatuses 10 at the multiple sites on the panoramic screen 470. Thus, the display system 1 and the display system 1a allow the user to recognize which area in the sharing area 700 is being displayed by the other display apparatuses 10 used by the other users. Accordingly, the event is advanced smoothly.

As described, the display apparatus according to an embodiment of the present disclosure acquires handwriting input data that is input to the sharing area 700 (an example of a handwriting input area) in which handwriting can be input, and display at least a part of the sharing area 700 on the display screen 100. Further, the display apparatus 10 displays a panoramic screen area including the handwriting input data that is input to the sharing area 700 on the display screen 100. Thus, the display apparatus 10 allows the user to efficiently recognize contents input by handwriting.

Further, the display apparatus according to an embodiment of the present disclosure displays, on the display screen 100, a first area, which is at least a part of the sharing area 700 (an example of a handwriting input area) in which handwriting can be input, and displays a panoramic screen area representing a second area including handwriting input data that is input outside the first area in the sharing area 700 on the display screen 100 on which the first area is displayed. Thus, the display apparatus 10 allows the user to efficiently recognize contents input by handwriting.

Further, when handwriting input data that is input outside the second area is acquired, the display apparatus according to an embodiment of the present disclosure displays the panoramic screen area that is changed to include the acquired handwriting input data. Thus, for example, the display apparatus 10 allows the user to smoothly recognize that another user has performed handwriting input outside the panoramic screen area and to check content of the handwriting input data that is input by another user.

Furthermore, the display apparatus according to an embodiment of the present disclosure changes a display size of the panoramic screen area according to a range of the sharing area 700 (an example of a handwriting input area) in which the handwriting input data has been input. Thus, even when the handwriting input data is included in a large part of the sharing area 700, the display apparatus 10 displays the panoramic screen area whose display size varies, thereby allowing the user to easily recognize content of the handwriting input data that has been input.

Furthermore, the display apparatus according to an embodiment of the present disclosure displays the panoramic screen area including site area information indicating a third area, which is an area displayed on a display screen of another display apparatus 10 in the sharing area 700 (an example of a handwriting input area). Furthermore, the display apparatus displays the panoramic screen area including the user indication image 475, as the site area information, the user indication image 475 identifying a user who uses another display apparatus 10 on which the third area is displayed. Thus, the display apparatus 10 allows the user to recognize which area in the sharing area 700 is being displayed by another display apparatus 10 used by another user, thereby allowing the user to advance the event smoothly.

According to one or more embodiments, a non-transitory computer-executable medium storing a program storing instructions is provided, which, when executed by a processor of a display apparatus, causes the display apparatus to perform a method. The method includes acquiring handwriting input data that is input to a handwriting input area that receives a handwriting input. The method includes displaying at least a part of the handwriting input area on a display screen. The method includes displaying, on the display screen, a panoramic screen area that includes the handwriting input data input to the handwriting input area.

The method of the related art, when only a partial area of handwriting input area is displayed, contents that are input outside the displayed partial area are not recognized.

According to an embodiment of the present disclosure, a user efficiently recognizes contents that are input by handwriting.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), a digital signal processor (DSP), a field programmable gate array (FPGA), a system on a chip (SOC), a graphics processing unit (GPU), and conventional circuit components arranged to perform the recited functions.

Each of the tables of the above-described embodiments may be generated by learning effect of machine learning. In addition, in alternative to using the tables, the data of each related item may be classified by the machine learning. In the present disclosure, the machine learning is defined as a technology that makes a computer to acquire human-like learning ability. In addition, the machine learning refers to a technology in which a computer autonomously generates an algorithm required for determination such as data identification from learning data loaded in advance and applies the generated algorithm to new data to make a prediction. Any suitable learning method is applied for the machine learning, for example, any one of supervised learning, unsupervised learning, semi-supervised learning, reinforcement learning, and deep learning, or a combination of two or more of these learning.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

The invention claimed is:

1. An apparatus, comprising:
circuitry configured to:
acquire hand drafted input data based on hand drafting that is input to a hand drafted input area;
display at least a part of the hand drafted input area on a display screen;
determine whether the hand drafted input data is outside of a panoramic screen area that is shared between the apparatus and another apparatus;
in a case that the hand drafted input data is determined to be outside of the panoramic screen area, change a display size of the panoramic screen area based on a coordinate position of the hand drafted input data so that the panoramic screen area includes the hand drafted input data; and
display, on the display screen, the panoramic screen area including the hand drafted input data.

2. The apparatus of claim 1, wherein the circuitry is further configured to
display a graphical representation for switching between display of the panoramic screen area and non-display of the panoramic screen area, and
display the panoramic screen area in response to a selection of the displayed graphical representation.

3. The apparatus of claim 1, wherein
the hand drafted input data includes one or more hand drafted input data items,
a first area is included in the at least the part of the hand drafted input area,
the panoramic screen area is a second area that includes a hand drafted input data item, of the one or more hand drafted input data items, which is input in a portion of the hand drafted input area outside of the first area, and the circuitry is further configured to display, on the display screen, the second area that includes the hand drafted input data item.

4. The apparatus of claim 3, wherein the second area includes all of the one or more hand drafted input data items.

5. The apparatus of claim 3, wherein the circuitry displays the panoramic screen area in a case that the circuitry acquires the hand drafted input data item input in the portion of the hand drafted input area outside of the first area.

6. The apparatus of claim 3, wherein in a case that the circuitry acquires at least one hand drafted input data item, of the one or more hand drafted input data items, that are input outside the second area, the circuitry displays the panoramic screen area that is changed to include the at least one hand drafted input data items.

7. The apparatus of claim 1, wherein the circuitry changes the display size of the panoramic screen area according to a size of a part of the hand drafted input area in which the hand drafted input data is input.

8. The apparatus of claim 1, wherein
the hand drafted input area is shared with the another apparatus, and
the circuitry acquires the hand drafted input data by receiving the hand drafted input data from the another apparatus, the hand drafted input data having been input to the another apparatus.

9. The apparatus of claim 8, wherein the circuitry displays the panoramic screen area including site area information indicating an area in the hand drafted input area, the area being displayed on another display screen of the another apparatus.

10. The apparatus of claim 9, wherein the site area information includes a user indication image identifying a user of the another apparatus.

11. A display system, comprising:
a display; and
circuitry configured to:
  acquire hand drafted input data based on hand drafting that is input to a hand drafted input area;
  display at least a part of the hand drafted input area on a display screen;
  determine whether the hand drafted input data is outside of a panoramic screen area that is shared between apparatuses;
  in a case that the hand drafted input data is determined to be outside of the panoramic screen area, change a display size of the panoramic screen area based on a coordinate position of the hand drafted input data so that the panoramic screen area includes the hand drafted input data; and
  display, on the display screen, the panoramic screen area including the hand drafted input data.

12. The display system of claim 11, wherein the circuitry is further configured to
display a graphical representation for switching between display of the panoramic screen area and non-display of the panoramic screen area, and
display the panoramic screen area in response to a selection of the displayed graphical representation.

13. The display system of claim 11, wherein the circuitry changes the display size of the panoramic screen area according to a size of a part of the hand drafted input area in which the hand drafted input data is input.

14. The display system of claim 11, further comprising:
a first display apparatus including the display and the circuitry; and
a second display apparatus including another display and another circuitry, wherein
the first display apparatus and the second display apparatus share the hand drafted input area,
the circuitry displays a first area, which is included in the at least the part of the hand drafted input area, on the display screen,
the another circuitry displays a second area, which is at least a part of another hand drafted input area into which hand drafted data is input, the second area being different from the first area, and
the panoramic screen area is a shared area that is shared and displayed by the first display apparatus and the second display apparatus.

15. The display system of claim 14, wherein the shared area includes all of the one or more hand drafted input data items.

16. The display system of claim 14, wherein the circuitry displays the panoramic screen area in a case that the circuitry acquires the hand drafted input data item input in a portion of the hand drafted input area outside of the first area.

17. The display system of claim 14, wherein in a case that the circuitry acquires at least one hand drafted input data item, of the one or more hand drafted input data items, that are input outside the panoramic screen area, the circuitry displays the panoramic screen area that is changed to include the at least one hand drafted input data items.

18. The display system of claim 14, wherein the circuitry acquires the hand drafted input data by receiving the hand drafted input data from the second display apparatus, the hand drafted input data having been input to the second display apparatus.

19. The display system of claim 18, wherein the circuitry displays the panoramic screen area including site area information indicating an area in the hand drafted input area, the area being displayed on another display screen of the second display apparatus.

20. A display control method performed by an apparatus, the display control method comprising:
acquiring hand drafted input data based on hand drafting that is input to a hand drafted input area;
displaying at least a part of the hand drafted input area on a display screen;
determining whether the hand drafted input data is outside of a panoramic screen area that is shared between the apparatus and another apparatus;
in a case that the hand drafted input data is determined to be outside of the panoramic screen area, changing a display size of the panoramic screen area based on a coordinate position of the hand drafted input data so that the panoramic screen area includes the hand drafted input data; and
displaying, on the display screen, the panoramic screen area including the hand drafted input data.

* * * * *